US012522471B2

(12) United States Patent
Nakazawa et al.

(10) Patent No.: US 12,522,471 B2
(45) Date of Patent: Jan. 13, 2026

(54) VIBRATION DAMPING DEVICE FOR ELEVATOR ROPE AND ELEVATOR APPARATUS

(71) Applicant: Mitsubishi Electric Corporation, Tokyo (JP)

(72) Inventors: Daisuke Nakazawa, Tokyo (JP); Eiichi Saito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1592 days.

(21) Appl. No.: 16/644,172

(22) PCT Filed: Jun. 18, 2018

(86) PCT No.: PCT/JP2018/023067
§ 371 (c)(1),
(2) Date: Mar. 4, 2020

(87) PCT Pub. No.: WO2019/069508
PCT Pub. Date: Apr. 11, 2019

(65) Prior Publication Data

US 2022/0112052 A1 Apr. 14, 2022

(30) Foreign Application Priority Data

Oct. 6, 2017 (JP) ................................ 2017-196043

(51) Int. Cl.
*B66B 7/12* (2006.01)
*B66B 7/06* (2006.01)
(Continued)

(52) U.S. Cl.
CPC .............. *B66B 7/1215* (2013.01); *B66B 7/06* (2013.01); *B66B 7/10* (2013.01); *F16F 15/002* (2013.01);
(Continued)

(58) Field of Classification Search
CPC .......... B66B 1/34-3423; B66B 1/3446; B66B 1/3469; B66B 1/3492; B66B 5/00;
(Continued)

(56) References Cited

U.S. PATENT DOCUMENTS 4,997,095 A * 3/1991 Jones ........................ B25J 9/026 212/278
7,793,763 B2 * 9/2010 Zhu ........................... B66B 7/06 254/277

(Continued)

FOREIGN PATENT DOCUMENTS

JP 09-142756 A 6/1997
JP 2004-250217 A 9/2004

(Continued)

OTHER PUBLICATIONS

International Search Report and Written Opinion mailed on Aug. 14, 2018 for PCT/JP2018/023067 filed on Jun. 18, 2018, 13 pages including English Translation of the International Search Report.

(Continued)

*Primary Examiner* — Christopher Uhlir
(74) *Attorney, Agent, or Firm* — XSENSUS LLP

(57) ABSTRACT

The vibration damping device for an elevator rope includes: an actuator, which is placed in a hoistway, and is configured to generate a forced displacement in response to a drive input and apply a force generated by the forced displacement to an elevator rope; a lateral vibration measuring unit configured to measure a lateral vibration generated in the elevator rope and output the measured lateral vibration as lateral vibration information; a lateral vibration estimation unit configured to estimate a lateral vibration of the elevator rope at a position of the actuator based on the lateral vibration information and output the lateral vibration as an estimated lateral vibration; and an actuator drive unit configured to output the drive input to the actuator to drive the (Continued)

actuator so that the forced displacement has a phase reverse to a phase of the estimated lateral vibration output from the lateral vibration estimation unit.

9 Claims, 28 Drawing Sheets

(51) Int. Cl.

*B66B 7/10* (2006.01)
*F16F 15/00* (2006.01)
*G01H 17/00* (2006.01)

(52) U.S. Cl.

CPC ...... *G01H 17/00* (2013.01); *F16F 2230/0047* (2013.01); *F16F 2230/18* (2013.01)

(58) Field of Classification Search

CPC ....... B66B 5/0006; B66B 5/0037; B66B 5/02; B66B 5/12; B66B 7/06; B66B 7/10–1215; B66B 11/0065

See application file for complete search history.

(56) References Cited

U.S. PATENT DOCUMENTS

| | | | | |
|---|---|---|---|---|
| 2012/0125720 | A1 | 5/2012 | Roberts et al. | |
| 2015/0008075 | A1* | 1/2015 | Benosman | B66B 7/06 187/247 |
| 2015/0027814 | A1* | 1/2015 | Benosman | B66B 5/02 187/247 |

FOREIGN PATENT DOCUMENTS

| | | | |
|---|---|---|---|
| JP | 2011-126708 | A | 6/2011 |
| JP | 2013-500222 | A | 1/2013 |
| JP | 2014-159328 | A | 9/2014 |
| JP | 2017-222480 | A | 12/2017 |
| WO | 2011/014165 | A1 | 2/2011 |

OTHER PUBLICATIONS

German Office Action issued Oct. 11, 2024, in corresponding German Patent Application No. 11 2018 004 437.8, 1 20pp.

* cited by examiner

VIBRATION DAMPING DEVICE FOR ELEVATOR ROPE AND ELEVATOR APPARATUS

CROSS-REFERENCE TO RELATED APPLICATIONS

The present application is based on PCT filing PCT/JP2018/023067, filed Jun. 18, 2018, which claims priority to JP 2017-196043, filed Oct. 6, 2017, the entire contents of each are incorporated herein by reference.

TECHNICAL FIELD

The present invention relates to a vibration damping device for an elevator rope, which is configured to suppress lateral vibrations of the elevator rope.

BACKGROUND ART

It is known that, when a long-period shake occurs in a building due to a long-period earthquake ground motion, a strong wind, or the like, a shake of the building continues for a certain period of time. In an elevator apparatus placed in the building, a shake caused by the shake of the building sometimes occurs in main ropes, a speed regulator rope, or a compensation rope (hereinafter, collectively referred to as "elevator ropes").

When a car travels in a state in which the shake occurs in the elevator rope, an instrument of the elevator apparatus, which is placed in a hoistway, may be broken to require a time for restoration. Moreover, even when the shake of the elevator rope is small, a shake of the car is excited by the shake of the elevator rope, which may sometimes degrade a riding comfort of a passenger.

There is disclosed an elevator apparatus, in which a vibration damping device configured to reduce the shake of the elevator rope is provided in order to avoid such a breakage of the instrument of the elevator apparatus, which is placed in the hoistway, and to reduce such a degradation of the riding comfort of the passenger.

An elevator apparatus described in Patent Literature 1 detects a long-period shake of a building by an accelerometer placed in the building. Moreover, the elevator apparatus estimates a rope vibration waveform at a position of a car based on the detected long-term shake of the building, and vibrates a rope hitch device, which is placed on the car, in a phase reverse to the rope vibration waveform, thereby reducing the shake of the rope.

CITATION LIST

Patent Literature

[PTL 1] JP 2014-159328 A

SUMMARY OF INVENTION

Technical Problem

The elevator apparatus described in Patent Literature 1 estimates the rope vibration waveform at the position of the car based on the measured long-term shake of the building. Therefore, there is a problem in that it is difficult to estimate the vibration waveform of the rope with high accuracy.

The present invention has been made in order to solve such a problem as described above. It is an object of the present invention to provide a vibration damping device for an elevator rope, which is capable of estimating a lateral vibration of an elevator rope with high accuracy, and suppressing the lateral vibration of the elevator rope with high accuracy.

Solution to Problem

According to one embodiment of the present invention, there is provided a vibration damping device for an elevator rope, including: an actuator, which is placed in a hoistway, in a machine room, or on a car of an elevator apparatus, and is configured to generate a forced displacement in response to a drive input and apply a force generated by the forced displacement to an elevator rope of the elevator apparatus; a lateral vibration measuring unit configured to measure a lateral vibration generated in the elevator rope and output the measured lateral vibration as lateral vibration information; a lateral vibration estimation unit configured to estimate a lateral vibration of the elevator rope at a position of the actuator based on an estimating factor including the lateral vibration information and output the lateral vibration as an estimated lateral vibration; and an actuator drive unit configured to output the drive input to the actuator to drive the actuator so that the forced displacement has a phase reverse to a phase of the estimated lateral vibration output from the lateral vibration estimation unit.

Advantageous Effects of Invention

According to the present invention, there can be provided the vibration damping device for an elevator rope, which is capable of reducing an amplitude of the lateral vibration of the elevator rope with high accuracy through measurement of the lateral vibration of the elevator rope and estimation of the lateral vibration at the position of the actuator based on the estimating factor including the measured lateral vibration.

DESCRIPTION OF EMBODIMENTS

Now, embodiments of the present invention are described in detail with reference to the drawings. Note that the embodiments described below are merely for illustrative purposes, and the present invention is not limited the following embodiments.

First Embodiment

Figure 1A:
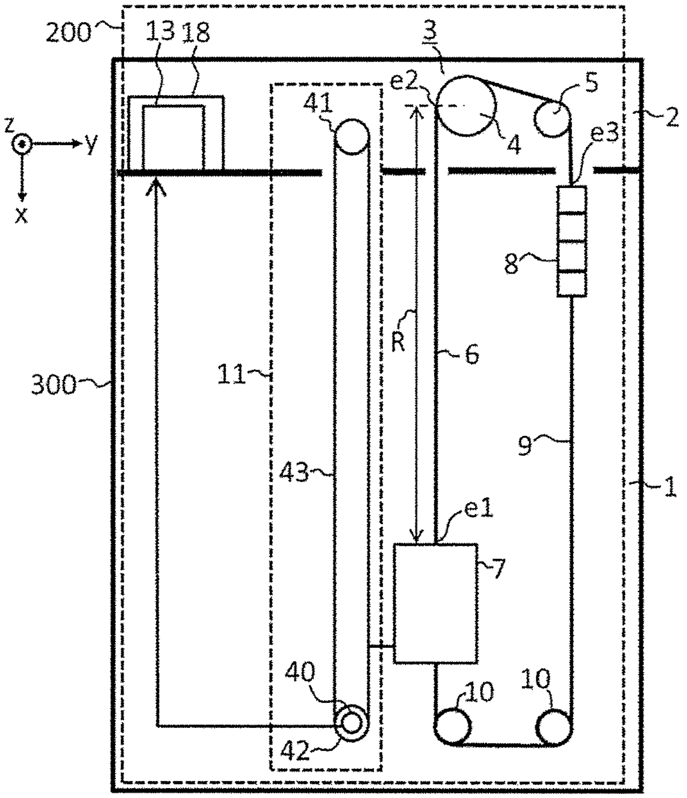
FIGS. 1A, 1B and 1C are schematic views of an elevator apparatus according to a first embodiment of the present invention.
Figure 1B:
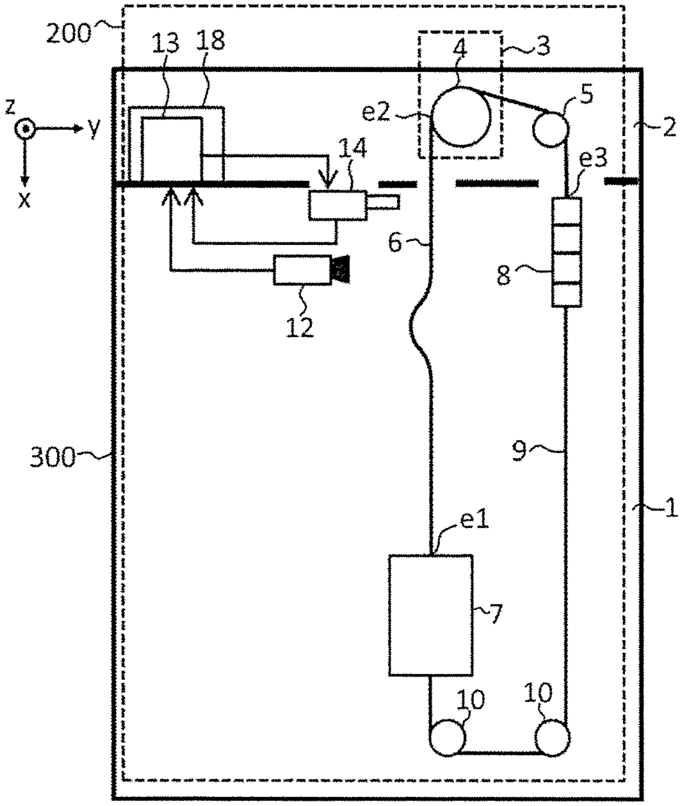
Figure 1C:
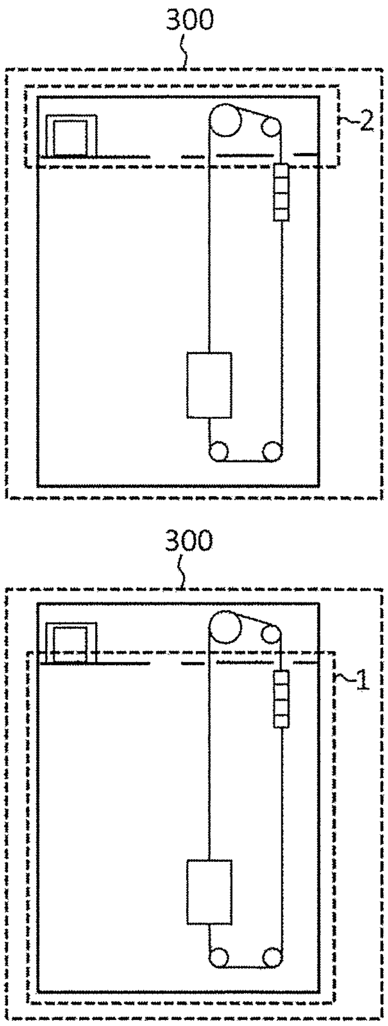

FIGS. 1A, 1B and 1C are schematic views of an elevator apparatus according to a first embodiment of the present invention. In FIG. 1A and FIG. 1B, an x-axis, a y-axis, and a z-axis in a 3-axis orthogonal coordinate system are illustrated. The x-axis is set in parallel to a portion of a vibration damping range R of main ropes 6, and a vertically downward direction thereof is a positive direction of the x-axis. Both of FIG. 1A and FIG. 1B are illustrations of an elevator apparatus 200.

To simplify the illustration, a car position measuring unit 11 is illustrated in FIG. 1A, and a lateral vibration measuring unit 12 and an actuator 14 are illustrated in FIG. 1B. In FIG. 1A, the lateral vibration measuring unit 12 and the actuator 14 are not illustrated. Moreover, in FIG. 1B, the car position measuring unit 11 is not illustrated. In FIG. 1C, two schematic views of the elevator apparatus are illustrated, and arrangement of a building 300, a hoistway 1, and a machine room 2 is illustrated.

Components illustrated in FIGS. 1A, 1B and 1C are included in the elevator apparatus 200, except for the building 300 and also the hoistway 1 and the machine room 2 being parts of the building 300. Moreover, a vibration damping device 100 for an elevator rope is a part of the elevator apparatus 200. In FIG. 1A, a state in which a lateral vibration is not generated in the main ropes 6 is schematically illustrated.

In FIG. 1A, the hoistway 1 through which a car 7 moves up and down is illustrated. The machine room 2 is provided above the hoistway 1. A hoisting machine 3 and a deflector sheave 5 are placed in the machine room 2. The hoisting machine 3 includes a driving sheave 4, a hoisting-machine motor (not shown), and a hoisting-machine brake (not shown). The hoisting-machine motor rotates the driving sheave 4. The hoisting-machine brake brakes the rotation of the driving sheave 4.

A plurality of main ropes 6 which are suspension bodies are wound around the driving sheave 4 and the deflector sheave 5. The car 7 is connected to a first end portion e1 of each of the main ropes 6. A boundary between a portion of the main rope 6 in contact with the driving sheave 4 and a portion of the main rope 6 in non-contact with the driving sheave 4 is defined as a contact point e2. That is, a portion of the main rope 6 located closest to the car 7 among portions of the main rope 6 in contact with the driving sheave 4 is the contact point e2.

A second end portion e3 of the main rope 6 is connected to a counterweight 8. The vibration damping device 100 for an elevator rope according to the first embodiment suppresses a lateral vibration generated between the first end portion e1, which serves as a fixed end, and the contact point e2. A portion between the first end portion e1 and the contact point e2 of the main rope 6 is defined as the vibration damping range R. The vibration damping range R is illustrated only in FIG. 1A.

Here, since the plurality of main ropes 6 are placed side by side, the first end portion e1, the contact point e2, the second end portion e3, and the vibration damping range R represent positions of the plurality of main ropes 6 in the x-axis direction or a range of the plurality of main ropes 6 in the x-axis direction.

In the elevator apparatus 200 illustrated in and FIG. 1A and FIG. 1B, the car 7 and the counterweight 8 are suspended by the main ropes 6 in a 1:1 roping system in an inside of the hoistway 1. The hoisting machine 3 rotates the driving sheave 4, thereby lifting and lowering the car 7 and the counterweight 8. The 1:1 roping system is illustrated as an example in the elevator apparatus according to the first embodiment. However, the vibration damping device for an elevator rope according to the present invention is also applicable to an elevator apparatus having another roping system such as a 2:1 roping system.

In the inside of the hoistway 1, there are placed a pair of car guiderails (not shown) configured to guide the lifting and lowering of the car 7 and a pair of counterweight guiderails (not shown) configured to guide the lifting and lowering of the counterweight 8. The car 7 and the counterweight 8 are connected to each other by a compensation rope 9. Compensating sheaves 10 are provided in a bottom portion of the hoistway 1. The compensation rope 9 is wound around the compensating sheaves 10.

The car position measuring unit 11 configured to measure a position of the car 7 in the x-axis direction is described. Here, the position in the x-axis direction is a position coordinate on the x-axis, and for example, may be defined as an x-coordinate of a reference point provided in the car 7. The car position measuring unit 11 includes a main body 40, a pulley 41, a pulley 42, and a wire rope 43. The pulley 41 and the pulley 42 are provided in an upper portion and a lower portion of the hoistway 1, respectively. The main body 40 is provided in the pulley 42. The main body 40 can also be provided in the pulley 42.

The endless (annular) wire rope 43 is wound around the pulley 41 and the pulley 42. The wire rope 43 is fixed to a sidewall of the car 7. As the car 7 travels, the wire rope 43 moves together with the car 7, and the pulley 41 and the pulley 42 rotate.

The main body 40 of the car position measuring unit 11 is a sensor such as an encoder configured to measure a rotation amount and a rotation direction of the pulley 42. The car position measuring unit 11 outputs the measured position of the car as car position information 104 to a computation control device 13. A variety of instruments (not shown) related to the travel of the car 7 are placed inside the hoistway 1, and the various instruments are controlled by a control panel 18. The control panel 18 includes the computation control device 13.

Next, FIG. 1B is described. A description of the components of the elevator apparatus 200 described in FIG. 1A is omitted. A situation in which a lateral vibration is generated in each of the main ropes 6 of FIG. 1B is schematically illustrated.

In FIG. 1B, the lateral vibration measuring unit 12 configured to measure a lateral vibration is illustrated. The lateral vibration measuring unit 12 is placed in the hoistway 1. It can also be said that the lateral vibration measuring unit 12 is placed in the building 300. The lateral vibration measuring unit 12 is a rope lateral vibration sensor, and is a non-contact displacement sensor. The lateral vibration measuring unit 12 may be provided on the car 7 or in the machine room.

The lateral vibration measuring unit 12 measures the lateral vibration of the main rope 6. More specifically, the lateral vibration measuring unit 12 measures a displacement of the main rope 6, which is caused by the lateral vibration, at least at one point within the vibration damping range R of the main rope 6. A direction of the displacement of the main rope 6 is a direction parallel to a yz plane of FIG. 1. The lateral vibration measuring unit 12 outputs the measured lateral vibration as lateral vibration information 101.

Figure 2:
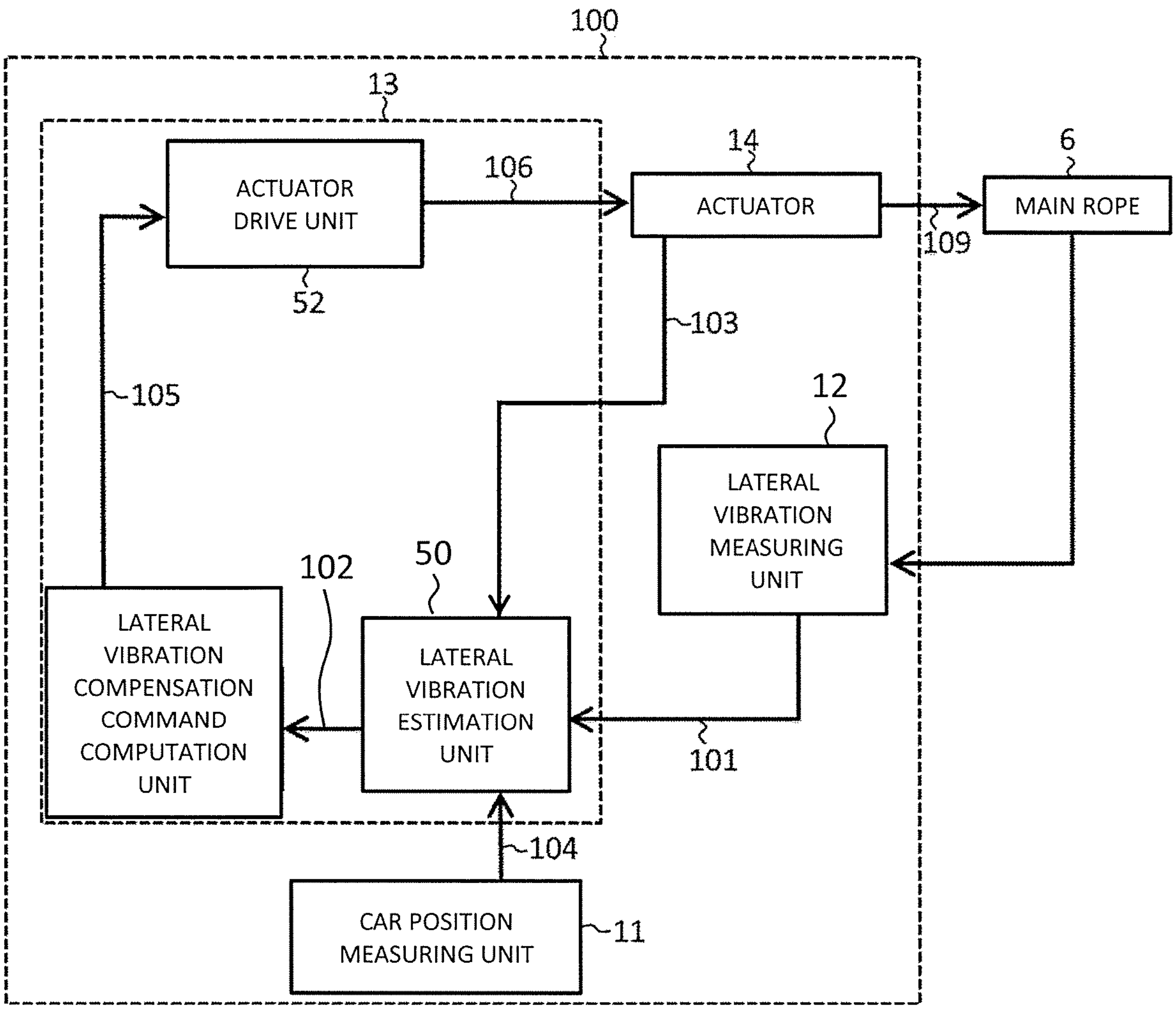
FIG. 2 is a block diagram for illustrating a main part of a vibration damping device for an elevator rope according to the first embodiment of the present invention.

As illustrated in FIG. 2 to be described later, the actuator 14 applies a force generated by a forced displacement 109 to the main rope 6. The actuator 14 is of a linear motion type. The actuator 14 is placed in the hoistway 1. The actuator 14 can also be placed in the machine room 2. It can also be said that the actuator 14 is placed in the building 300.

The actuator 14 may be placed on the car 7.

The actuator 14 generates the forced displacement 109, and applies the force generated by the forced displacement 109 to at least one point within the vibration damping range R of the main rope 6. The forced displacement 109 is a displacement of the actuator 14. More specifically, the forced displacement 109 is a displacement of a movable portion of the actuator 14 generated in response to a drive input 106.

In the vibration damping device 100 for an elevator rope according to the first embodiment, the actuator 14 is placed in the hoistway 1 or the machine room 2, and accordingly, the position of the actuator 14 can be freely changed in comparison with a case of placing the actuator 14 on the car. Therefore, the vibration damping device 100 for an elevator rope can suppress the lateral vibration with a smaller force by applying the force generated by the forced displacement to a place distant from the fixed end.

A lateral vibration of the main rope 6 in a case of not operating the vibration damping device 100 for an elevator rope is described. When a shake of the building 300 occurs due to an earthquake, a strong wind, or the like, a lateral vibration is generated in the main rope 6 with the shake of the building 300. The generated lateral vibration propagates through the main rope 6 from the contact point e2 toward the first end portion e1. The lateral vibration propagates as a traveling wave from the contact point e2 toward the first end portion e1.

The lateral vibration that has reached the first end portion e1 is reflected by the first end portion e1, and propagates from the first end portion e1 toward the contact point e2. The lateral vibration that propagates from the first end portion e1 toward the contact point e2 is called a reflected wave. Between the first end portion e1 and the contact point e2, the traveling wave and the reflected wave repeat the propagation and the reflection while overlapping each other. The above is the lateral vibration of the main rope 6 in the case of not operating the vibration damping device 100 for an elevator rope.

FIG. 2 is a block diagram for illustrating a main part of the vibration damping device for an elevator rope according to the first embodiment of the present invention. The vibration damping device 100 for an elevator rope includes the car position measuring unit 11, the lateral vibration measuring unit 12, the computation control device 13, and the actuator 14. The computation control device 13 includes a lateral vibration estimation unit 50, a lateral vibration compensation command computation unit 51, and an actuator drive unit 52.

An operation of the vibration damping device 100 for an elevator rope according to the first embodiment is described. The lateral vibration measuring unit 12 measures the lateral vibration generated by the traveling wave generated in the main rope 6, and outputs the measured lateral vibration as the lateral vibration information 101 to the lateral vibration estimation unit 50.

The car position measuring unit 11 measures the position of the car 7, and outputs the measured position of the car 7 as the car position information 104 to the lateral vibration estimation unit 50. The actuator 14 applies the force generated by the forced displacement 109 to the main rope 6. Moreover, the actuator 14 outputs the forced displacement 109 as an actuator displacement 103 to the lateral vibration estimation unit 50.

The lateral vibration estimation unit 50 estimates the lateral vibration at the position of the actuator 14 based on an estimating factor. The position of the actuator 14 is a position on the main rope 6, in which the force generated by the forced displacement 109 is applied to the main rope 6 by the actuator 14.

A single factor or a plurality of factors used by the lateral vibration estimation unit 50 for estimation of an estimated lateral vibration 102 are defined as estimating factors. In the vibration damping device 100 for an elevator rope, the lateral vibration information 101, the car position information 104, and the actuator displacement 103 are included in the estimating factors. A vibration damping device for an elevator rope which does not include the actuator displacement 103 in the estimating factors can also be formed.

In the first embodiment, the lateral vibration estimation unit 50 estimates the lateral vibration generated by the reflected wave at the position of the actuator 14. Specifically, based on a propagation speed of the lateral vibration that propagates on the main rope 6, the lateral vibration estimation unit 50 calculates a time required for the lateral vibration measured by the lateral vibration measuring unit 12 to propagate to the position of the actuator 14, and estimates the lateral vibration at the position of the actuator 14.

The lateral vibration estimation unit 50 outputs the estimated lateral vibration as the estimated lateral vibration 102 to the lateral vibration compensation command computation unit 51. The lateral vibration compensation command computation unit 51 calculates a command value of a phase reverse to that of the estimated lateral vibration 102, and outputs the calculated command value as a lateral vibration compensation command value 105 to the actuator drive unit 52.

Here, the fact that the phases of the estimated lateral vibration 102 and the lateral vibration compensation command value 105 are reverse to each other means the following state. That is, a magnitude of a displacement of the estimated lateral vibration 102 and a magnitude of a displacement of the lateral vibration compensation command value 105 are equal to each other, and a direction of the displacement of the estimated lateral vibration 102 and a direction of the displacement of the lateral vibration compensation command value 105 are reverse to each other.

Based on the lateral vibration compensation command value 105, the actuator drive unit 52 calculates the drive input 106, and outputs the calculated drive input 106 to the actuator 14. The actuator 14 generates the forced displacement 109 in response to the drive input 106, and applies the force generated by the forced displacement 109 to the main rope 6.

The actuator drive unit 52 calculates the drive input 106, and outputs the calculated drive input 106 to the actuator 14, thereby driving the actuator 14 and allowing the lateral vibration compensation command value 105 to follow the forced displacement 109. That is, the actuator drive unit 52 drives the actuator 14 so that the phases of the estimated lateral vibration 102 and the lateral vibration compensation command value 105 become reverse to each other.

By the force generated by the forced displacement 109, an amplitude of the reflected wave of the main rope 6 is reduced, and generation of a standing wave generated by overlapping of the traveling wave and the reflected wave is suppressed. That is, an occurrence of a resonance phenomenon of the lateral vibration is suppressed by the vibration damping device 100 for an elevator rope. The computation control device 13 can be formed of a microcomputer. That is, functions of the lateral vibration estimation unit 50, the lateral vibration compensation command computation unit 51, and the actuator drive unit 52 can be achieved through use of a microcomputer.

The vibration damping device 100 for an elevator rope may suppress the lateral vibration by performing a series of vibration damping operations a plurality of times. Here, the series of vibration damping operations is operations of the vibration damping device 100 for an elevator rope ranging from the measurement of the lateral vibration by the lateral vibration measuring unit 12 to the generation of the forced displacement 109 by the actuator 14.

When the vibration damping device 100 for an elevator rope performs a series of the vibration damping operations a plurality of times, the lateral vibration that has received the force generated by the forced displacement 109 reaches the position of the actuator 14. The vibration damping device 100 for an elevator rope includes the actuator displacement 103 among the estimating factors, and accordingly, can estimate the lateral vibration, which has received the force generated by the forced displacement 109, with higher accuracy.

When the vibration damping device for an elevator rope is formed so that the actuator drive unit 52 directly calculates the drive input 106 from the estimated lateral vibration 102, a vibration damping device for an elevator rope, which does not include the lateral vibration compensation command computation unit 51, can also be formed.

When the force generated by the forced displacement 109 includes a component in a direction parallel to the yz plane, the vibration damping device for an elevator rope according to the present invention exerts an effect. Moreover, as an angle between the direction of the force generated by the forced displacement 109 and the x-axis becomes closer to 90 degrees, the lateral vibration can be suppressed with a smaller force. The direction of the force generated by the forced displacement 109 is suitably set perpendicular to the main rope 6.

Figure 3:
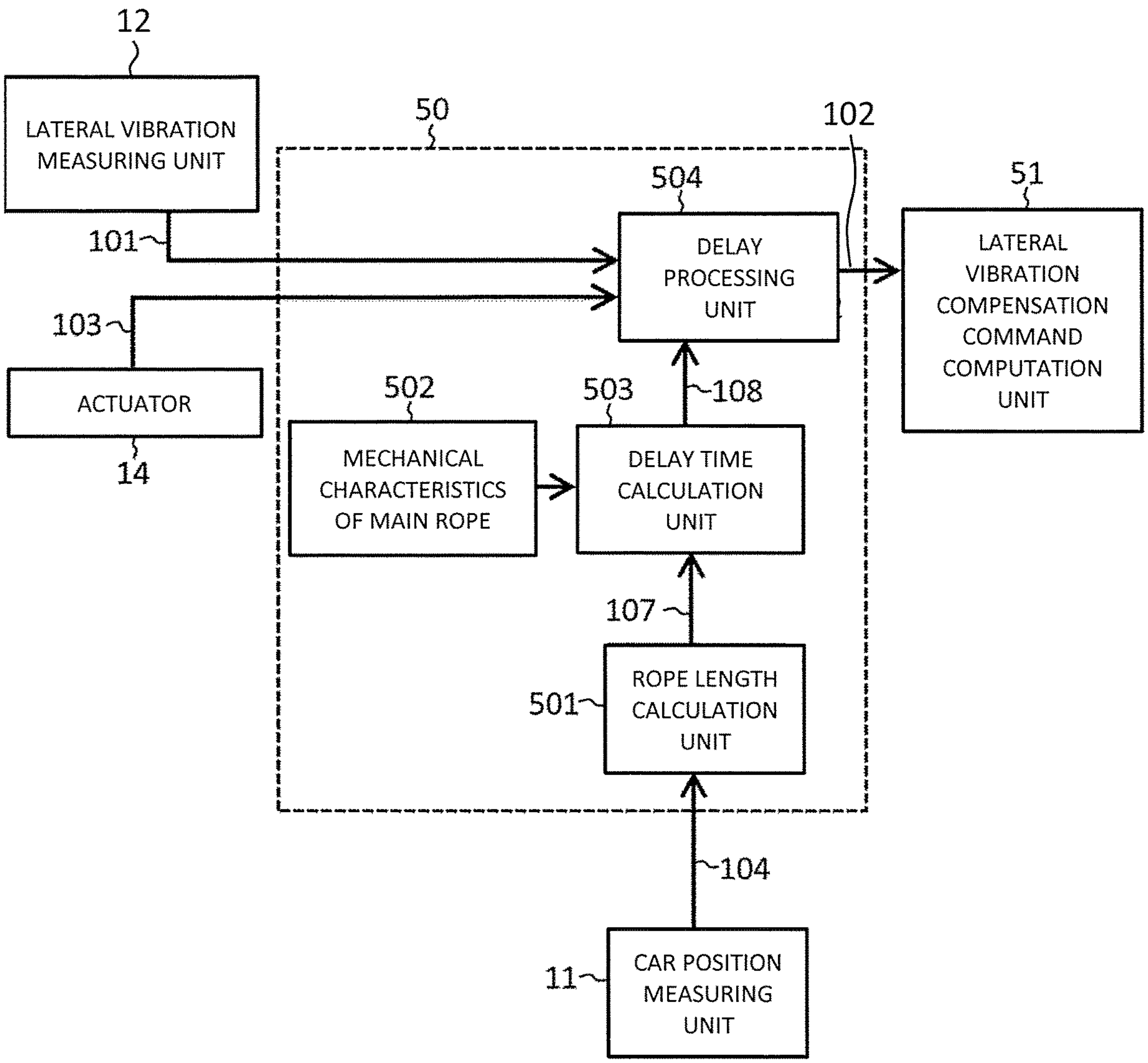
FIG. 3 is a block diagram for illustrating a main part of the vibration damping device for an elevator rope according to the first embodiment of the present invention, the main part including a lateral vibration estimation unit.

Subsequently, the lateral vibration estimation unit 50 that is a component of the computation control device 13 is described. FIG. 3 is a block diagram for illustrating a main part of the vibration damping device for an elevator rope according to the first embodiment of the present invention, the main part including the lateral vibration estimation unit. The lateral vibration estimation unit 50 includes a rope length calculation unit 501, mechanical characteristics 502 of a main rope, a delay time calculation unit 503, and a delay processing unit 504.

In the configuration of the vibration damping device 100 for an elevator rope, the lateral vibration estimation unit 50 includes the rope length calculation unit 501. However, it is only required that the rope length calculation unit 501 be included in the vibration damping device for an elevator rope, and a configuration in which the car position measuring unit 11 includes the rope length calculation unit 501 may be adopted.

The rope length calculation unit 501 acquires the car position information 104 from the car position measuring unit 11. The rope length calculation unit 501 calculates a rope length from the car position information 104, and outputs the calculated rope length as rope length information 107 to the delay time calculation unit 503. Here, the rope length in the first embodiment is a length of the main rope 6 from the first end portion e1 to the contact point e2.

When the actuator 14 and the lateral vibration measuring unit 12 are provided on the car 7, a configuration in which the rope length calculation unit 501 does not acquire the position information 104 from the car position measuring unit 11 can also be adopted. In that case, a distance from the actuator 14 to the lateral vibration measuring unit 12 in a height direction is stored in advance in the rope length calculation unit 501.

The delay time calculation unit 503 calculates a time required for the lateral vibration measured by the lateral vibration measuring unit 12 to reach the position of the actuator 14 from the position of the lateral vibration measuring unit 12. The delay time calculation unit 503 calculates such a required time based on the position of the lateral vibration measuring unit 12, the position of the actuator 14, the rope length information 107, and the mechanical characteristics 502 of a main rope.

The delay time calculation unit 503 outputs a delay time, which is the required time thus calculated, as delay time information 108 to the delay processing unit 504. The mechanical characteristics 502 of a main rope include a mass (line density) of the main rope 6 per unit length. The delay time calculation unit 503 calculates the propagation speed of the lateral vibration through use of the mechanical characteristics 502 of a main rope.

The delay processing unit 504 estimates a lateral vibration at the position of the actuator 14 based on the lateral vibration information 101, the actuator displacement 103, and the delay time information 108. The delay processing unit 504 may estimate the lateral vibration by delaying a phase of the lateral vibration information 101 by an amount corresponding to the delay time information 108. The delay processing unit 504 outputs the estimated lateral vibration as the estimated lateral vibration 102 to the lateral vibration compensation command computation unit 51.

Figure 4A:
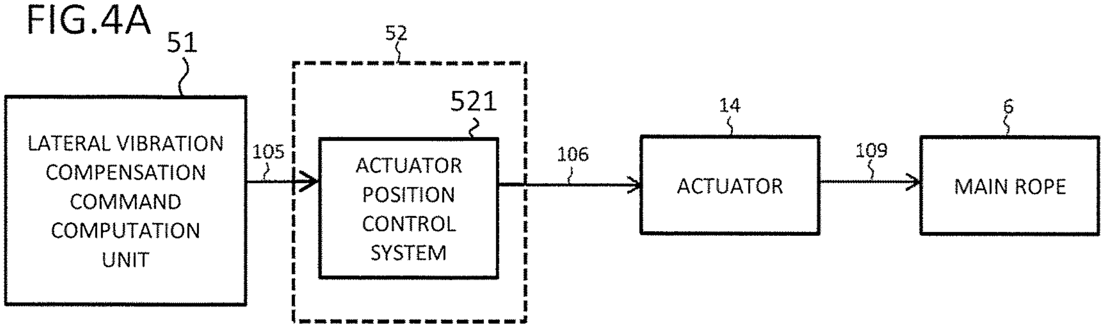
FIGS. 4A, 4B and 4C are block diagrams for illustrating a main part of the vibration damping device for an elevator rope according to the first embodiment of the present invention, the main part including an actuator drive unit.
Figure 4B:
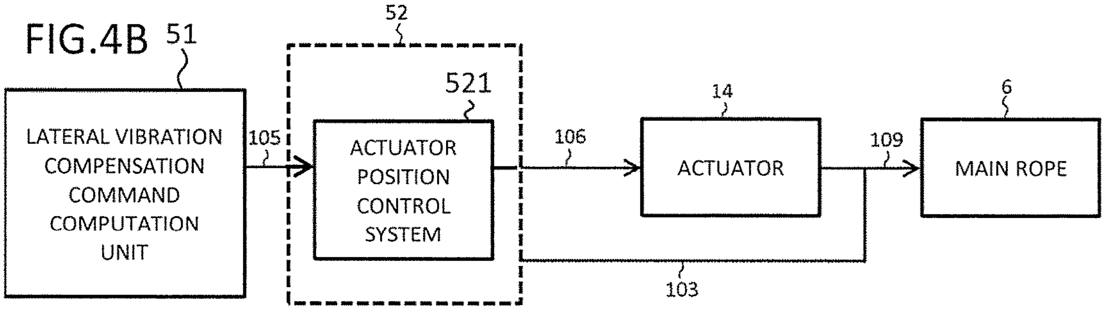
Figure 4C:
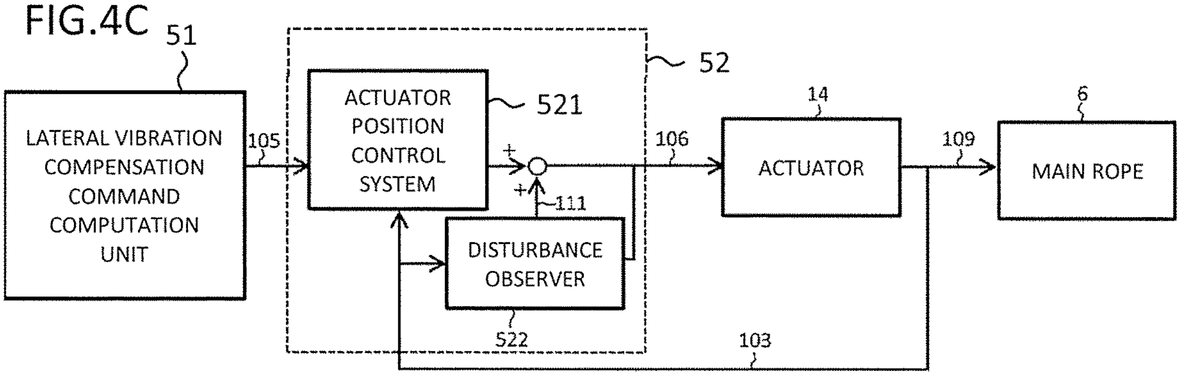

A structure and operation of the actuator drive unit 52 are described. FIGS. A. 4B and 4C are block diagrams for illustrating a main part of the vibration damping device for an elevator rope according to the first embodiment of the present invention, the main part including an actuator drive unit. FIG. 4A, FIG. 4B, and FIG. 4C show configuration examples of the actuator drive unit 52.

The actuator drive unit 52 acquires the lateral vibration compensation command value 105, calculates the drive input 106 based on the lateral vibration compensation command value 105, and outputs the drive input 106 to the actuator 14. The actuator drive unit 52 allows the forced displacement 109 of the actuator 14 to follow the lateral vibration compensation command value 105.

The drive input 106 is a signal for driving the actuator 14 so as to reduce a difference between the lateral vibration compensation command value 105 and the forced displacement 109 in response to a difference between the lateral vibration compensation command value 105 and the actuator displacement 103.

The actuator drive unit 52 illustrated in each of FIGS. 4A, FIG. 4B, and FIG. 4C includes an actuator position control system 521. The actuator position control system 521 controls the forced displacement 109, which is a displacement of the actuator 14, to approach the lateral vibration compensation command value 105 that is a target value.

The actuator drive unit 52 illustrated in FIG. 4A forms a feedforward control system. Based on the lateral vibration compensation command value 105, the actuator position control system 521 calculates the drive input 106 and drives the actuator.

In a case of the actuator drive unit 52 that forms the feedforward control system, the actuator drive unit 52 calculates, as the drive input 106, a value obtained by multiplying the lateral vibration compensation command value 105 by a predetermined coefficient. This coefficient can be calculated in response to a parameter of the vibration damping device 100 for an elevator rope, the parameter including a tension of the main rope, the rope length, and the like.

The actuator drive unit 52 illustrated in FIG. 4B forms a feedback control system. The actuator position control system 521 acquires the lateral vibration compensation command value 105, in addition, acquires the forced displacement 109 as the actuator displacement 103, and calculates the drive input 106 based on the lateral vibration compensation command value 105 and the actuator displacement 103.

In a case of the actuator drive unit 52 that forms the feedback control system, the actuator drive unit 52 acquires the actuator displacement 103, thereby obtaining the difference between the forced displacement 109 and the lateral vibration compensation command value 105. Then, the actuator drive unit 52 determines the drive input 106 so as to reduce the difference between the forced displacement 109 and the lateral vibration compensation command value 105.

The actuator drive unit 52 illustrated in FIG. 4C includes a disturbance observer 522 in addition to the configuration of FIG. 4B. The actuator drive unit 52 calculates the drive input 106 through use of a reaction force estimation value 111. Based on the drive input 106 and the actuator displacement 103, the disturbance observer 522 estimates a reaction force applied from the main rope 6, and outputs the estimated reaction force as the reaction force estimation value 111.

An output from the actuator position control system 521 is corrected by the reaction force estimation value 111, and the drive input 106 is calculated. The actuator drive unit 52 illustrated in FIG. 4C has a configuration of using the disturbance observer 522 in combination, and accordingly, the reaction force from the main rope 6 can be compensated, and the output from the actuator position control system 521 can be corrected in response to the reaction force estimation value 111.

Therefore, the actuator drive unit 52 illustrated in FIG. 4C can allow the forced displacement 109 to follow the lateral vibration compensation command value 105 with higher accuracy.

The actuator drive unit 52 is formed as described below, thereby not only the effect of suppressing the lateral vibration is exerted but also a vibration damping device for an elevator rope, from which the lateral vibration compensation command computation unit 51 is omitted, can be formed.

That is, the actuator drive unit 52 calculates the drive input 106 directly from the estimated lateral vibration 102. Then, the actuator drive unit 52 outputs the drive input 106 to the actuator 14, and drives the actuator 14 so that the direction of the forced displacement 109 and the direction of the estimated lateral vibration 102 become reverse to each other, and that a magnitude of the forced displacement 109 becomes smaller than the magnitude of the estimated lateral vibration 102.

Moreover, when the actuator drive unit 52 is formed as described below, a vibration damping device for an elevator rope, from which the lateral vibration compensation command computation unit 51 is omitted, and which is capable of reducing the amplitude of the lateral vibration with much higher accuracy, can be formed.

That is, the actuator drive unit 52 calculates the drive input 106 directly from the estimated lateral vibration 102, and outputs the drive input 106 to the actuator 14. Then, the actuator drive unit 52 drives the actuator 14 so that the phase of the forced displacement 109 and the phase of the estimated lateral vibration 102 become reverse to each other.

The signal that is output as the drive input 106 to the actuator 14 may be a value of the forced displacement 109, a speed of the forced displacement 109, an acceleration of the forced displacement 109, or the force by the forced displacement 109. When the actuator 14 includes a motor, a current value of a current supplied to the motor may be defined as the drive input 106. Moreover, a combination of a plurality of such signals mentioned here may be defined as the drive input 106.

Figure 5:
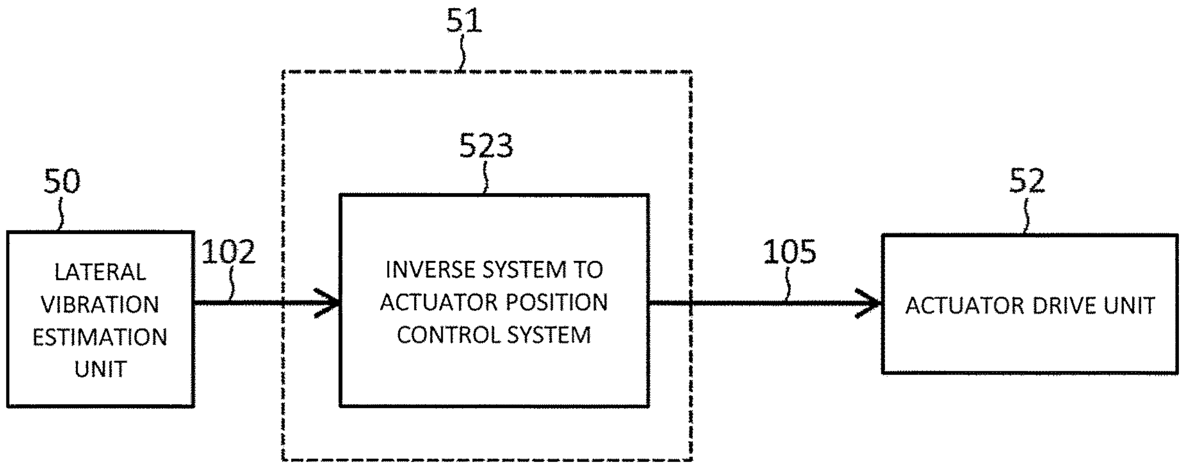
FIG. 5 is a block diagram for illustrating a main part of the vibration damping device for an elevator rope according to the first embodiment of the present invention, the main part including a lateral vibration compensation command computation unit.

FIG. 5 is a block diagram for illustrating a main part of the vibration damping device for an elevator rope according to the first embodiment of the present invention, the main part including the lateral vibration compensation command computation unit. The lateral vibration compensation command computation unit 51 includes a inverse system 523 to the actuator position control system. The inverse system 523 to the actuator position control system is formed of a transfer function of a inverse system to the actuator position control system 521.

A inverse system to a system serving as an object is a system that has a function of a reverse action to transfer characteristics of the system serving as an object, and is a system from which an input of the system serving as an object is output when an output of the system serving as an object is input thereto. The lateral vibration compensation command computation unit 51 calculates the lateral vibration compensation command value 105 based on the estimated lateral vibration 102. More specifically, the lateral vibration compensation command computation unit 51 calculates a value obtained by multiplying the transfer function of the inverse system 523 to the actuator position control system by the estimated lateral vibration 102.

Here, in order that the vibration damping device 100 for an elevator rope exerts the effect of suppressing the lateral vibration, it is only required that the lateral vibration compensation command computation unit 51 calculate the lateral vibration compensation command value 105 as below. That is, it is only required that the lateral vibration compensation command computation unit 51 calculate the lateral vibration compensation command value 105 so that the magnitude of the displacement of the lateral vibration compensation command value 105 becomes smaller than the magnitude of the displacement of the estimated lateral vibration 102, and that the direction of the displacement of the lateral vibration compensation command value 105 becomes reverse to the direction of the displacement of the estimated lateral vibration 102.

Moreover, when the lateral vibration compensation command computation unit 51 that calculates the lateral vibration compensation command value 105 so that the lateral vibration compensation command value 105 has a phase reverse to that of the estimated lateral vibration 102 is formed, the vibration damping device for an elevator rope can reduce the amplitude of the lateral vibration with higher accuracy.

As a relationship between the lateral vibration at the position of the actuator 14 and the forced displacement 109 becomes closer to a reverse phase, the accuracy with which the vibration damping device 100 for an elevator rope reduces the amplitude of the lateral vibration is increased. As the accuracy with which the vibration damping device 100 for an elevator rope reduces the amplitude of the lateral vibration is higher, the lateral vibration can be suppressed in a shorter period of time.

Figure 6:
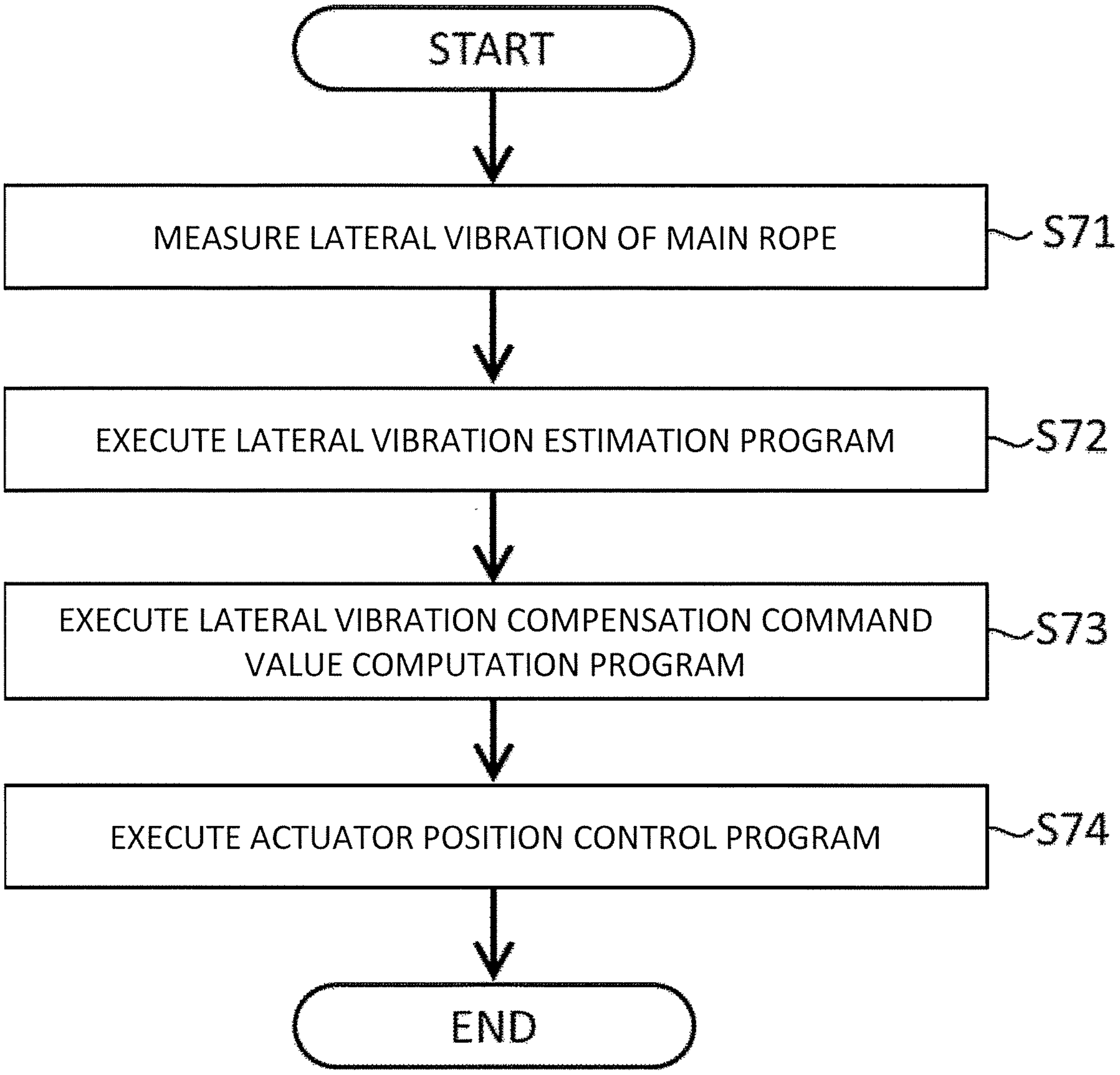
FIG. 6 is a flowchart for illustrating an outline of processing of the vibration damping device for an elevator rope according to the first embodiment of the present invention.

FIG. 6 is a flowchart for illustrating an outline of processing of the vibration damping device for an elevator rope according to the first embodiment of the present invention. The computation control device 13 may be formed so as to repeatedly perform processing from Step S71 to Step S74 at fixed time intervals.

In Step S71, the lateral vibration measuring unit 12 measures the lateral vibration of the main rope 6. In Step S72, the computation control device 13 executes a lateral vibration estimation program, estimates the lateral vibration of the main rope 6 generated by the reflected wave that reaches the position of the actuator 14, and outputs the estimated lateral vibration 102.

In Step S73, the lateral vibration compensation command computation unit 51 executes a lateral vibration compensation command value computation program, and calculates the lateral vibration compensation command value 105 based on the estimated lateral vibration 102.

In Step S74, the actuator drive unit 52 executes an actuator position control program, calculates the drive input 106 based on the lateral vibration compensation command value 105, and outputs the calculated drive input 106 to the actuator 14. The force generated by the forced displacement 109 is applied to the main rope 6, and the lateral vibration of the main rope 6 is suppressed.

Figure 7:
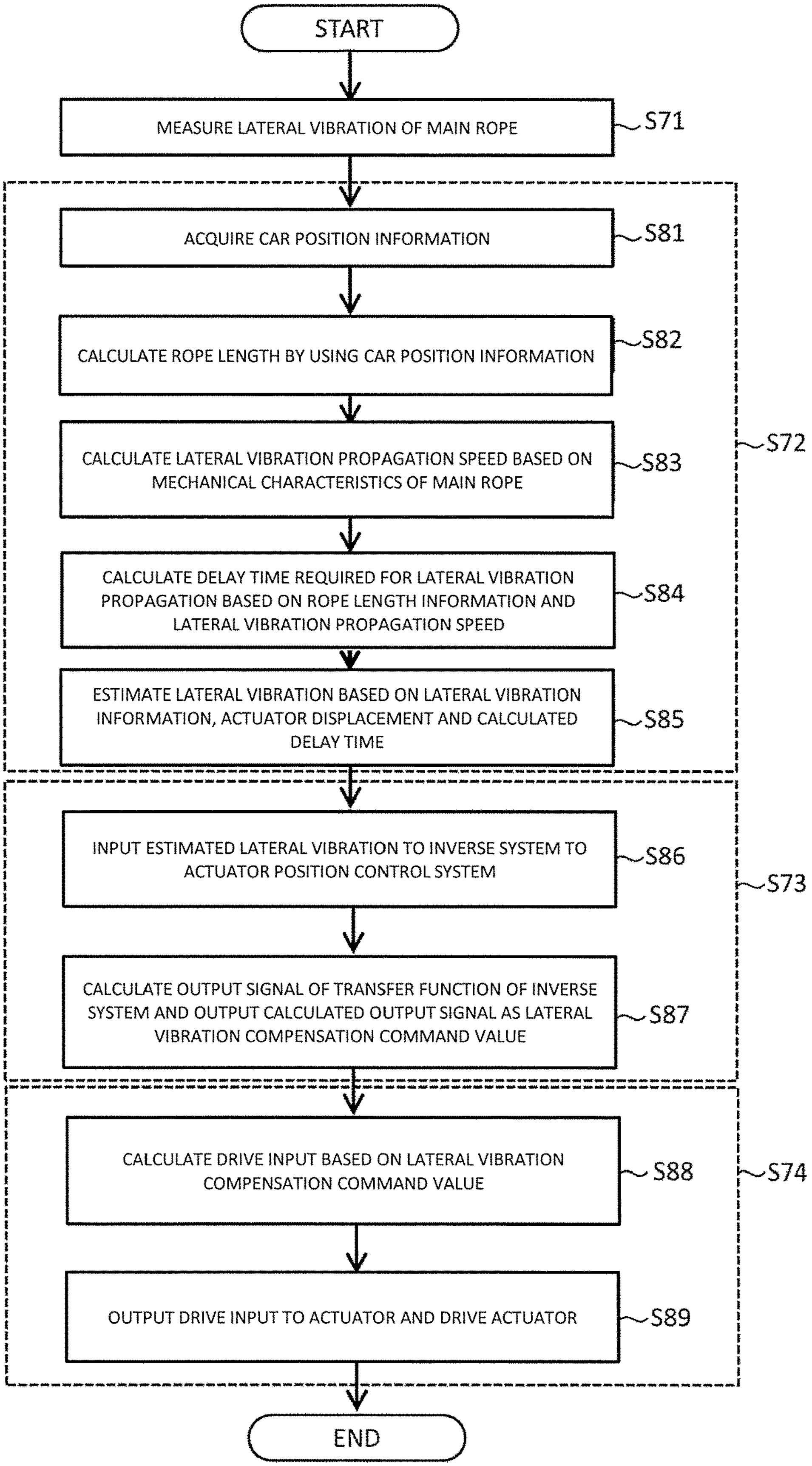
FIG. 7 is a flowchart for illustrating the processing of the vibration damping device for an elevator rope according to the first embodiment of the present invention.

FIG. 7 is a flowchart for illustrating the processing of the vibration damping device 100 for an elevator rope according to the first embodiment of the present invention. In FIG. 7, Step S71 to Step S74 in FIG. 6 are illustrated more in detail.

The processing of the lateral vibration estimation program in Step S72 is illustrated in Step S81 to Step S85 in FIG. 7. When the lateral vibration of the main rope 6 is measured in Step S71, the lateral vibration estimation unit 50 acquires the car position information 104 in Step S81. In Step S82, the rope length calculation unit 501 calculates the rope length through use of the car position information 104, and outputs the calculated rope length as the rope length information 107.

In Step S83, the delay time calculation unit 503 calculates a lateral vibration propagation speed based on the mechanical characteristics 502 of the main rope. In Step S84, based on the rope length information 107 and the lateral vibration propagation speed, the delay time calculation unit 503 calculates the delay time required for the lateral vibration to reach the position of the actuator 14 from the position of the lateral vibration measuring unit 12, and outputs the calculated delay time as the delay time information 108.

In Step S85, based on the estimating factors including the calculated delay time information 108, the lateral vibration information 101, and the actuator displacement 103, the delay processing unit 504 estimates the lateral vibration generated by the reflected wave at the position of the actuator 14 as the estimated lateral vibration 102.

The processing of the lateral vibration compensation command value computation program in Step S73 is illustrated in Step S86 and Step S87 in FIG. 7. When the lateral vibration estimation program in Step S72 is executed, in Step S86, the delay processing unit 504 inputs the estimated lateral vibration 102 to the inverse system 523 to the actuator position control system. That is, the delay processing unit 504 inputs the estimated lateral vibration 102 to the transfer function of the inverse system 523 to the actuator position control system.

In Step S87, the lateral vibration compensation command computation unit 51 outputs an output signal of the inverse system 523 to the actuator position control system as the lateral vibration compensation command value 105 to the actuator drive unit 52. The above is the processing of the lateral vibration compensation command value computation program of Step S73.

The processing of the actuator position control program in Step S74 is illustrated in Step S88 and Step S89 in FIG. 7. When the lateral vibration compensation command value computation program is executed in Step S73, in Step S88, the actuator drive unit 52 calculates the drive input 106 based on the lateral vibration compensation command value 105.

In Step S89, the actuator drive unit 52 outputs the drive input 106 to the actuator 14, and drives the actuator 14. The force generated by the forced displacement 109 is applied to the main rope 6 by the actuator 14. Such a vibration damping device 100 for an elevator rope, which does not use the transfer function, can also be formed.

Such a vibration damping device 100 for an elevator rope, which performs the calculation through use of the transfer function, can also be formed. An operation of the vibration damping device 100 for an elevator rope, which uses the transfer function, is described. In the following description, exp(p) is an exponential function, and represents a p-th power of a natural logarithm e.

The length of the main rope 6 from the first end portion e1 to the contact point e2 is defined as L. When the contact point e2 is defined as an origin point, and a lateral vibration of the main rope 6 at a point of time t at a position away by a distance of x from the contact point e2 toward the first end portion e1 is defined as v(x,t), v(x,t) satisfies a wave equation in Equation (1).

[Math. 1]

$$\frac{\partial^2 v(x,t)}{\partial t^2} = c^2 \frac{\partial^2 v(x,t)}{\partial x^2} \quad (1)$$

where c is a propagation speed of the lateral vibration. Such a lateral vibration propagation speed c can be calculated through use of Equation (2). A rope tension T is a tension of the main rope 6. ρ is a mass of the main rope 6 per unit length. It is assumed that the actuator 14 is placed at the contact point e2 (x=0).

[Math. 2]

$$c=\sqrt{T/\rho} \quad (2)$$

v(x,t) that is the lateral vibration of the main rope 6 satisfies Equation (3) and Equation (4). Equation (3) and Equation (4) are boundary conditions. Equation (3) represents that, at the contact point e2 (position of x=0), a force generated by a displacement disturbance $V_{ext}$ and $V_{in}$ that is the forced displacement 109 is applied to the main rope 6. Equation (4) represents that the first end portion e1 (position of x=L) is a fixed end.

Here, the displacement disturbance $V_{ext}$ is a displacement of a shake of the building 300 at the contact point e2. Resulting from the displacement disturbance $V_{ext}$, the lateral vibration of the main rope 6 is generated at the contact point e2. $V_{in}$ is the forced displacement 109.

[Math. 3]

$$v(0,t)=V_{in}+V_{ext} \quad (3)$$

[Math. 4]

$$v(L,t)=0 \quad (4)$$

Equation (5) and Equation (6) represent that both of initial conditions of the lateral vibration of the main rope 6 and a temporal change in lateral vibration are 0.

[Math. 5]

$$v(x,0)=0 \quad (5)$$

[Math. 6]

$$\frac{\partial v(x,0)}{\partial t} = 0 \quad (6)$$

A solution of Equation (1) that satisfies Equation (3) to Equation (6) can be represented by Equation (7). Equation (7) is a transfer function.

[Math. 7]

$$V(x,s) = \frac{\exp\left(-\frac{x}{c}s\right) - \exp\left(-\frac{2L-x}{c}s\right)}{1-\exp\left(-\frac{2L}{c}s\right)}(V_{in}+V_{ext}) \quad (7)$$

Equation (7) is described. s is a Laplace operator. A transfer function in a form of $\exp(-T_d s)$ represents a dead time element. This transfer function in the form of $\exp(-T_d s)$ has an effect of delaying an output signal by a time $T_d$ with respect to an input signal, and represents the propagation of the lateral vibration. The transfer function of the dead time is infinite-dimensional and includes information in a wide frequency range.

Therefore, the lateral vibration generated in the main rope 6, the lateral vibration including a lateral vibration with a high-order resonance frequency, can be modeled. Here, a first item of a numerator and a second item of the numerator in a portion of a right side in Equation (7), the portion being indicated by a fraction, are described.

exp(−xs/c) in the first item of the numerator corresponds to the traveling wave that reaches a position x, the traveling wave propagating from the contact point e2 of the main rope 6. That is, exp(−xs/c) represents that a lateral vibration generated at x=0 by the displacement disturbance $V_{ext}$ and a lateral vibration generated at x=0 by $V_{in}$ that is the forced displacement 109 are delayed by a time of x/c, and reach the position x.

−exp(−(2L−x)s/c) in the second item of the numerator represents that the traveling wave is reflected by the first end portion e1, and as a reflected wave, reaches the position x. That is, −exp(−(2L−x)s/c) represents that the lateral vibration generated by the displacement disturbance $V_{ext}$ and $V_{in}$ that is the forced displacement 109 is delayed by a time of (2L−x)/c, and reaches the position x.

Next, a denominator in the right side of Equation (7) has exp(−2Ls/c) that is a dead time element. The dead time element exp(−2Ls/c) corresponds to the reflected wave formed in such a manner that the traveling wave propagates from the contact point e2 to the first end portion e1, is reflected by the first end portion e1, and returns from the first end portion e1 to the contact point e2. That is, the lateral vibration generated by the overlapping of the traveling wave and the reflected wave is expressed in Equation (7).

When Equation (7) is deformed while setting the displacement disturbance $V_{ext}$ as $V_{ext}=0$, Equation (8) is established.

[Math. 8]

$$V(x, s) = \exp\left(-\frac{x}{c}s\right)(V_{in} - V_{rfl}) \tag{8}$$

Here, a second item of a right side in Equation (8) represents the reflected wave, and $V_{rfl}$ is represented by Equation (9).

[Math. 9]

$$V_{rfl} = \exp\left(-\frac{2(L-x)}{c}s\right)V_{in} - \exp\left(\frac{(2L-x)}{c}s\right)V(x, s) \tag{9}$$

The vibration damping device 100 for an elevator rope determines the transfer function V(x,s) based on the lateral vibration information 101, and can estimate the lateral vibration at the position of the actuator 14 through use of the determined transfer function V(x,s). Moreover, the vibration damping device 100 for an elevator rope define $V_{in}$ as in Equation (10), and can thereby generate the forced displacement 109 that is reverse in phase to the estimated lateral vibration 102.

[Math. 10]

$$V_{in}=V_{rfl} \tag{10}$$

From Equation (10), the transfer function in Equation (7) is expressed as Equation (11).

[Math. 11]

$$V(x, s) = \exp\left(-\frac{x}{c}s\right)\left(1 - \exp\left(-\frac{2(L-x)}{c}s\right)\right)V_{ext} \tag{11}$$

Equation (11) is a transfer function V(x,s) that defines the displacement disturbance $V_{ext}$ as an input signal and the lateral vibration of the main rope 6 as an output signal. In Equation (11), the reflected wave included in Equation (7) is removed by the vibration damping device 100 for an elevator rope, and the dead time element in the denominator of the transfer function, the dead time element corresponding to the reflected wave included in Equation (7), is removed.

Figure 8:
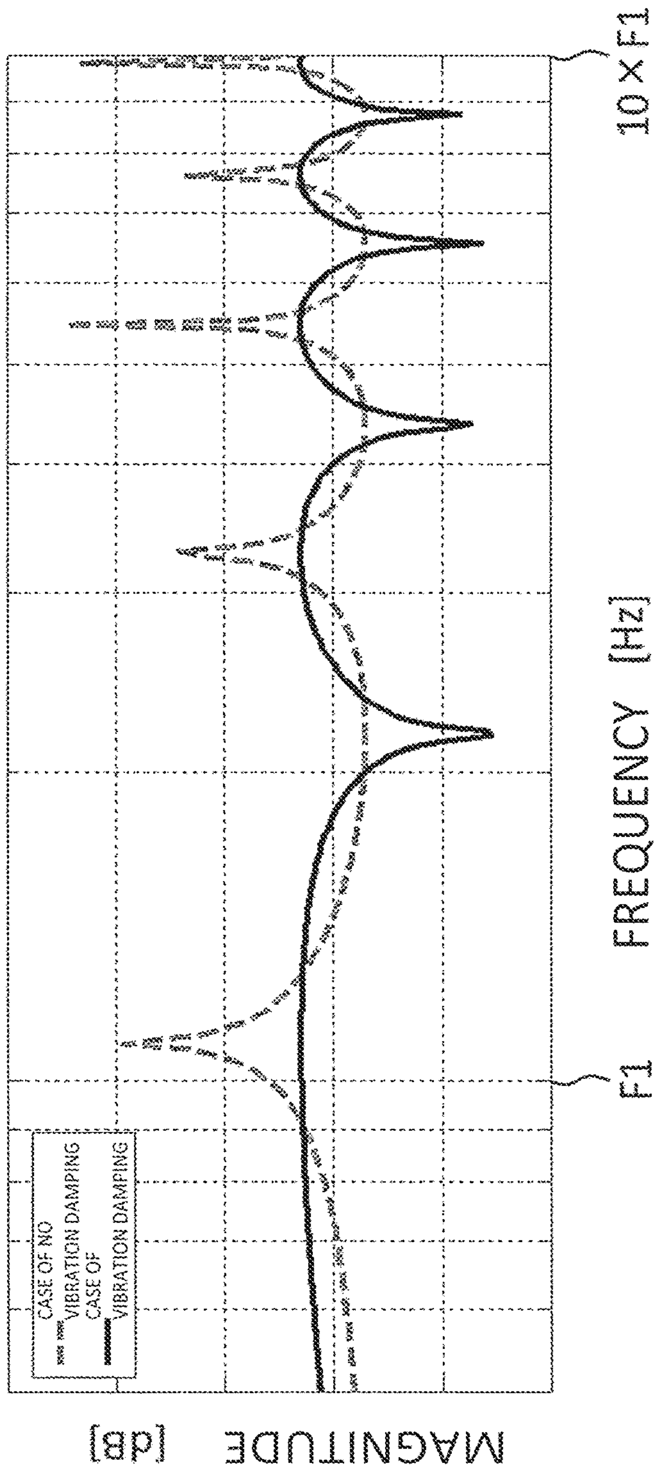
FIG. 8 is a graph for showing calculated values of frequency responses of the vibration damping device for an elevator rope according to the first embodiment of the present invention.

FIG. 8 is a graph for showing calculated values of frequency responses of the vibration damping device 100 for an elevator rope according to the first embodiment of the present invention. A vertical axis of FIG. 8 is an amplitude of the lateral vibration, which is expressed in the unit of decibel (dB). A horizontal axis of FIG. 8 is a frequency of the lateral vibration, which is expressed in the unit of hertz (Hz) through use of a logarithmic axis. On the horizontal axis, a position of a frequency F1 and a position of a frequency 10×F1 are illustrated as indices of the frequency. The frequency F1 is a constant.

In FIG. 8, the frequency response of the transfer function in Equation (7) and the frequency response of the transfer function in Equation (11) are shown. The frequency response generated by the transfer function in Equation (7) is a frequency response at the case of no vibration damping, and is indicted by a broken line. The frequency response generated by the transfer function in Equation (11) is a frequency response at the case of vibration damping, and is indicted by a solid line. FIG. 8 shows a calculation example using typical numeric values of an elevator apparatus.

In FIG. 8, a plurality of resonance peaks observed in the frequency response at the case of the no vibration damping entirely disappear in the frequency response at the case of the vibration damping. In the frequency response at the case of the vibration damping, the amplitude of the reflected wave is reduced by the vibration damping device 100 for an elevator rope, and the generation of the standing wave is suppressed. In the frequency response at the case of the vibration damping, a non-resonance state is obtained for all the resonance frequencies.

With use of Equation (1) to Equation (11), the estimation of the lateral vibration, which uses the transfer function, and the calculation of the lateral vibration compensation command value 105, which uses the transfer function, are described.

In the vibration damping device for an elevator rope according to the first embodiment, such a lateral vibration estimation unit 50 that estimates the lateral vibration through use of the transfer function V(x,s) may be formed, and a lateral vibration compensation command computation unit 51 that calculates the lateral vibration compensation command value 105 through use of the transfer function V(x,s) may be formed.

The vibration damping device 100 for an elevator rope can also be formed through use of an approximated transfer function. As an example, approximation of Pade approximation may be performed for the transfer function of the dead time included in the transfer functions described in Equation (1) to Equation (11).

The vibration damping device 100 for an elevator rope, which uses a transfer function, calculates the transfer function V(x,s) that associates the input signal and the output signal with each other. Here, the input signal is the displacement disturbance $V_{ext}$ and $V_{in}$ that is the forced displacement. The output signal is the lateral vibration on the elevator rope. Here, the output signal includes at least the lateral vibration at the actuator position. For example, the lateral vibration at each position within the vibration damping range R may be defined as the output signal.

The calculated transfer function is a solution of the wave equation that uses, as variables, the time t and the position x on the coordinate axis set in parallel to the main rope 6. Moreover, this transfer function includes the Laplace operator s, and can be calculated through use of the lateral vibration propagation speed c, the position of the actuator 14, the position of the generation spot of the lateral vibration, the position of the lateral vibration measuring unit, and the lateral vibration information 101.

Moreover, the actuator drive unit 52 may be formed so as to calculate the drive input 106 from the estimated lateral vibration 102 by the calculation using the transfer function V(x,s), and such a vibration damping device 100 for an elevator rope, which does not include the lateral vibration compensation command computation unit 51 and uses the transfer function, can also be formed.

When the car 7 travels in the elevator apparatus 200, the rope length L changes depending on the position of the car 7, and the positions of the resonance peaks in the frequency domain change. The vibration damping device 100 for an elevator rope, which uses the transfer function including the dead time, suppresses the lateral vibration with high accuracy in response to the change in position of the car 7, and can reduce the magnitude of the resonance peak quickly and accurately even during traveling of the car.

Moreover, the vibration damping device 100 for an elevator rope, which uses the transfer function including the dead time, can reduce the amplitude of the lateral vibration quickly and accurately in a wider frequency range. That is, the vibration damping device 100 for an elevator rope can suppress a resonance of a lateral vibration in a higher-order vibration mode.

In the description of the equations, a calculation example in which the actuator is placed at the position of x=0 is illustrated. Also, in a case in which the actuator 14 is placed at a position other than x=0, the vibration damping device 100 for an elevator rope, which uses the transfer function, can be formed through use of the transfer function including the position coordinates of the actuator 14.

Figure 9A:
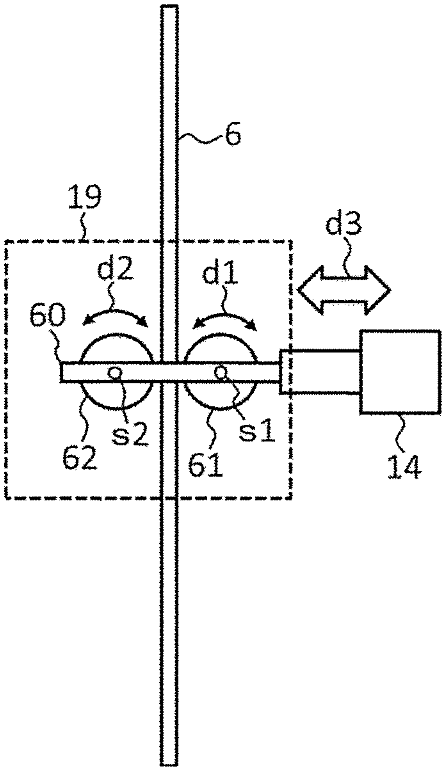
FIGS. 9A and 9B are views for illustrating configurations of a roller-type rope gripping portion and an actuator according to the first embodiment of the present invention.
Figure 9B:
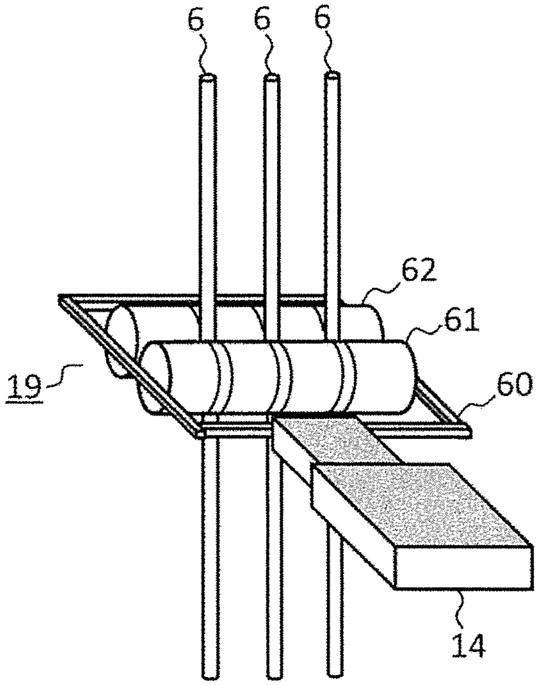

A roller-type rope gripping portion of the first embodiment of the present invention is described. FIGS. 9A and 9B are views for illustrating configurations of the roller-type rope gripping portion and the actuator according to the first embodiment of the present invention. The force generated by the forced displacement 109 is applied to the main ropes 6 through the roller-type rope gripping portion 19. FIG. 9A is a side view of the roller-type rope gripping portion 19, and FIG. 9B is a perspective view of the roller-type rope gripping portion 19.

The roller-type rope gripping portion 19 includes a frame portion 60, a first roller 61, and a second roller 62. The rectangular frame portion 60 is provided so as to surround peripheries of the main ropes 6 formed of three wires. The first roller 61 and the second roller 62 are provided on both sides of the main ropes 6. The first roller 61 and the second roller 62 can rotate as indicated by an arrow d1 and an arrow d2, respectively about a shaft portion s1 and a shaft portion s2, which are taken as rotation axes, respectively.

The frame portion 60 has a structure of holding the shaft portion s1 of the first roller 61 and the shaft portion s2 of the second roller 62. With regard to the main ropes 6 in FIGS. 9A and 9B, only portions around the roller-type rope gripping portion 19 are illustrated. On the first roller 61 and the second roller 62, grooves matched with a shape of the main ropes 6 are provided.

The frame portion 60 is fixed to a movable portion of the actuator 14. The movable portion of the actuator 14 moves in a direction of an arrow d3, and applies the force generated by the forced displacement 109 to the main ropes 6. In the state in which the lateral vibration is not generated in the main ropes 6, there are gaps between the main ropes 6 and the first and second rollers 61 and 62, and the main ropes 6 are not brought into contact with the roller-type rope gripping portion 19 even when the car 7 travels.

Figure 10A:
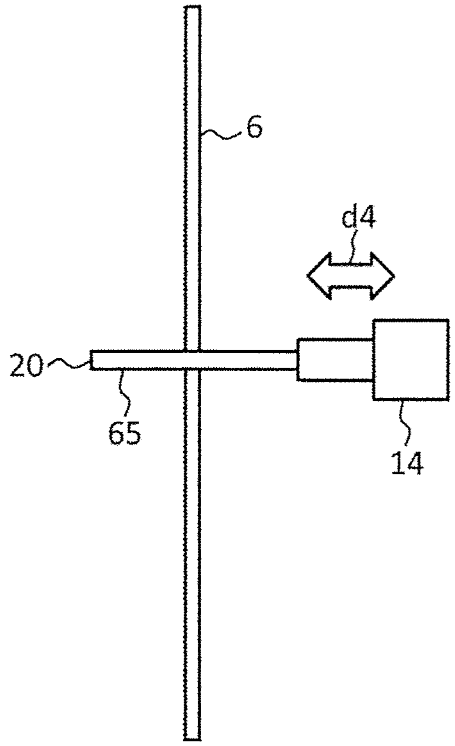
FIGS. 10A and 10B are views for illustrating configurations of a through-type rope gripping portion and an actuator according to the first embodiment of the present invention.
Figure 10B:
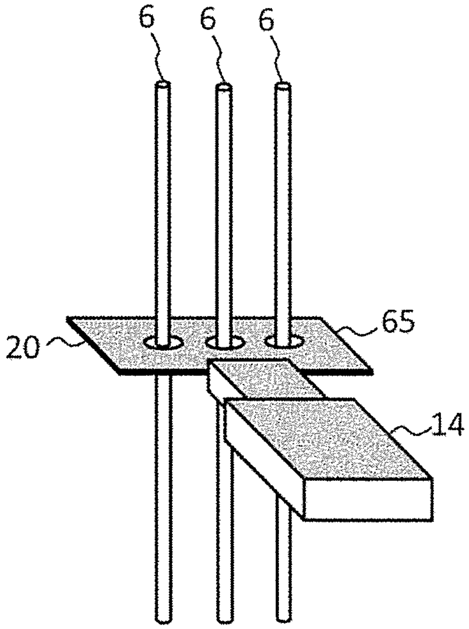

A through-type rope gripping portion can also be used in place of the roller-type rope gripping portion 19. FIGS. 10A and 10B are views for illustrating configurations of the through-type rope gripping portion and the actuator according to the first embodiment of the present invention. FIG. 10A is a perspective view of the configurations. A through-type rope gripping portion 20 is formed of a flat plate member 65.

The flat plate member 65 is fixed to the actuator 14, and the main ropes 6 penetrate opening portions of the flat plate member 65. There are gaps between the opening portions of the flat plate member 65 and the main ropes 6, and in a state in which the lateral vibration is not generated in the main ropes 6, the main ropes 6 are not brought into contact with the flat plate member 65 even when the car 7 travels.

When the actuator 14 is driven, the force generated by the forced displacement 109 is applied to the main ropes 6 through the through-type rope gripping portion 20. The opening portions of the flat plate member 65 may be subjected to resin material coating so that the main ropes 6 are not damaged when the main ropes 6 are brought into contact therewith. Moreover, a resin material cover may be provided on the main ropes 6.

In the first embodiment, measurement by image processing may be performed through use of an imaging element as the lateral vibration measuring unit 12 in place of the displacement sensor. Moreover, the lateral vibration of the main ropes 6 may be estimated based on a discrete sensor output through use of, as the lateral vibration measuring unit 12, a sensor configured to output a signal when the amplitude of the lateral vibration reaches a predetermined distance.

The vibration damping device 100 for an elevator rope according to the first embodiment treats the main ropes 6 as objects of which lateral vibration is to be suppressed. The compensation rope 9 or a governor rope can also be treated as the object of which lateral vibration is to be suppressed, and the vibration damping device for an elevator rope according to the present invention can also be applied thereto.

The vibration damping device for an elevator rope may be formed so that the lateral vibration measuring unit 12 and the actuator 14 are connected to a cloud, and that a computer on the cloud executes the processing to be performed by the computation control device 13. In this case, the computation control device 13 is not included in the elevator apparatus 200. Moreover, the computation control device 13 and the lateral vibration measuring unit 12 may be connected to each other by a communication network, and the lateral vibration information 101 may be transmitted and received therebetween through the communication network. In this case also, the computation control device 13 is located outside the elevator apparatus 200.

In a case of estimating the lateral vibration of the elevator rope based on only the shake of the building, it is required to reflect such an external factor of the elevator apparatus as the structure of the building and arrangement of the hoistway in the building. Therefore, a new examination is required for each of the buildings, and versatility of the vibration damping device for an elevator rope is low. Moreover, in such a vibration damping device for an elevator rope as described above, it is difficult to increase accuracy of the estimation.

Meanwhile, in the case of calculating influences of the propagation of the lateral vibration and the reflection of the lateral vibration based on the measured lateral vibration of the elevator rope and estimating the lateral vibration of the elevator rope, the lateral vibration can be estimated with high accuracy through use of the equations. Moreover, the propagation of the lateral vibration and the reflection of the lateral vibration are phenomena which occur in the elevator rope, and accordingly, an estimation result of the lateral vibration does not depend on the structure of the building, and the versatility of the vibration damping device for an elevator rope is high.

Therefore, the vibration damping device for an elevator rope according to the first embodiment can generate the forced displacement, which has a phase reverse to that of the lateral vibration at the position of the actuator, in the actuator 14 with high accuracy. The vibration damping device for an elevator rope according to the first embodiment can suppress the lateral vibration and the generation of the resonance of the lateral vibration quickly and reliably, and accordingly, can avoid the damage to the instruments provided in the hoistway, and can reduce degradation of a riding comfort of a passenger.

The vibration damping device for an elevator rope according to the first embodiment can provide a vibration damping device for an elevator rope, which is configured to measure a lateral vibration of an elevator rope, to estimate a lateral vibration at a position of an actuator based on estimating factors including the measured lateral vibration, and to thereby reduce an amplitude of the lateral vibration of the elevator rope with high accuracy.

In the vibration damping device 100 for an elevator rope according to the first embodiment, the actuator 14 is placed in the hoistway 1 or the machine room 2, and accordingly, such an actuator 14 that has large size and weight can be used in comparison with a case in which the actuator 14 is placed on the car 7. Moreover, since the actuator 14 does not travel together with the car, a deterioration caused by the travel of the car 7 does not occur in the actuator 14.

In the vibration damping device for an elevator rope according to the first embodiment, the actuator 14 is placed in the hoistway 1 or the machine room 2. Therefore, the vibration damping device 100 for an elevator rope according to the first embodiment can freely select spots at which the lateral vibration measuring unit 12 and the actuator 14 are placed. The actuator 14 is placed at a spot away from the fixed end, thereby the vibration can be damped efficiently with a small force.

In the vibration damping device 100 for an elevator rope according to the first embodiment, the actuator 14 is placed in the hoistway 1 or the machine room 2. Therefore, the vibration damping device for an elevator rope according to the first embodiment is restricted less when a new vibration damping device for an elevator rope is additionally placed in the existing elevator apparatus in comparison with a case in which a device that applies a vibration damping force to the main ropes 6 is provided on the car.

In the vibration damping device 100 for an elevator rope according to the first embodiment, the actuator 14 and the lateral vibration measuring unit 12 are placed in the hoistway 1 or the machine room 2, and accordingly, operation accuracy of the actuator 14 and the lateral vibration measuring unit 12 does not decrease due to the motion of the car 7.

Therefore, in comparison with a case in which the actuator 14 or the lateral vibration measuring unit 12 is placed on the car 7, the vibration damping device 100 for an elevator rope according to the first embodiment can measure the lateral vibration with high accuracy, and can apply the force generated by the forced displacement 109 to the main ropes 6 with high accuracy.

The vibration damping device 100 for an elevator rope according to the first embodiment estimates the lateral vibration through use of the transfer function including the dead time element. Therefore, the vibration damping device 100 for an elevator rope according to the first embodiment can reduce the amplitude of the lateral vibration in a wide frequency range with high accuracy in a short period of time even under a situation in which the position of the car changes.

Moreover, the vibration damping device 100 for an elevator rope according to the first embodiment includes the car position measuring unit 11, and further uses the transfer function, and can thereby estimate the lateral vibration at each point of time in response to the change in rope length. Therefore, the vibration damping device 100 for an elevator rope according to the first embodiment can reduce the amplitude of the lateral vibration with high accuracy even in a state in which the car travels.

The vibration damping device for an elevator rope according to the first embodiment estimates the lateral vibration based on the estimating factors including the actuator displacement 103 in addition to the lateral vibration information 101, and accordingly, can estimate the lateral vibration while reflecting the influence of the forced displacement 109. Particularly, in a case of estimating the lateral vibration after the force generated by the forced displacement 109 is applied to the main ropes 6, the vibration damping device 100 for an elevator rope according to the first embodiment can estimate the lateral vibration with higher accuracy.

In the vibration damping device 100 for an elevator rope, the propagation directions of the traveling wave and the reflected wave may be reversed to those of the configuration illustrated in FIG. 1A. That is, the vibration damping device for an elevator rope may be formed to estimate a reflected wave that propagates vertically downward. In the vibration damping device 100 for an elevator rope, the lateral vibration measuring unit 12 may measure the traveling wave or may measure the reflected wave. Moreover, the lateral vibration estimation unit 50 may estimate the traveling wave or may estimate the reflected wave.

Second Embodiment

Figure 11A:
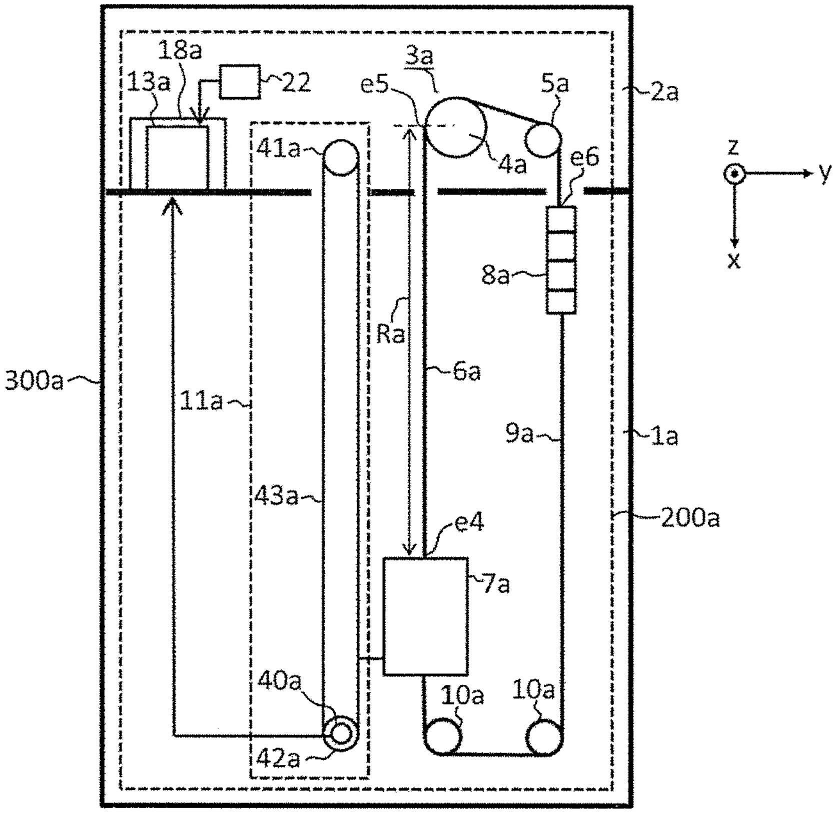
FIGS. 11A and 11B are schematic views for an elevator apparatus according to a second embodiment of the present invention, the elevator apparatus including an accelerometer.
Figure 11B:
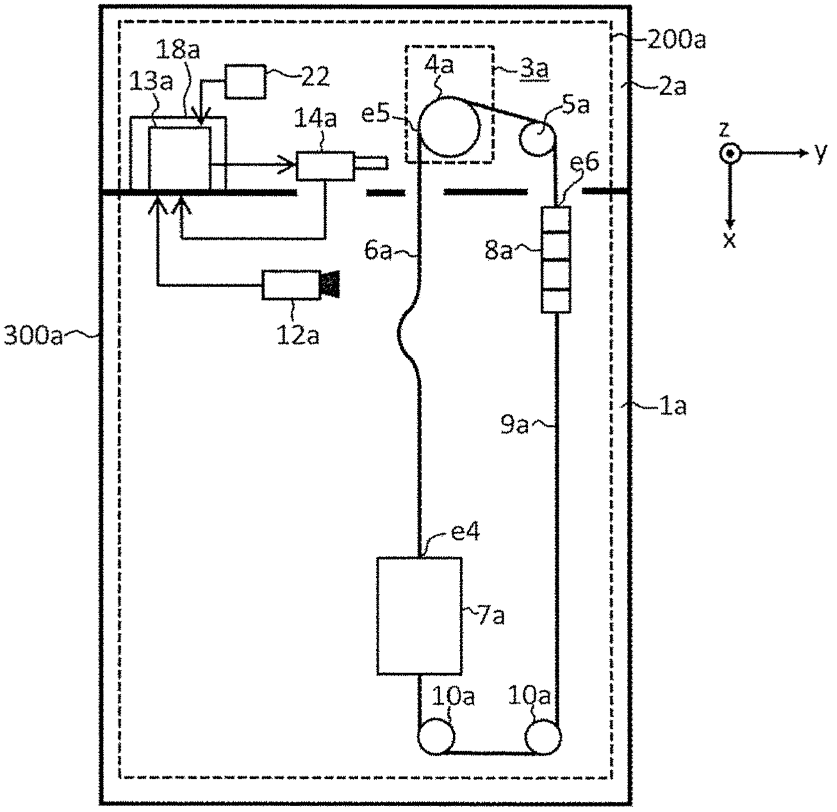

A vibration damping device for an elevator rope according to a second embodiment includes a building shake detection unit configured to detect a shake of a building. FIGS. 11A and 11B are schematic views of an elevator apparatus according to the second embodiment of the present invention, the elevator apparatus including an accelerometer. In a description regarding FIGS. 11A and 11B to FIG. 13, a description of portions in each of which a configuration and an operation are the same as those in the configuration of the first embodiment is omitted.

Components illustrated in FIGS. 11A and 11B are included in the elevator apparatus 200*a*, except for a building 300*a* and also a hoistway 1*a* and a machine room 2*a* being parts of the building 300*a*. Moreover, a vibration damping device 100*a* for an elevator rope is a part of the elevator apparatus 200*a*.

In FIG. 11A and FIG. 11B, an x-axis, a y-axis, and a z-axis in a 3-axis orthogonal coordinate system are illustrated. The x-axis is set in parallel to a portion of a vibration damping range Ra of each of main ropes 6*a*. Moreover, a positive direction of the x-axis corresponds to a vertically downward direction. In FIG. 11A, a lateral vibration measuring unit 12*a* and an actuator 14*a* are not illustrated. Moreover, in FIG. 11B, a car position measuring unit 11*a* is not illustrated.

In FIG. 11A, a hoistway 1*a* through which a car 7*a* moves up and down is illustrated. The machine room 2*a* is present on the hoistway 1*a*. Arrangement of the building 300*a*, the hoistway 1*a*, and the machine room 2*a* is the same as the arrangement of the building 300, the hoistway 1, and the machine room 2 in FIG. 1C.

A hoisting machine 3*a* and a deflector sheave 5*a* are placed in the machine room 2*a*. The hoisting machine 3*a* includes a driving sheave 4*a*, a hoisting-machine motor (not shown), and a hoisting-machine brake (not shown). The hoisting machine 3*a* rotates the driving sheave 4*a*, and the hoisting-machine motor brakes the rotation of the driving sheave 4*a*.

A plurality of main ropes 6*a* are wound around the driving sheave 4*a* and the deflector sheave 5*a*. The car 7*a* is suspended at a first end portion e4 of each of the main ropes 6*a*. A second end portion e6 of the main rope 6*a* is connected to a counterweight 8*a*.

A portion of the main rope 6*a* located closest to the car 7*a* among portions of the main rope 6*a* in contact with the driving sheave 4*a* is defined as a contact point e5. That is, the contact point e5 is a boundary between the portion of the main rope 6*a* in contact with the driving sheave 4*a* and a portion of the main rope 6*a* in non-contact with the driving sheave 4*a*.

The vibration damping range Ra of the vibration damping device 100*a* for an elevator rope is a portion between the first end portion e4 and the contact point e5 in the main rope 6*a*. The vibration damping range Ra is illustrated in FIG. 11A, and is not illustrated in FIG. 11B. In the inside of the hoistway 1*a*, there are placed a pair of car guiderails (not shown) configured to guide the lifting and lowering of the car 7*a* and a pair of counterweight guiderails (not shown) configured to guide the lifting and lowering of the counterweight 8*a*.

The car 7*a* and the counterweight 8*a* are connected to each other by a compensation rope 9*a*. Two compensating sheaves 10*a* are provided in a bottom portion of the hoistway 1*a*. The compensation rope 9*a* is wound around the compensating sheaves 10*a*.

In the inside of the hoistway 1*a*, the car position measuring unit 11*a* configured to measure a position of the car 7*a* in the x-axis direction is provided. An operation and structure of the car position measuring unit 11*a* are the same as those of the car position measuring unit 11 in the first embodiment. A variety of instruments (not shown) related to the travel of the car 7*a* are placed inside the hoistway 1*a*, and the variety of instruments are controlled by a control panel 18*a*.

Next, FIG. 11B is described. A description of the components of the elevator apparatus 200*a*, which are described in FIG. 11A, is omitted. In the machine room 2*a*, there are placed the control panel 18*a*, a computation control device 13*a* provided in the control panel 18*a*, the actuator 14*a*, and a building shake detection unit 22.

The lateral vibration measuring unit 12*a* is placed in the hoistway 1*a*. The lateral vibration measuring unit 12*a* is a non-contact displacement sensor. The actuator 14*a* is placed in the machine room 2*a*, and the actuator 14*a* is of a linear motion type. The actuator 14*a* may be placed inside the hoistway 1*a*. The lateral vibration measuring unit 12*a* and the actuator 14*a* are placed within the vibration damping range Ra.

Similarly to the first embodiment, the computation control device 13*a* includes a lateral vibration estimation unit 50*a*, a lateral vibration compensation command computation unit 51*a*, and an actuator drive unit 52*a*. Structures and operations of the lateral vibration compensation command computation unit 51*a* and the actuator drive unit 52*a* are the same as the structures and operations of the lateral vibration compensation command computation unit 51 and the actuator drive unit 52.

Figure 12:
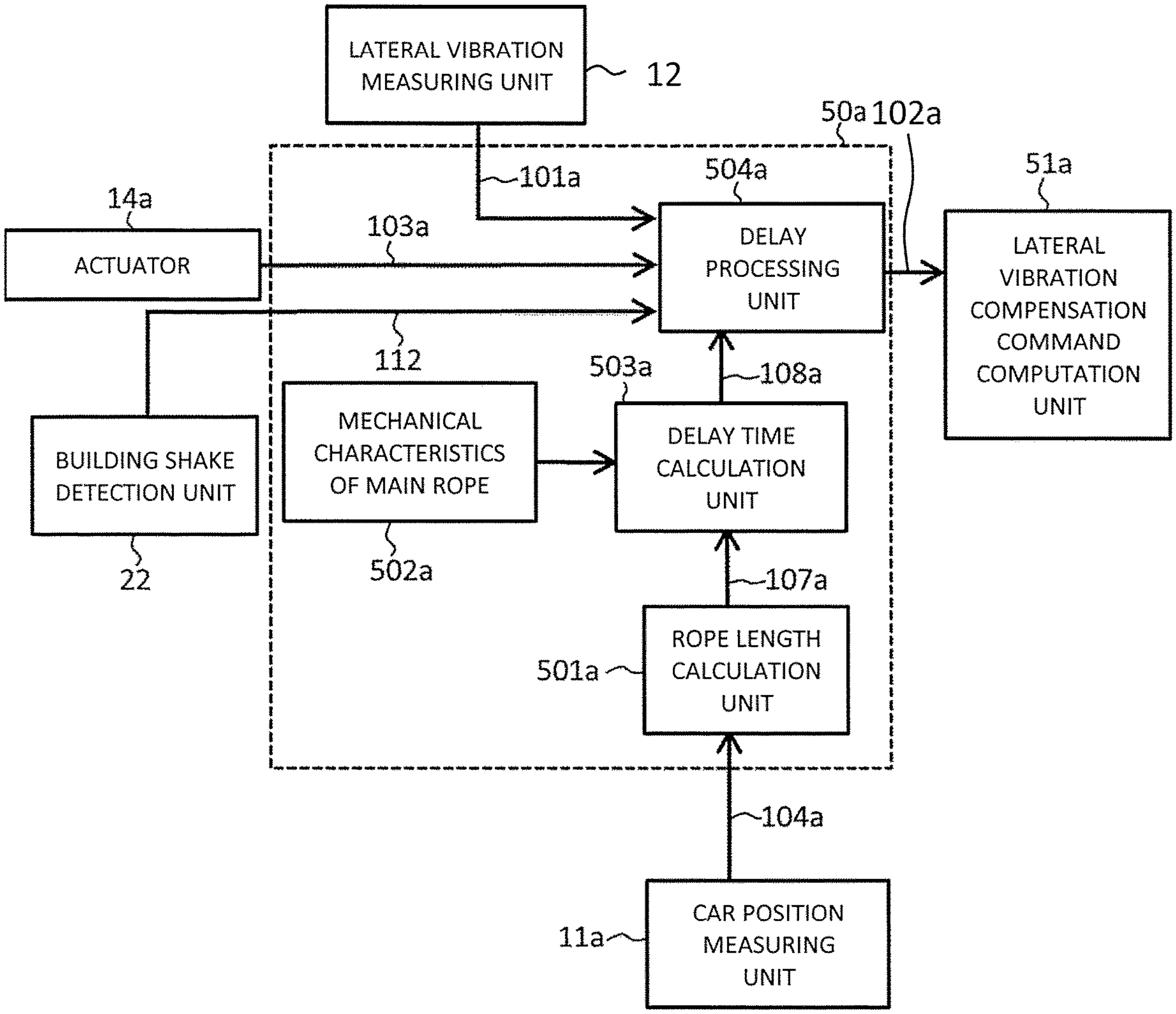
FIG. 12 is a block diagram for illustrating a main part of a vibration damping device for an elevator rope according to the second embodiment of the present invention, the main part including a lateral vibration estimation unit.

FIG. 12 is a block diagram for illustrating a main part of the vibration damping device for an elevator rope according to the second embodiment of the present invention, the main part including the lateral vibration estimation unit. The lateral vibration estimation unit 50*a* includes a rope length calculation unit 501*a*, mechanical characteristics 502*a* of a main rope, a delay time calculation unit 503*a*, and a delay processing unit 504*a*.

Structures and operations of the car position measuring unit 11*a*, the rope length calculation unit 501*a*, the mechanical characteristics 502*a* of a main rope, and the delay time calculation unit 503*a* are the same as the structures and operations of the car position measuring unit 11, the rope length calculation unit 501, the mechanical characteristics 502 of a main rope, and the delay time calculation unit 503.

The vibration damping device 100*a* for an elevator rope according to the second embodiment includes the building shake detection unit 22. The building shake detection unit 22 outputs a measured shake of the building 300*a* as building shake information 112 to the delay processing unit 504*a*. Similarly to the first embodiment, the delay time calculation unit 503*a* outputs delay time information 108*a*, which includes a delay time, to the delay processing unit 504*a*.

The delay processing unit 504*a* estimates a lateral vibration at a position of the actuator 14*a* based on the delay time information 108*a*, an actuator displacement 103*a*, lateral vibration information 101*a*, and the building shake information 112. In the second embodiment, the building shake information 112 is included in the estimating factors. The delay processing unit 504*a* outputs an estimated lateral vibration 102*a* to the lateral vibration compensation command computation unit 51*a*.

The delay processing unit 504*a* may delay a phase by an amount corresponding to the delay time information 108*a* with respect to the estimated lateral vibration 102*a*, and may thereby estimate the lateral vibration at the position of the actuator 14*a*. Such a vibration damping device 100*a* for an elevator rope, which does not use the transfer function, can also be formed.

The delay processing unit 504*a* can estimate the lateral vibration at the position of the actuator 14*a* through use of Equation (19) to be described later. The vibration damping device 100*a* for an elevator rope, which includes the building shake detection unit 22 and uses the transfer function, is described through use of equations. Similarly to the first embodiment, a length of the main rope 6*a* from the contact point e5 to the first end portion e4 is defined as L.

Similarly to the first embodiment, a lateral vibration at time t at a position away from the contact point e5 taken as an origin point by a distance of x toward the car 7*a* side is defined as $v_2(x,t)$. $v_2(x,t)$ is a solution of a wave equation of Equation (12). Moreover, similarly to the first embodiment, $v_2(x,t)$ satisfies boundary conditions in Equation (13) to Equation (16). Similarly to the first embodiment, a lateral vibration propagation speed c is given by Equation (2).

[Math. 12]

$$\frac{\partial^2 v_2(x,t)}{\partial t^2} = c^2 \frac{\partial^2 v_2(x,t)}{\partial x^2} \tag{12}$$

[Math. 13]

$$v_2(0,t) = V_{in2} + V_{ext2} \tag{13}$$

-continued

[Math. 14]

$$v_2(L,t)=0 \tag{14}$$

[Math. 15]

$$v_2(x,0)=0 \tag{15}$$

[Math. 16]

$$\frac{\partial v_2(x,0)}{\partial t}=0 \tag{16}$$

The solution of Equation (12) can be represented by a transfer function of Equation (17) similarly to the first embodiment. Here, $V_2(x,s)$ is a transfer function. $V_{ext2}$ and $V_{in2}$ are a displacement disturbance and a forced displacement 109*a*, respectively.

[Math. 17]

$$V_2(x,s)=\frac{\exp\left(-\frac{x}{c}s\right)-\exp\left(-\frac{2L-x}{c}s\right)}{1-\exp\left(-\frac{2L}{c}s\right)}(V_{in2}+V_{ext2}) \tag{17}$$

When Equation (17) is deformed, Equation (18) is obtained.

[Math. 18]

$$V_2(x,s)=\exp\left(-\frac{x}{c}s\right)((V_{in2}+V_{ext2})-V_{rfl2}) \tag{18}$$

$V_{rfl2}$ is represented by Equation (19).

[Math. 19]

$$V_{rfl2}=\exp\left(-\frac{2(L-x)}{c}s\right)(V_{in2}+V_{ext2})-\exp\left(-\frac{2L-x}{c}s\right)V_2(x,s) \tag{19}$$

The building shake information 112 output by the building shake detection unit 22 is an acceleration, and accordingly, the displacement disturbance $V_{ext2}$ can be calculated based on a value calculated by performing time integration for the building shake information 112 twice. The transfer function $V_2(x,s)$ can be obtained from $V_{in2}$, the displacement disturbance $V_{ext2}$ and the lateral vibration information 101*a*.

The actuator 14*a* is driven so that $V_{in2}$ satisfies Equation (20), thereby a lateral vibration and a reflected wave, which are generated by the displacement disturbance $V_{ext2}$ caused by the building shake, are removed. When $V_{in2}$ is determined so as to satisfy Equation (20), the transfer function of Equation (18) becomes Equation (21).

[Math. 20]

$$V_{in2}=V_{rfl2}-V_{ext2} \tag{20}$$

[Math. 21]

$$V_2(x,s)=0 \tag{21}$$

The vibration damping device 100*a* for an elevator rope operates, thereby a state in which the lateral vibration is not generated in the main rope 6*a* with respect to the shake of the building 300*a* is achieved as in Equation (21).

Moreover, even in a case in which the actuator 14*a* is placed at a position other than the contact point e5 within the vibration damping range Ra, the vibration damping device 100*a* for an elevator rope, which derives such a transfer function including the position coordinates of the actuator 14*a*, and uses the transfer function, can be formed.

A vibration damping device for an elevator rope, which includes a global positioning system (GPS) device as the building shake detection unit, can also be formed. The vibration damping device for an elevator rope, which includes the GPS device, is described with reference to FIGS. 13A and 13B.

Figure 13A:
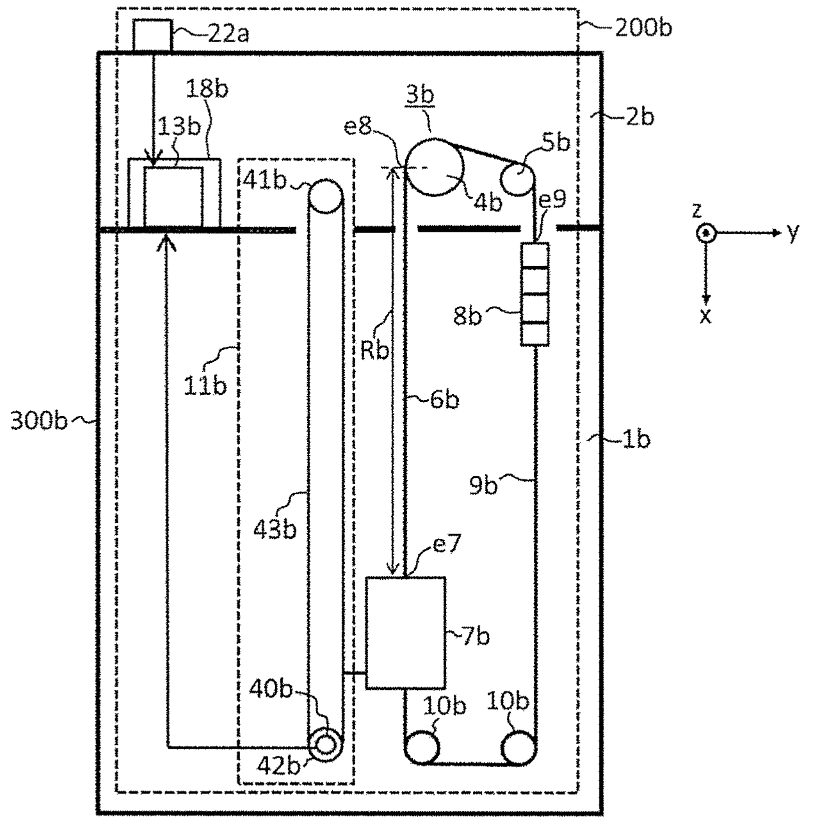
FIGS. 13A and 13B are schematic views of the elevator apparatus according to the second embodiment of the present invention, the elevator apparatus including a GPS device.
Figure 13B:
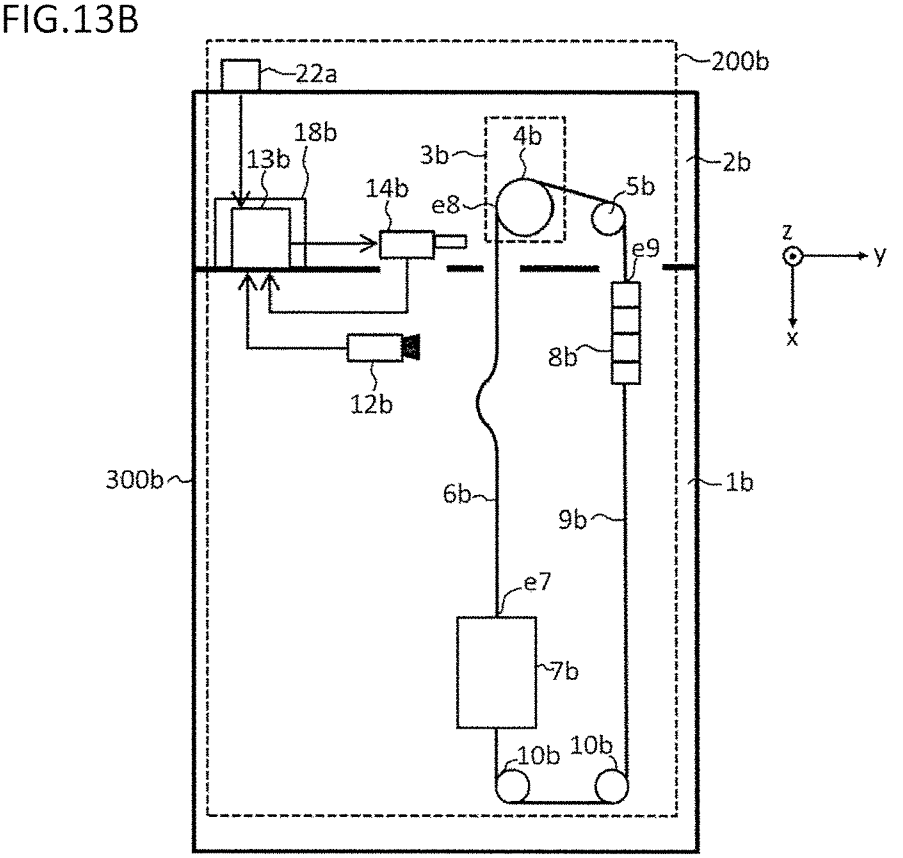

FIGS. 13A and 13B are schematic views of an elevator apparatus according to the second embodiment of the present invention, the elevator apparatus including the GPS device. An elevator apparatus 200*b* and a vibration damping device 100*b* for an elevator rope, which are illustrated in FIGS. 13A and 13B, include a GPS device as a building shake detection unit 22*a*.

The building shake detection unit 22*a* receives a radio wave from a GPS satellite, measures a displacement of the shake of the building, which occurs due to an earthquake, a strong wind, or the like, and outputs the measured shake of the building as building shake information 112*a*. The building shake information 112*a* is input to a computation control device 13*b*. The vibration damping device 100*b* for an elevator rope, which is illustrated in FIGS. 13A and 13B, calculates the displacement disturbance $V_{ext2}$ through use of the building shake information 112*a*.

Both of FIG. 13A and FIG. 13B are illustrations of the elevator apparatus 200*b*. To simplify the illustration, a lateral vibration measuring unit 12*b* and an actuator 14*b* are not illustrated in. A car position measuring unit 11*b* is not illustrated in. In FIG. 13A and FIG. 13B, an x-axis, a y-axis, and a z-axis, which are coordinate axes in a 3-axis orthogonal coordinate system, are illustrated.

The x-axis is set in parallel to a portion of a vibration damping range Rb of each of main ropes 6*b*. A positive direction of the x-axis corresponds to a vertically downward direction. Components illustrated in FIGS. 13A and 13B are included in the elevator apparatus 200*b*, except for a building 300*b* and also a hoistway 1*b* and a machine room 2*b* being parts of the building 300*b*. Moreover, the vibration damping device 100*b* for an elevator rope is a part of the elevator apparatus 200*b*.

In FIG. 13A, a hoistway 1*b* through which a car 7*b* moves up and down is illustrated. The machine room 2*b* is provided above the hoistway 1*b*, and a hoisting machine 3*b* and a deflector sheave 5*b* are placed in the machine room 2*b*. Arrangement of the building 300*b*, the hoistway 1*b*, and the machine room 2*b* is the same as the arrangement of the building 300, the hoistway 1, and the machine room 2 in FIG. 1C.

The hoisting machine 3*b* includes a driving sheave 4*b*, a hoisting-machine motor (not shown) configured to rotate the driving sheave 4*b*, and a hoisting-machine brake (not shown) configured to brake the rotation of the driving sheave 4*b*. A plurality of main ropes 6*b* which are suspension bodies are wound around the driving sheave 4*b* and the deflector sheave 5*b*. The car 7*b* is suspended at a first end portion e7 of each of the main ropes 6*b*. A second end portion e9 of the main rope 6*b* is connected to a counterweight 8*b*.

Here, a portion of the main rope 6*b* located closest to the car 7*b* among portions of the main rope 6*b* in contact with the driving sheave 4*b* is defined as a contact point e8. That is, a boundary between the portion of the main rope 6*b* in contact with the driving sheave 4*b* and a portion of the main rope 6*b* in non-contact with the driving sheave 4*b* is the contact point e8.

The vibration damping range Rb of the vibration damping device 100*b* for an elevator rope is a portion between the first end portion e7 and the contact point e8 in the main rope 6*b*. The vibration damping range Rb is illustrated in FIG. 13A, and is not illustrated in FIG. 13B. In the inside of the hoistway 1*b*, there are placed a pair of car guiderails (not shown) configured to guide the lifting and lowering of the car 7*b*.

Moreover, in the inside of the hoistway 1*b*, there are placed a pair of counterweight guiderails (not shown) configured to guide the lifting and lowering of the counterweight 8*b*. The car 7*b* and the counterweight 8*b* are connected to each other by a compensation rope 9*b*. Compensating sheaves 10*b* are provided in a bottom portion of the hoistway 1*b*.

The car position measuring unit 11*b* configured to measure a position of the car 7*b* in the x-axis direction is provided. The car position measuring unit 11*b* includes a main body 40*b*, a pulley 41*b*, a pulley 42*b*, and a wire rope 43*b*. A variety of instruments (not shown) related to the travel of the car 7*b* are placed inside the hoistway 1*b*, and the variety of instruments are controlled by a control panel 18*b*.

In FIG. 13B, the actuator 14*b* provided in the machine room 2*b* and the lateral vibration measuring unit 12*b* provided in the hoistway 1*b* are illustrated. The vibration damping device 100*b* for an elevator rope includes the building shake detection unit 22*a* on a roof of the building 300*b*. In the vibration damping device 100*b* for an elevator rope, the building shake information 112*a* is output from the building shake detection unit 22*a*.

In the vibration damping device 100*b* for an elevator rope, the building shake information 112*a* is included in the estimating factors for estimating the lateral vibration of the position of the actuator 14*b*. Except for the point that the building shake information 112*a* is used in place of the building shake information 112, an operation and structure of the vibration damping device 100*b* for an elevator rope are the same as those of the vibration damping device 100*a* for an elevator rope, which is described in FIGS. 11A and 11B.

Such a vibration damping device for an elevator rope, from which the lateral vibration measuring unit 12*a* is omitted, can also be formed. Reference symbols of FIGS. 11A and 11B are denoted to the vibration damping device for an elevator rope, from which the lateral vibration measuring unit 12*a* is omitted. The vibration damping device for an elevator rope, from which the lateral vibration measuring unit 12*a* is omitted, includes the actuator 14*a* that is placed in the hoistway 1*a* or machine room 2*a* of the elevator apparatus, is configured to generate the forced displacement in response to the drive input 106*a* input thereto, and is configured to apply, to the main rope 6*a*, the force generated by the forced displacement 109*a*.

Moreover, the vibration damping device for an elevator rope, from which the lateral vibration measuring unit 12*a* is omitted, includes the building shake detection unit 22 configured to detect the shake of the building and output the building shake information. Furthermore, the vibration damping device for an elevator rope, from which the lateral vibration measuring unit 12*a* is omitted, includes the lateral vibration estimation unit 50*a* configured to estimate the lateral vibration of the main rope 6*a* at the position of the actuator based on the estimating factors including the building shake information 112, and to output the estimated lateral vibration as the estimated lateral vibration 102*a*.

Moreover, the vibration damping device for an elevator rope, from which the lateral vibration measuring unit 12*a* is omitted, includes the actuator drive unit 52*a* configured to drive the actuator 14*a* so that the forced displacement 109*a* has a phase reverse to that of the estimated lateral vibration 102*a*. The actuator drive unit 52*a* outputs the drive input 106*a* to the actuator 14*a*, thereby driving the actuator 14*a*.

The vibration damping device for an elevator rope according to the second embodiment estimates the lateral vibration at the position of the actuator based on the estimating factors including the lateral vibration information, and accordingly, can reduce the amplitude of the lateral vibration with high accuracy. Therefore, the vibration damping device for an elevator rope according to the second embodiment can reduce the degradation of the riding comfort of the passenger, and can avoid the damage to the instruments provided in the hoistway.

The vibration damping device for an elevator rope according to the second embodiment includes the building shake detection unit, and estimates the lateral vibration at the position of the actuator based on the estimating factors including the building shake information in addition to the lateral vibration information, and accordingly, can use the displacement disturbance for the estimation of the lateral vibration. Therefore, the vibration damping device for an elevator rope according to the second embodiment can reduce the amplitude of the lateral vibration with higher accuracy.

Third Embodiment

A vibration damping device for an elevator rope according to a third embodiment includes a weighing device in addition to the components of the vibration damping device for an elevator rope, which is disclosed in the first embodiment.

Figure 14A:
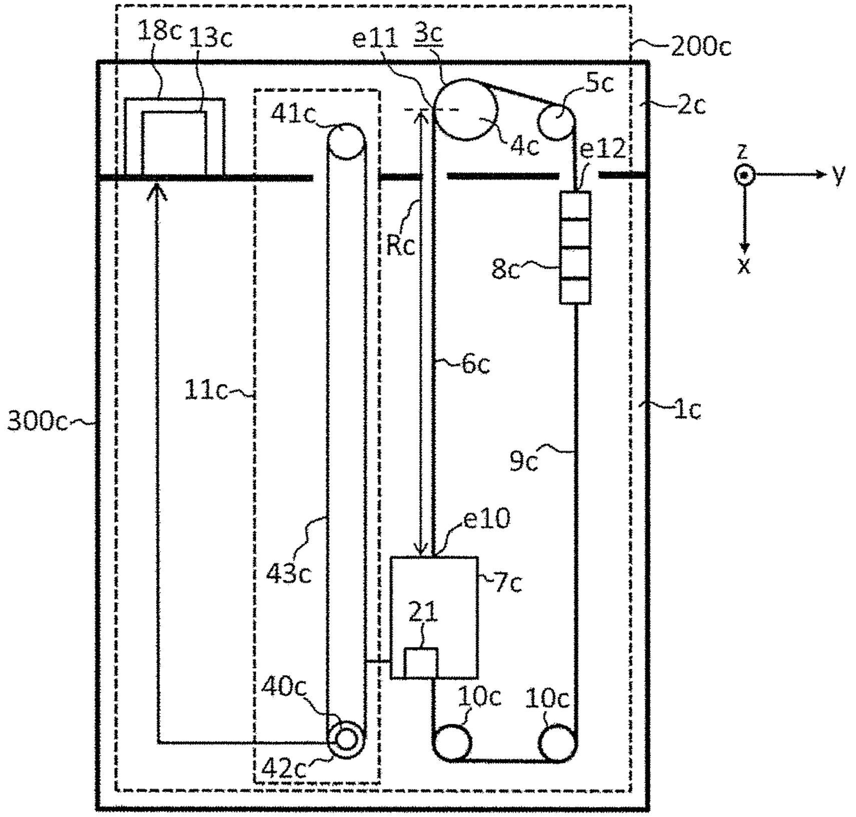
FIGS. 14A and 14B are schematic views of an elevator apparatus according to a third embodiment of the present invention.
Figure 14B:
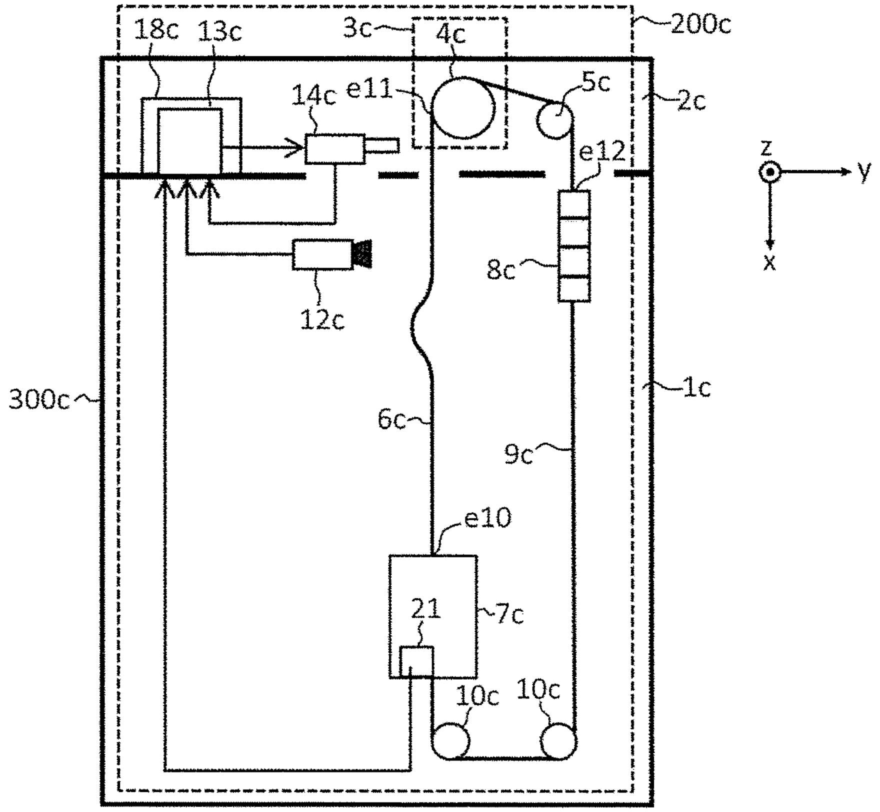

FIGS. 14A and 14B are schematic views of an elevator apparatus according to the third embodiment of the present invention. Structures and operations of an elevator apparatus 200*c* and a vibration damping device 100*c* for an elevator rope, which are not disclosed in the third embodiment, are the same as the structures and operations of the elevator apparatus 200 and the vibration damping device 100 for an elevator rope, which are disclosed in the first embodiment.

Components illustrated in FIGS. 14A and 14B are included in the elevator apparatus 200*c*, except for a building 300*c* and also a hoistway 1*c* and a machine room 2*c* being parts of the building 300*c*. Moreover, the vibration damping device 100*c* for an elevator rope is a part of the elevator apparatus 200*c*.

Both of FIG. 14A and FIG. 14B are illustrations of the elevator apparatus 200*c*. To simplify the illustration, a lateral vibration measuring unit 12*c* and an actuator 14*c* are not illustrated in FIG. 14A. Moreover, a connection line from a weighing device 21 to a computation control device 13*c* is not illustrated in FIG. 14A. A car position measuring unit 11*c* is not illustrated in FIG. 14B.

In FIG. 14A and FIG. 14B, an x-axis, a y-axis, and a z-axis in a 3-axis orthogonal coordinate system are illustrated. The x-axis is set in parallel to a portion of a vibration damping range Rc of main ropes 6*c*, and a positive direction of the x-axis corresponds to a vertically downward direction. In FIG. 14A, a hoistway 1*c* through which a car 7*c* moves up and down is illustrated. A machine room 2*c* is provided above the hoistway 1*c*, and a hoisting machine 3*c* and a deflector sheave 5*c* are placed in the machine room 2*c*.

Arrangement of the building 300*c*, the hoistway 1*c*, and the machine room 2*c* is the same as the arrangement of the building 300, the hoistway 1, and the machine room 2 in FIG. 1C. The hoisting machine 3*c* includes a driving sheave 4*c*, a hoisting-machine motor (not shown) configured to rotate the driving sheave 4*c*, and a hoisting-machine brake (not shown) configured to brake the rotation of the driving sheave 4*c*.

A plurality of main ropes 6*c* which are suspension bodies are wound around the driving sheave 4*c* and the deflector sheave 5*c*, and the car 7*c* is suspended at a first end portion e10 of each of the main ropes 6*c*. A second end portion e12 of the main rope 6*c* is connected to a counterweight 8*c*.

Here, a portion of the main rope 6*c* located closest to the car 7*c* among portions of the main rope 6*c* in contact with the driving sheave 4*c* is defined as a contact point e11. That is, a boundary between the portion of the main rope 6*c* in contact with the driving sheave 4*c* and a portion of the main rope 6*c* in non-contact with the driving sheave 4*c* is the contact point e11.

The vibration damping range Rc in the third embodiment is a portion between the first end portion e10 and the contact point e11 in the main rope 6*c*. The vibration damping range Rc is illustrated in FIG. 14A, and is not illustrated in FIG. FIG. 14B.

The car 7*c* and the counterweight 8*c* are suspended by the main ropes 6*c*. The hoisting machine 3*c* rotates the driving sheave 4*c* to lifts and lower the car 7*c* and the counterweight 8*c*. In the inside of the hoistway 1*c*, there are placed a pair of car guiderails (not shown) configured to guide the lifting and lowering of the car 7*c* and a pair of counterweight guiderails (not shown) configured to guide the lifting and lowering of the counterweight 8*c*.

The car 7*c* and the counterweight 8*c* are connected to each other by a compensation rope 9*c*. Two compensating sheaves 10*c* around which the compensation rope 9*c* is wound are provided in a bottom portion of the hoistway 1*c*. Similarly to the first embodiment, the car position measuring unit 11*c* configured to measure a position of the car 7*c* in the x-axis direction is provided.

The car position measuring unit 11*c* includes a main body 40*c*, a pulley 41*c*, a pulley 42*c*, and a wire rope 43*c*. The endless (annular) wire rope 43*c* is wound around the pulley 41*c* and the pulley 42*c*. A variety of instruments (not shown) related to the travel of the car 7*c* are provided inside the hoistway 1*c*, and the variety of instruments are controlled by a control panel 18*c*.

The control panel 18*c* includes the computation control device 13*c*. In the inside of the hoistway 1*c*, a non-contact displacement sensor is arranged as the lateral vibration measuring unit 12*c* configured to measure the lateral vibration of the main rope 6*c*. In FIG. 14B, the actuator 14*c* placed in the machine room 2*c*, the lateral vibration measuring unit 12*c* placed in the hoistway 1*c*, and the weighing device 21 placed in the car 7*c* are illustrated.

The vibration damping device 100*c* for an elevator rope according to the third embodiment includes the weighing device 21. The weighing device 21 measures a total weight of the inside of the car 7*c*, and outputs the measured total weight as car interior load information 113. The car interior load information 113 is input from the weighing device 21 to the computation control device 13*c*.

the computation control device 13*c* includes a lateral vibration estimation unit 50*c*, a lateral vibration compensation command computation unit 51*c*, and an actuator drive unit 52*c*. Structures and operations of the lateral vibration compensation command computation unit 51*c* and the actuator drive unit 52*c* are the same as the structures and operations of the lateral vibration compensation command computation unit 51 and the actuator drive unit 52 in the first embodiment.

Figure 15:
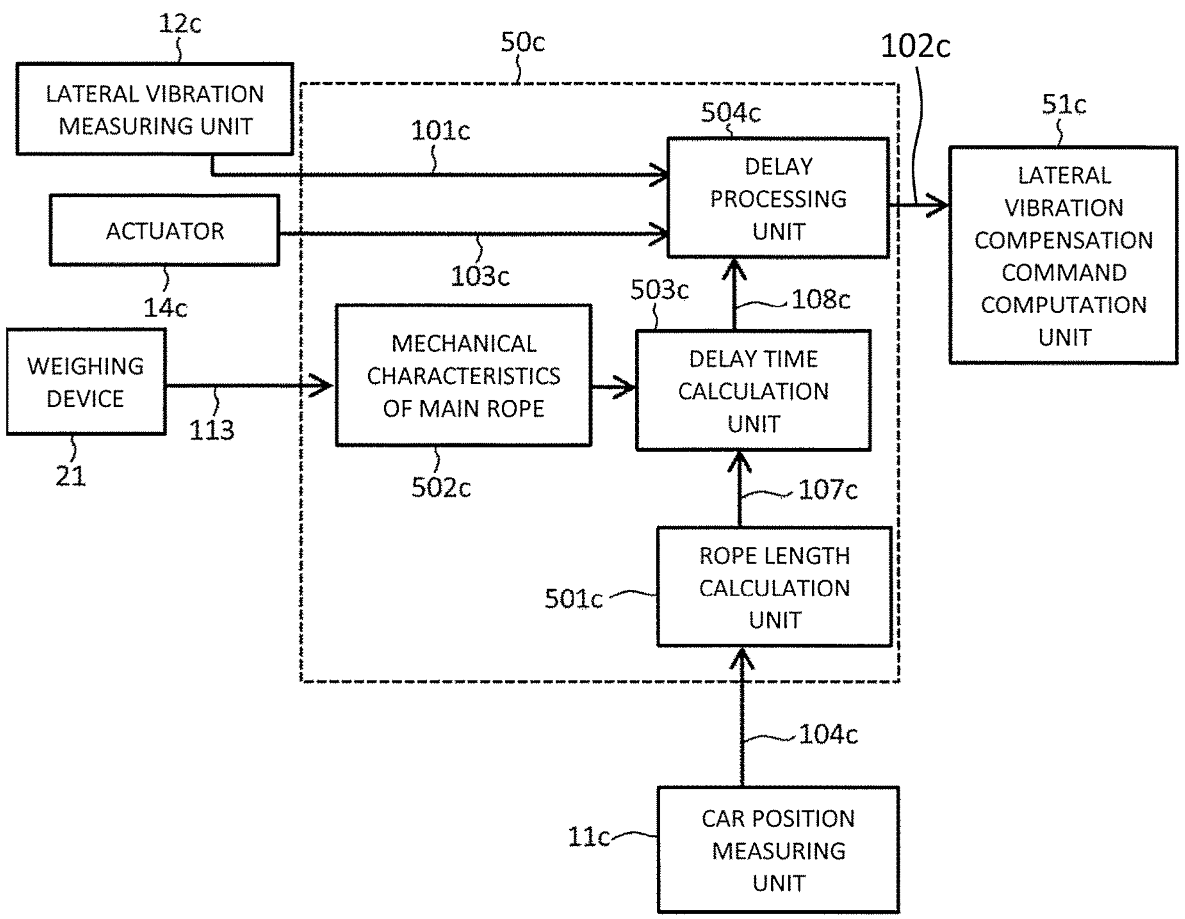
FIG. 15 is a block diagram for illustrating a main part of a vibration damping device for an elevator rope according to the third embodiment of the present invention, the main part including a lateral vibration estimation unit.

A structure and operation of the lateral vibration estimation unit 50*c* of the third embodiment is described. FIG. 15 is a block diagram for illustrating a main part of the vibration damping device for an elevator rope according to the third embodiment of the present invention, the main part including the lateral vibration estimation unit. The lateral vibration estimation unit 50*c* includes a rope length calculation unit 501*c*, mechanical characteristics 502*c* of a main rope, a delay time calculation unit 503*c*, and a delay processing unit 504*c*.

Structures and operations of the car position measuring unit 11*c*, the rope length calculation unit 501*c*, and the delay processing unit 504*c* are the same as the structures and operations of the car position measuring unit 11, the rope length calculation unit 501, and the delay processing unit 504 in the first embodiment.

The weighing device 21 provided in the vibration damping device 100*c* for an elevator rope according to the third embodiment measures the total weight of the inside of the car 7*c*, and the measured total weight is input as the car interior load information 113 to the mechanical characteristics 502*c* of a main rope. Here, the total weight is a weight of a passenger in the inside of the car 7*c* and of a baggage brought into the inside of the car 7*c*.

The lateral vibration estimation unit 50*c* calculates a tension of the main rope 6*c* based on a weight of the car 7*c*, which includes the total weight, a weight of a control cable (not shown) suspended from a lower portion of the car 7*c*, a weight of the compensation rope 9*c*, and a weight of the compensating sheaves 10*c*. The mechanical characteristics 502*c* of a main rope of the third embodiment includes the tension of the main rope 6*c*, which is calculated through use of the car interior load information 113 in addition to a line density of the main rope 6*c*.

The delay time calculation unit 503*c* calculates delay time information 108*c* based on the mechanical characteristics 502*c* of a main rope and the rope length information 107*c*. A structure and operation of the delay processing unit 504*c* are the same as the structure and operation of the delay processing unit 504 in the first embodiment. The lateral vibration estimation unit 50*c* of the third embodiment may estimate the estimated lateral vibration 102*c* through use of Equation (19) or Equation (9).

In the vibration damping device 100*c* for an elevator rope according to the third embodiment, the car interior load information 113 is included in the estimating factors, and accordingly, the tension of the elevator rope can be calculated more accurately. Therefore, in comparison with a case in which the car interior load information 113 is not included in the estimating factors, calculation accuracy of the lateral vibration propagation speed and estimation accuracy of the estimated lateral vibration 102*c* can be improved.

The vibration damping device 100*c* for an elevator rope according to the third embodiment estimates the lateral vibration at the position of the actuator based on the estimating factors including the lateral vibration information 101*c*, and accordingly, can reduce the amplitude of the lateral vibration with high accuracy. Therefore, the vibration damping device 100*c* for an elevator rope according to the third embodiment can suppress the lateral vibration quickly and reliably, can reduce the degradation of the riding comfort of the passenger, and can avoid the damage to the instruments provided in the hoistway.

The vibration damping device 100*c* for an elevator rope according to the third embodiment includes the car interior load information 113 in the estimating factors, and accordingly, can estimate the lateral vibration at the position of the actuator with higher accuracy, and can reduce the amplitude of the lateral vibration with higher accuracy. Moreover, the transfer function described in the first embodiment can also be applied to the vibration damping device 100*c* for an elevator rope.

The vibration damping device 100*c* for an elevator rope, which includes the car interior load information 113 in the estimating factors and uses the transfer function, uses the transfer function in combination, and can thereby reduce the amplitude of the lateral vibration with high accuracy in a short period of time in response to a change in total weight of the inside of the car 7*c*. Therefore, the vibration damping device 100*c* for an elevator rope, which uses the transfer function, can reduce the amplitude of the lateral vibration quickly and accurately even under a situation in which the total weight changes.

When a passenger gets on or off the car 7*c*, the total weight of the inside of the car 7*c* changes, and the tension of the main rope 6*c* changes. Thus, the position of the resonance peak in the frequency domain changes. The vibration damping device 100*c* for an elevator rope, which uses the transfer function, can damp the resonance peak with high accuracy in response to such passenger's getting on/off. Therefore, the vibration damping device 100*c* for an elevator rope, which uses the transfer function, can reduce the resonance peak of the lateral vibration quickly and accurately even under a situation in which the passenger gets on and off the car 7*c*.

Fourth Embodiment

Figure 16A:
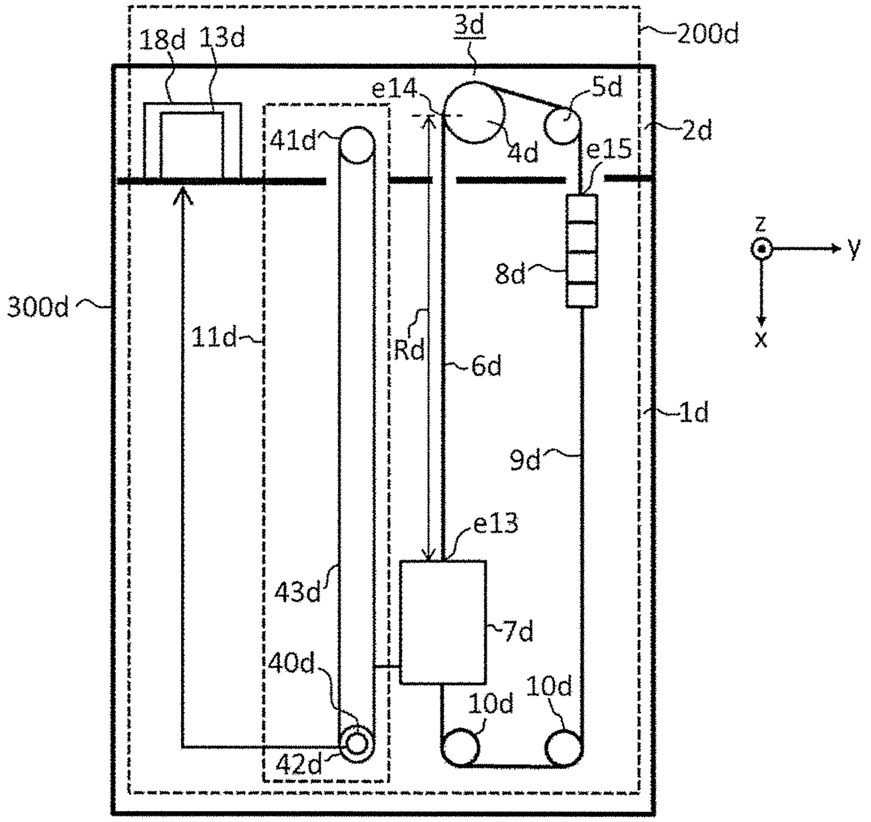
FIGS. 16A and 16B are schematic views of an elevator apparatus according to a fourth embodiment of the present invention.
Figure 16B:
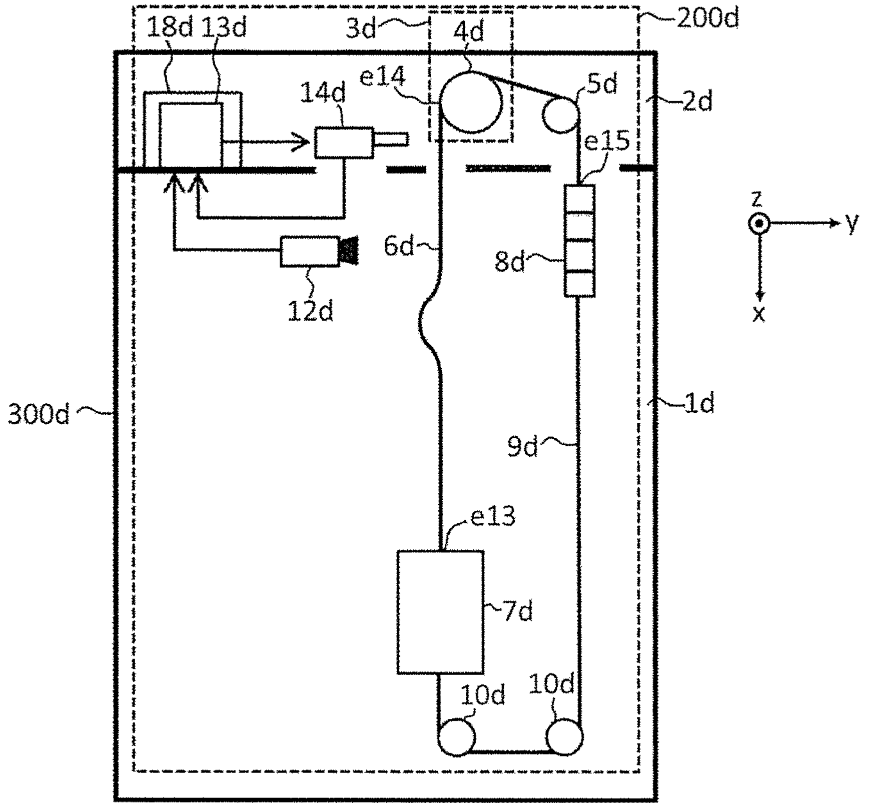

A vibration damping device for an elevator rope according to a fourth embodiment includes an actuator configured to generate forced displacements in two different directions. FIGS. 16A and 16B are schematic views of an elevator apparatus according to the fourth embodiment of the present invention. In FIGS. 16A and 16B, an x-axis, a y-axis, and a z-axis in a 3-axis orthogonal coordinate system are illustrated. A positive direction of the x-axis corresponds to a vertically downward direction, and the x-axis is set in parallel to a portion of a vibration damping range Rd of main ropes 6*d*.

Structures and operations of components, which are not described in the fourth embodiment, are the same as the structures and operations of the components of the first embodiment. Components illustrated in FIGS. 16A and 16B are included in an elevator apparatus 200*d*, except for a building 300*d* and also a hoistway 1*d* and a machine room 2*d* being parts of the building 300*d*. Moreover, a vibration damping device 100*d* for an elevator rope is a part of the elevator apparatus 200*d*.

Both of FIG. 16A and FIG. 16B are illustrations of the elevator apparatus 200*d*. However, a lateral vibration measuring unit 12*d* and an actuator 14*d* are not illustrated in FIG. 16A, and a car position measuring unit 11*d* is not illustrated in FIG. 16B. In FIG. 16A, the hoistway 1*d* through which a car 7*d* moves up and down is illustrated.

The machine room 2*d* is provided above the hoistway 1*d*, and a hoisting machine 3*d* and a deflector sheave 5*d*, which move up and down the car 7*d*, are placed in the machine room 2*d*. Arrangement of the building 300*d*, the hoistway 1*d*, and the machine room 2*d* is the same as the arrangement of the building 300, the hoistway 1, and the machine room 2 in FIG. 1C. The hoisting machine 3*d* includes a driving sheave 4*d*, a hoisting-machine motor (not shown) configured to rotate the driving sheave 4*d*, and a hoisting-machine brake (not shown) configured to brake the rotation of the driving sheave 4*d*.

The car 7*d* is suspended at a first end portion e13 of each of the main ropes 6*d*, and a counterweight 8*d* is connected to a second end portion e15 of the main rope 6*d*. A portion of the main rope 6*d* located closest to the car 7*d* among portions of the main rope 6*d* in contact with the driving sheave 4*d* is defined as a contact point e14. That is, a boundary between the portion of the main rope 6*d* in contact with the driving sheave 4*d* and a portion of the main rope 6*d* in non-contact with the driving sheave 4*d* is the contact point e14.

The car 7*d* and the counterweight 8*d* are suspended by the main rope 6*d* in a 1:1 roping system. The hoisting machine 3*d* rotates the driving sheave 4*d* to lift and lower the car 7*d* and the counterweight 8*d*. The vibration damping range Rd in the fourth embodiment is a portion between the first end portion e13 and the contact point e14 in the main rope 6*d*. The vibration damping range Rd is illustrated in FIG. 16A, and is not illustrated in FIG. 16B.

The car 7*d* and the counterweight 8*d* are connected to each other by a compensation rope 9*d*. Two compensating sheaves 10*d* around which the compensation rope 9*d* is wound are provided in a bottom portion of the hoistway 1*d*. In the inside of the hoistway 1*d*, the car position measuring unit 11*d* configured to measure a position of the car 7*d* in the x-axis direction is provided. The car position measuring unit 11*d* includes a main body 40*d*, a pulley 41*d*, a pulley 42*d*, and a wire rope 43*d*.

The car position measuring unit 11*d* measures the position of the car 7*d*, and outputs the measured position of the car 7*d* as car position information 104*d*. A variety of instruments (not shown) related to the travel of the car 7*d* are placed inside the hoistway 1*d*, and the variety of instruments are controlled by a control panel 18*d*. The control panel 18*d* includes a computation control device 13*d*.

In the inside of the hoistway 1*d*, the lateral vibration measuring unit 12*d* configured to measure a lateral vibration of the main rope 6*d* is placed. The lateral vibration measuring unit 12*d* measures a lateral vibration of the main rope 6*d* in the y-axis direction and a lateral vibration of the main rope 6*d* in the z-axis direction. The lateral vibration in the y-axis direction is a component of a displacement of the lateral vibration in the y-axis direction. The lateral vibration in the z-axis direction is a component of a displacement of the lateral vibration in the z-axis direction.

The lateral vibration measuring unit 12*d* outputs the measured lateral vibration in the y-axis direction as y-axis direction lateral vibration information 101*d* to the computation control device 13*d*. Moreover, the lateral vibration measuring unit 12*d* outputs the measured lateral vibration in the z-axis direction as z-axis direction lateral vibration information 101*e* to the computation control device 13*d*.

The actuator 14*d* is placed in the machine room 2*d*. The actuator 14*d* applies, to the main rope 6*d*, a force generated by a y-axis direction forced displacement 109*d* and a force generated by a z-axis direction forced displacement 109*e*. They-axis direction forced displacement 109*d* and the z-axis direction forced displacement 109*e* are a forced displacement in the y-axis direction and a forced displacement in the z-axis direction, respectively. Details of structures of the actuator 14*d* and rope gripping portions will be described later.

Figure 17:
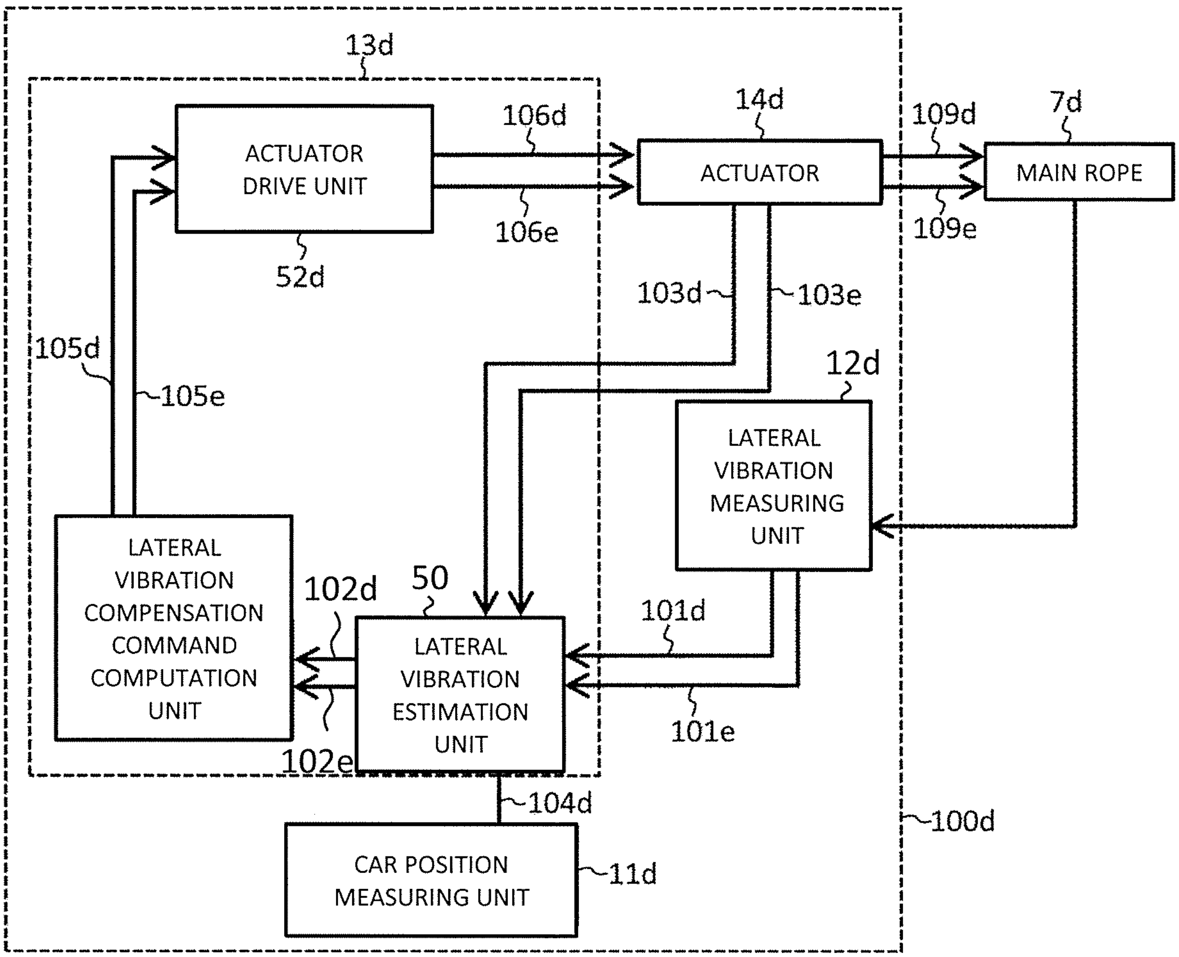
FIG. 17 is a block diagram for illustrating a main part of a vibration damping device for an elevator rope according to the fourth embodiment of the present invention.

FIG. 17 is a block diagram for illustrating a main part of the vibration damping device for an elevator rope according to the fourth embodiment of the present invention. The vibration damping device 100*d* for an elevator rope includes the car position measuring unit 11*d*, the lateral vibration measuring unit 12*d*, the computation control device 13*d*, and the actuator 14*d*.

Figure 18:
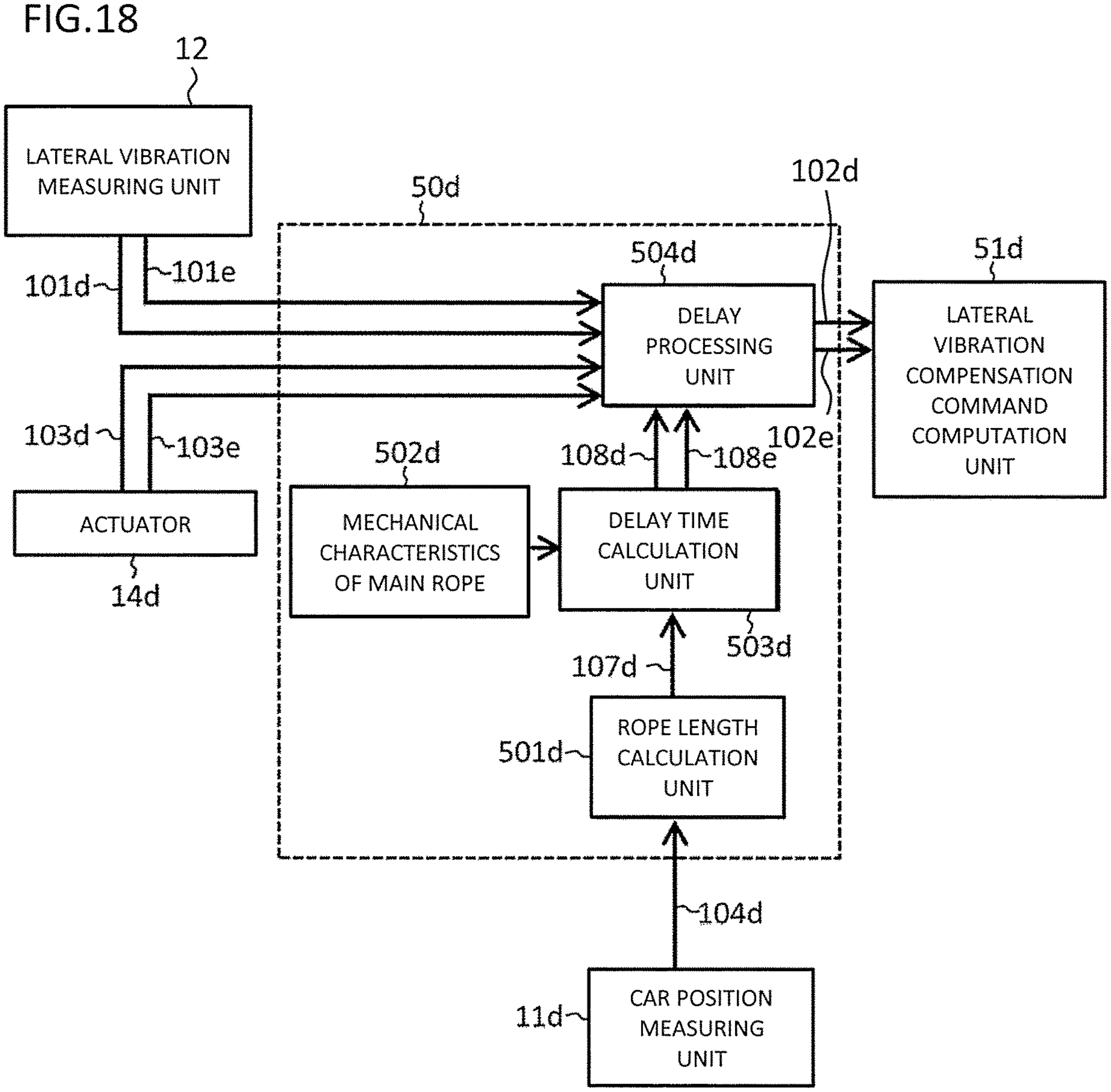
FIG. 18 is a block diagram for illustrating a main part of the vibration damping device for an elevator rope according to the fourth embodiment of the present invention, the main part including a lateral vibration estimation unit.

The computation control device 13*d* includes a lateral vibration estimation unit 50*d*, a lateral vibration compensation command computation unit 51*d*, and an actuator drive unit 52*d*. The lateral vibration estimation unit 50*d* is described. FIG. 18 is a block diagram for illustrating a main part of the vibration damping device for an elevator rope according to the fourth embodiment of the present invention, the main part including the lateral vibration estimation unit.

The lateral vibration estimation unit 50*d* includes a rope length calculation unit 501*d*, mechanical characteristics 502*d* of a main rope, a delay time calculation unit 503*d*, and a delay processing unit 504*d*. Structures and operations of the rope length calculation unit 501*d* and the mechanical characteristics 502*d* of a main rope are the same as the structures and operations of the rope length calculation unit 501 and the mechanical characteristics 502 of a main rope in the first embodiment.

The delay time calculation unit 503*d* calculates y-axis direction delay time information 108*d* and z-axis direction delay time information 108*e* based on the mechanical characteristics 502*d* of a main rope and the rope length information 107*d*. When a y-axis direction actuator 141*a* and a z-axis direction actuator 141*b* are arranged at the same position in the x-axis direction, the y-axis direction delay time information 108*d* and the z-axis direction delay time information 108*e* become the same in some cases.

The delay processing unit 504*d* acquires the y-axis direction lateral vibration information 101*d* and the z-axis direction lateral vibration information 101*e* from the lateral vibration measuring unit 12*d*. The delay processing unit 504*d* acquires the y-axis direction forced displacement 109*d* as a y-axis direction actuator displacement 103*d* from the actuator 14*d*, and further acquires the z-axis direction forced displacement 109*e* as a z-axis direction actuator displacement 103*e* therefrom.

The delay processing unit 504*d* estimates the lateral vibration in the y-axis direction at the position of the actuator 14*d* based on estimating factors including the y-axis direction lateral vibration information 101*d*. Moreover, the delay processing unit 504*d* estimates the lateral vibration in the z-axis direction at the position of the actuator 14*d* based on estimating factors including the z-axis direction lateral vibration information 101*e*.

Here, in the case of estimating the lateral vibration in the y-axis direction, the position of the actuator 14*d* is a position of the y-axis direction actuator 141*a*, and in the case of estimating the lateral vibration in the z-axis direction, the position of the actuator 14*d* is a position of the z-axis direction actuator 141*b*.

The delay processing unit 504*d* outputs the estimated lateral vibration in the y-axis direction as a y-axis direction estimated lateral vibration 102*d* to the lateral vibration compensation command computation unit 51*d*, and outputs the estimated lateral vibration in the z-axis direction as a z-axis direction estimated lateral vibration 102*e* thereto. The above is the operation of the lateral vibration estimation unit 50*d*.

The lateral vibration compensation command computation unit 51*d* calculates a y-axis direction lateral vibration compensation command value 105*d* having a phase reverse to that of the y-axis direction estimated lateral vibration 102*d* based on the y-axis direction estimated lateral vibration 102*d*. Moreover, the lateral vibration compensation command computation unit 51*d* calculates a z-axis direction lateral vibration compensation command value 105*e* having a phase reverse to that of the z-axis direction estimated lateral vibration 102*e* based on the z-axis direction estimated lateral vibration 102*e*.

The lateral vibration compensation command computation unit 51*d* outputs the y-axis direction lateral vibration compensation command value 105*d* and the z-axis direction lateral vibration compensation command value 105*e* to the actuator drive unit 52*d*. The actuator drive unit 52*d* calculates a y-axis direction drive input 106*d* serving as a signal for allowing the y-axis direction forced displacement 109*d* to follow the y-axis direction lateral vibration compensation command value 105*d*.

The actuator drive unit 52*d* calculates a z-axis direction drive input 106*e* serving as a signal for allowing the z-axis direction forced displacement 109*e* to follow the z-axis direction lateral vibration compensation command value 105*e*. The actuator drive unit 52*d* outputs the y-axis direction drive input 106*d* and the z-axis direction drive input 106*e* to the actuator 14*d*. The actuator drive unit 52*d* drives the actuator 14*d*.

The actuator 14*d* applies, to the main rope 6*d*, a force generated by the y-axis direction forced displacement 109*d* and a force generated by the z-axis direction forced displacement 109*e*, thereby the lateral vibration in the y-axis direction and the lateral vibration in the z-axis direction are suppressed. Moreover, when the generation of the reflected wave is suppressed, a resonance of the lateral vibration in the y-axis direction and a resonance of the lateral vibration in the z-axis direction are suppressed.

Figure 19A:
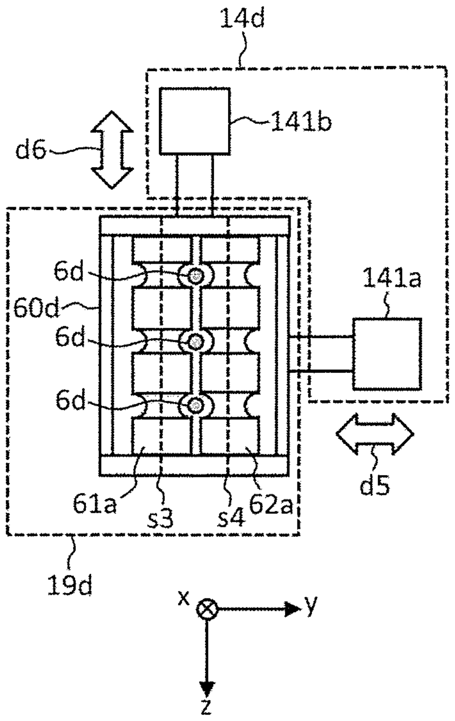
FIGS. 19A and 19B are views for illustrating structures of a roller-type rope gripping portion of a single body type and an actuator according to the fourth embodiment of the present invention.
Figure 19B:
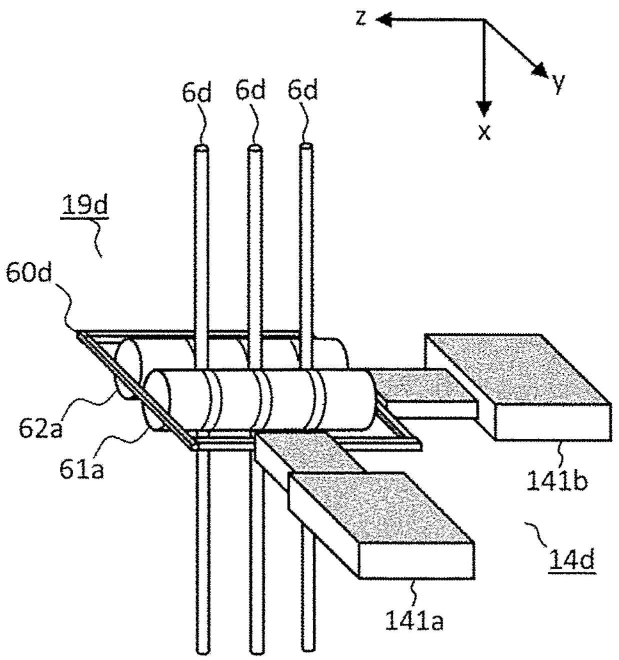

FIGS. 19A and 19B are views for illustrating structures of a roller-type rope gripping portion and an actuator of a single body type according to the fourth embodiment of the present invention. FIG. 19A is a plan view, and FIG. 19B is a perspective view. In FIGS. 19A and 19B, an x-axis, a y-axis, and a z-axis in a 3-axis orthogonal coordinate system are illustrated. The x-axis of the 3-axis orthogonal coordinate system is parallel to the portion of the vibration damping range Rd of the main ropes 6*d*, and a positive direction of the x-axis corresponds to a vertically downward direction.

A roller-type rope gripping portion 19*d* includes a frame portion 60*d*, a first roller 61*a*, and a second roller 62*a*. The frame portion 60*d* that is quadrangular and hollow is provided so as to surround the main ropes 6*d*. The first roller 61*a* and the second roller 62*a* can rotate about a shaft portion s3 and a shaft portion s4, which are taken as rotation axes, respectively.

On both sides of the main ropes 6*d*, the first roller 61*a* and the second roller 62*a* are arranged so as to face each other. On the first roller 61*a* and the second roller 62*a*, grooves matched with a shape of the main ropes 6*d* are provided. The actuator 14*d* includes the y-axis direction actuator 141*a* and the z-axis direction actuator 141*b*. They-axis direction actuator 141*a* moves in the y-axis direction as indicated by an arrow d5. The z-axis direction actuator 141*b* moves in the z-axis direction as indicated by an arrow d6.

The frame portion 60*d* and the y-axis direction actuator 141*a* are connected to each other so that the frame portion 60*d* moves in conjunction with a motion of a movable portion of the y-axis direction actuator 141*a* in only the y-axis direction. The frame portion 60*d* and the z-axis direction actuator 141*b* are connected to each other so that the frame portion 60*d* moves in conjunction with a motion of a movable portion of the z-axis direction actuator 141*b* in only the z-axis direction.

A structure between the frame portion 60*d* and the actuator 14*d* is formed so that a motion of the frame portion 60*d* in the y-axis direction follows the motion of the movable portion of the y-axis direction actuator 141*a*, and that a motion of the frame portion 60*d* in the z-axis direction follows the motion of the movable portion of the z-axis direction actuator 141*b*.

For connecting the y-axis direction actuator 141*a* and the frame portion 60*d* to each other, a slide rail in which a rail is placed so as to extend in the z-axis direction may be used. Moreover, for connecting the z-axis direction actuator 141*b* and the frame portion 60*d* to each other, a slide rail in which a rail is placed so as to extend in the y-axis direction may be used.

The roller-type rope gripping portion 19*d* of the single body type, which is illustrated in FIGS. 19A and 19B, can move in conjunction with the forced displacements in two different directions on the yz plane. Therefore, the roller-type rope gripping portion 19*d* of the single body type can apply the force generated by the forced displacements in two different directions on the yz plane to the main ropes 6*d* without providing a roller-type rope gripping portion of a double body type. Hereinafter, a structure in which actuators and gripping portions are arranged separately for each of directions in which forced displacements are generated will be referred to as a double body type.

A gap is formed between the main ropes 6*d* and the roller-type rope gripping portion 19*d*, and the main ropes 6*d* are not brought into contact with the roller-type rope gripping portion 19*d* even when the car 7*d* travels in a normal state in which the lateral vibration is not generated in the main ropes 6*d*. When the actuator 14*d* is driven, the force generated by the forced displacement is applied to the main ropes 6*d* through the roller-type rope gripping portion 19*d*.

Figure 20A:
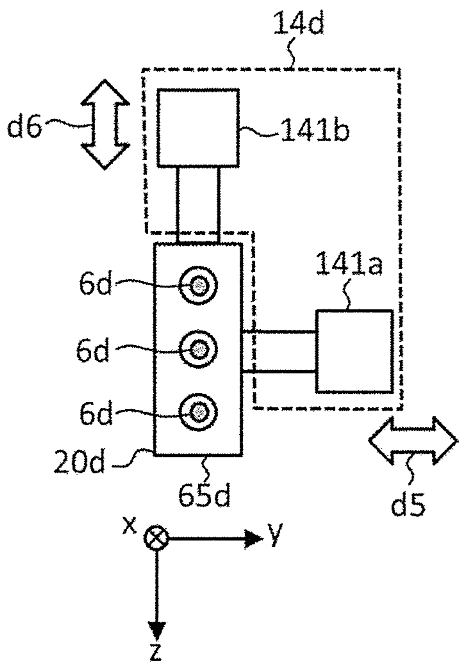
FIGS. 20A and 20B are views for illustrating structures of a through-type rope gripping portion of a single body type and the actuator according to the fourth embodiment of the present invention.
Figure 20B:
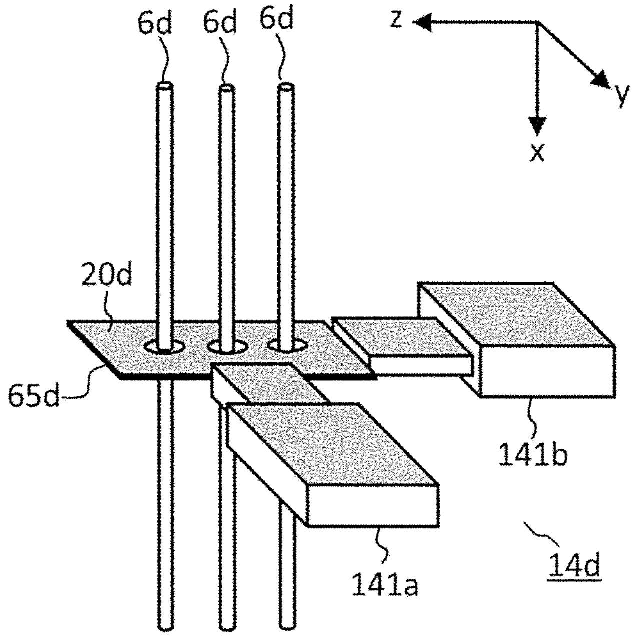

A through-type rope gripping portion may be used in place of the roller-type rope gripping portion 19*d*. FIGS. 20A and 20B are views for illustrating structures of the through-type rope gripping portion and an actuator of the single body type according to the fourth embodiment of the present invention. 20A is a plan view, and FIG. 20B is a perspective view. In FIGS. 20A and 20B, an x-axis, a y-axis, and a z-axis in a 3-axis orthogonal coordinate system are illustrated. The x-axis is parallel to the portion of the vibration damping range Rd of the main ropes 6*d*, and a vertically downward direction thereof is a positive direction of the x-axis.

A through-type rope gripping portion 20*d* includes a flat plate member 65*d* having opening portions penetrated by the main ropes 6*d*. The flat plate member 65*d* is connected to the y-axis direction actuator 141*a* and the z-axis direction actuator 141*b*. A connection structure between the flat plate member 65*d* and the y-axis direction and z-axis direction actuators 141*a* and 141*b* is the same as the structure described in FIGS. 19A and 19B.

A gap is present between the flat plate member 65*d* and the main ropes 6*d*, and in a normal state in which the lateral vibration is not generated in the main ropes 6*d*, the main ropes 6*d* are not brought into contact with the flat plate member 65*d* even when the car 7*d* travels. When the actuator 14*d* is driven, the force generated by the y-axis direction forced displacement 109*d* and the force generated by the z-axis direction forced displacement 109*e* are applied to the main ropes 6*d* through the through-type rope gripping portion 20*d*.

Figure 21A:
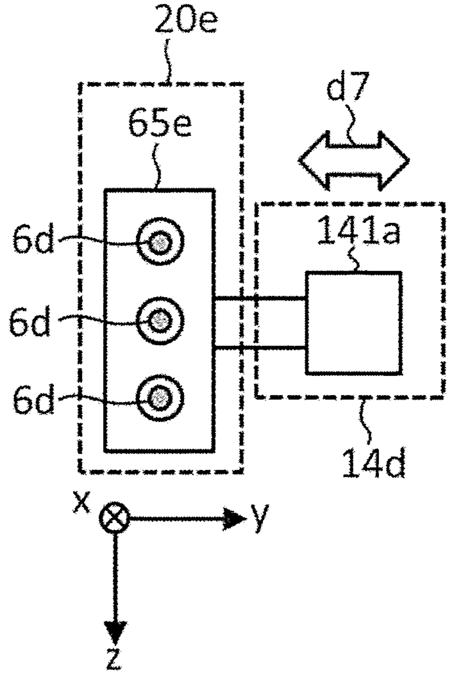
FIGS. 21A, 21B and 21C are views for illustrating structures of a through-type rope gripping portion of a double body type and the actuator according to the fourth embodiment of the present invention.
Figure 21B:
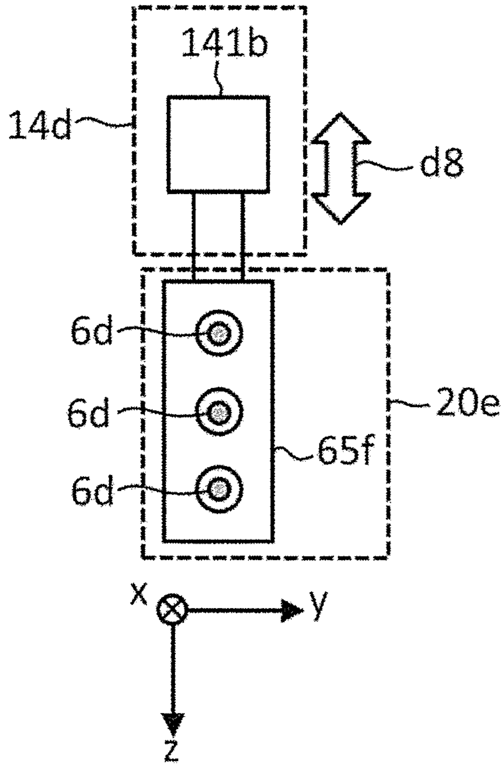
Figure 21C:
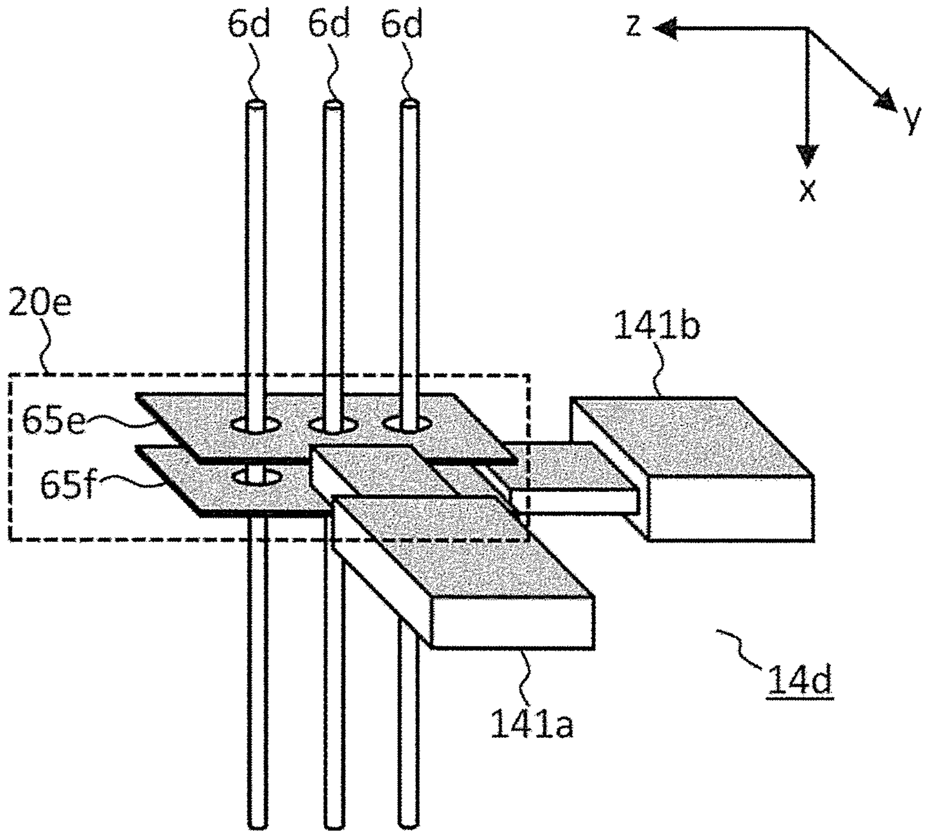

An actuator and a rope gripping portion, each of which is formed to be of the double body type and applies forces in the y-axis direction and the z-axis direction at positions different from each other in the x-axis direction, can also be used. FIGS. 21A 21B and 21C are views for illustrating structures of the through-type rope gripping portion and the actuator of the double body type according to the fourth embodiment of the present invention. FIG. 21A and FIG. 21B are plan views for illustrating a through-type rope gripping portion 20*e*. FIG. 21C is a perspective view of the through-type rope gripping portion 20*e*.

In FIGS. 21A, 21B and 21C, an x-axis, a y-axis, and a z-axis in a 3-axis orthogonal coordinate system are illustrated. The x-axis is parallel to the portion of the vibration damping range Rd of the main ropes 6*d*, and a vertically downward direction thereof is a positive direction of the x-axis. The through-type rope gripping portion 20*e* includes a flat plate member 65*e* and a flat plate member 65*f*. The flat plate member 65*e* and the flat plate member 65*f* are placed at positions different from each other in the x-axis direction in the vibration damping range Rd.

The flat plate member 65*e* and the movable portion of the y-axis direction actuator 141*a*, which are fixed to each other, move in a direction of an arrow d7, and apply the force generated by the y-axis direction forced displacement 109*d* to the main ropes 6*d*. Likewise, the flat plate member 65*f* and the movable portion of the z-axis direction actuator 141*b*, which are fixed to each other, move in a direction of an arrow d8, and apply the force generated by the z-axis direction forced displacement 109*e* to the main ropes 6*d*.

In the through-type rope gripping portion 20*e* and the actuator 14*d*, portions configured to apply the force in the y-axis direction and portions configured to apply the force in the z-axis direction are provided separately from each other. Therefore, the through-type rope gripping portion 20*e* and the actuator 14*d* can apply the force to the main ropes 6*d* in the y-axis direction and the z-axis direction without providing a complicated connection structure.

Figure 22A:
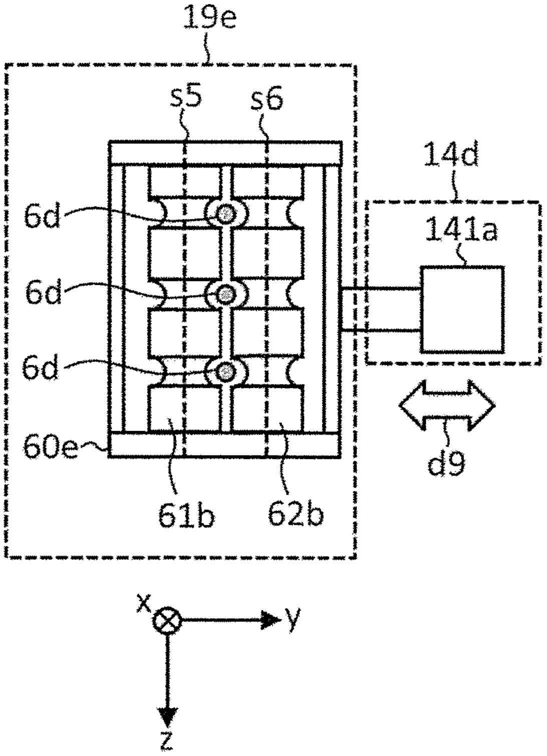
FIGS. 22A and 22B are views for illustrating structures of a roller-type rope gripping portion of a double body type and the actuator according to the fourth embodiment of the present invention.
Figure 22B:
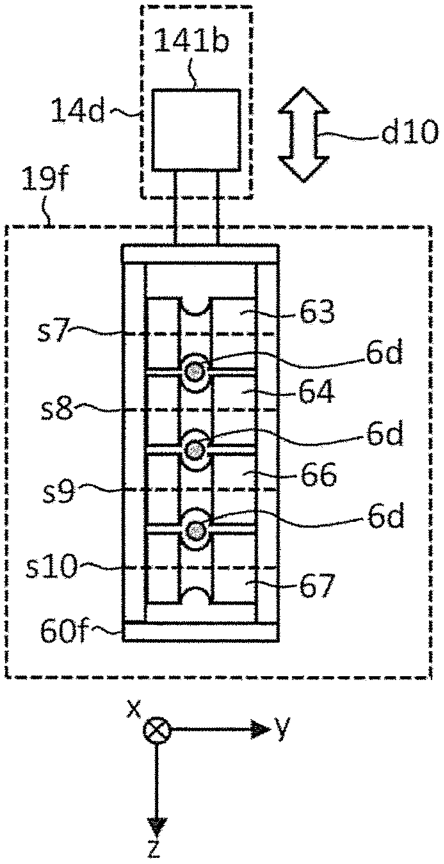

A roller-type rope gripping portion of a double body type can be used in place of the through-type rope gripping portion of the double body type. FIGS. 22A and 22B are views for illustrating structures of the roller-type rope gripping portion and the actuator of a double body type according to the fourth embodiment of the present invention. In FIGS. 22A and 22B, an x-axis, a y-axis, and a z-axis are illustrated. The x-axis is parallel to the portion of the vibration damping range Rd of the main ropes 6*d*, and a positive direction of the x-axis corresponds to a vertically downward direction.

In FIG. 22A, a roller-type rope gripping portion 19*e* connected to the y-axis direction actuator 141*a* is illustrated. In FIG. 22B, a roller-type rope gripping portion 19*f* connected to the z-axis direction actuator 141*b* is illustrated. The force generated by the y-axis direction forced displacement 109*d* is applied to the main ropes 6*d* through the roller-type rope gripping portion 19*e*.

The force generated by the z-axis direction forced displacement 109*e* is applied to the main ropes 6*d* through the roller-type rope gripping portion 19*f*. The roller-type rope gripping portion 19*e* and the roller-type rope gripping portion 19*f* are provided at positions different from each other in the x-axis direction. The roller-type rope gripping portion 19*e* includes a first roller 61*b*, a second roller 62*b*, and a frame portion 60*e*.

The first roller 61*b* and the second roller 62*b* can rotate about a shaft portion s5 and a shaft portion s6, which are taken as rotation axes, respectively. The first roller 61*b* and the second roller 62*b* are connected to the frame portion 60*e* at the shaft portion s5 and the shaft portion s6, respectively. The roller-type rope gripping portion 19*f* illustrated in FIG. 22B includes a third roller 63, a fourth roller 64, a fifth roller 66, a sixth roller 67, and a frame portion 60*f*.

The third roller 63, the fourth roller 64, the fifth roller 66, and the sixth roller 67 can rotate about a shaft portion s7, a shaft portion s8, a shaft portion s9, and a shaft portion s10, which are taken as rotation axes, respectively. The third roller 63, the fourth roller 64, the fifth roller 66, and the sixth roller 67 are connected to the frame portion 60*f* at the shaft portion s7, the shaft portion s8, the shaft portion s9, and the shaft portion s10, respectively.

The roller-type rope gripping portion 19*e* and the roller-type rope gripping portion 19*f* can move in conjunction with the y-axis direction forced displacement 109*d* and the z-axis direction forced displacement 109*e*, respectively. Therefore, similarly to the through-type rope gripping portion 20*e*, the lateral vibrations in all directions in the yz plane can be suppressed. Moreover, by the rotation of the rollers, abrasion of the main ropes 6*d* can be suppressed.

As described above, according to the vibration damping device 100*d* for an elevator rope according to the fourth embodiment of the present invention, the lateral vibration in the y-axis direction at the position of the y-axis direction actuator 141*a* and the lateral vibration in the z-axis direction at the position of the z-axis direction actuator 141*b* can be estimated. Therefore, the y-axis direction forced displacement 109*d* and the z-axis direction forced displacement 109*e*, which correspond to the lateral vibration in the y-axis direction and the lateral vibration in the z-axis direction, can be generated.

Therefore, according to the vibration damping device 100*d* for an elevator rope according to the fourth embodiment of the present invention, it becomes possible to suppress the lateral vibration quickly and reliably without depending on the direction of the generated lateral vibration for an elevator rope, and the damage to the instruments provided in the hoistway 1*d* can be avoided. Moreover, the degradation of the riding comfort of the passenger can be reduced.

In the fourth embodiment, the configuration of applying the forces, which are generated by the forced displacements, to the main ropes 6*d* in the y-axis direction and the z-axis direction is described. However, the directions of the forced displacements are not limited to two directions perpendicular to each other, and just a configuration of applying forces in two directions different from each other in the yz plane exerts the effect of the present invention. Moreover, the configuration of applying forces in two directions different from each other exerts the effect of the present invention as long as the directions are not parallel to the x-axis even when the directions are not present in the yz plane.

Moreover, in the vibration damping device for an elevator rope, which generates the forced displacement in the y-axis direction and the forced displacement in the z-axis direction, the building shake detection unit described in the second embodiment can also be used in combination therewith. In such a vibration damping device for an elevator rope as described above, it is suitable that the building shake detection unit form a lateral vibration estimation unit configured to measure shakes of a building in both directions which are the y-axis direction and the z-axis direction, and to include building shake information in both of the directions in estimating factors.

The vibration damping device 100*d* for an elevator rope is formed through use of the transfer function described in the first embodiment, thereby an amplitude of the lateral vibration in the y-axis direction and an amplitude of the lateral vibration in the z-axis direction within a wider frequency range can be reduced with high accuracy. Moreover, the transfer functions are calculated individually for the y-axis direction and the z-axis direction, thereby the lateral vibration at the position of the actuator 14*d* can also be estimated.

The vibration damping device 100*d* for an elevator rope includes the actuator 14*d*. The actuator 14*d* is placed in the hoistway 1*d* or the machine room 2*d*, and generates the y-axis direction forced displacement 109*d* and the z-axis direction forced displacement 109*e* in response to the y-axis direction drive input 106*d* and the z-axis direction drive input 106*e*, which are input thereto. Then, the actuator 14*d* applies, to the main ropes 6*d*, the force generated by the y-axis direction forced displacement 109*d* and the z-axis direction forced displacement 109*e*.

The vibration damping device 100*d* for an elevator rope further includes the lateral vibration measuring unit 12*d*. The lateral vibration measuring unit 12*d* measures the lateral vibration in the y-axis direction and the lateral vibration in the z-axis direction, which are generated in the main ropes 6*d*, and outputs the measured lateral vibrations as the y-axis direction lateral vibration information 101*d* and the z-axis direction lateral vibration information 101*e*. The vibration damping device 100*d* for an elevator rope further includes the lateral vibration estimation unit 50*d*.

The lateral vibration estimation unit 50*d* estimates the lateral vibration in the y-axis direction at the position of the actuator 14*d* and the lateral vibration in the z-axis direction at the position of the actuator 14*d* based on the estimating factors including the y-axis direction lateral vibration information 101*d* and the estimating factors including the z-axis direction lateral vibration information 101*e*, respectively. Then, the lateral vibration estimation unit 50*d* outputs the lateral vibration in the y-axis direction and the lateral vibration in the z-axis direction, which are thus estimated, as the y-axis direction estimated lateral vibration 102*d* and the z-axis direction estimated lateral vibration 102*e*.

The vibration damping device 100*d* for an elevator rope further includes the actuator drive unit 52*d*. The actuator drive unit 52*d* outputs the y-axis direction drive input 106*d* and the z-axis direction drive input 106*e* to the actuator 14*d*. Then, the actuator drive unit 52*d* drives the actuator 14*d* so that the y-axis direction forced displacement 109*d* and the z-axis direction forced displacement 109*e* have phases reverse to those of the y-axis direction estimated lateral vibration 102*d* and the z-axis direction estimated lateral vibration 102*e*.

It can also be said that the vibration damping device 100*d* for an elevator rope according to the fourth embodiment has such a configuration as follows. That is, the vibration damping device 100*d* for an elevator rope includes the actuator 14*d*. The actuator 14*d* generates forced displacements in two directions in response to drive inputs in two directions perpendicular to the main ropes 6*d*, and applies, to the main ropes 6*d*, forces generated by the forced displacements in two directions.

The vibration damping device 100*d* for an elevator rope further includes the lateral vibration measuring unit 12*d*. The lateral vibration measuring unit 12*d* measures lateral vibrations in two directions, and outputs the measured lateral vibrations in two directions as lateral vibration information in two directions. The vibration damping device 100*d* for an elevator rope further includes the lateral vibration estimation unit 50*d*.

The lateral vibration estimation unit 50*d* estimates the lateral vibrations of the main ropes 6*d* in two directions at the position of the actuator 14*d* based on the estimating factors including the lateral vibration information in two directions, and outputs the estimated lateral vibrations in two directions as estimated lateral vibrations in two directions.

The vibration damping device 100*d* for an elevator rope further includes the actuator drive unit 52*d*. The actuator drive unit 52*d* outputs drive inputs in two directions to the actuator 14*d*, and drives the actuator 14*d* so that each of the forced displacements in two directions has a phase reverse to that of each of the estimated lateral vibrations in two directions.

Fifth Embodiment

A vibration damping device 100*f* for an elevator rope according to a fifth embodiment includes a tension adjustment device 23 in addition to the configuration of the vibration damping device 100 for an elevator rope according to the first embodiment. The tension adjustment device 23 adjusts respective tensions of respective main ropes 6*f* which form a plurality of main ropes 6*f* as elevator ropes, and reduces a difference in tension between the respective main ropes 6*f*.

Figure 23A:
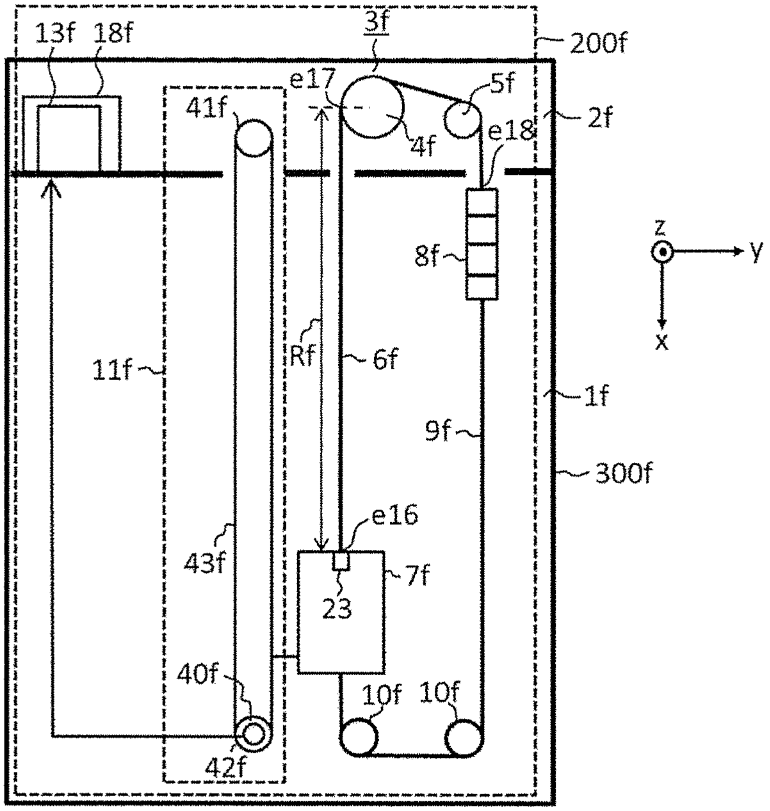
FIGS. 23A and 23B are schematic views of an elevator apparatus according to a fifth embodiment of the present invention.
Figure 23B:
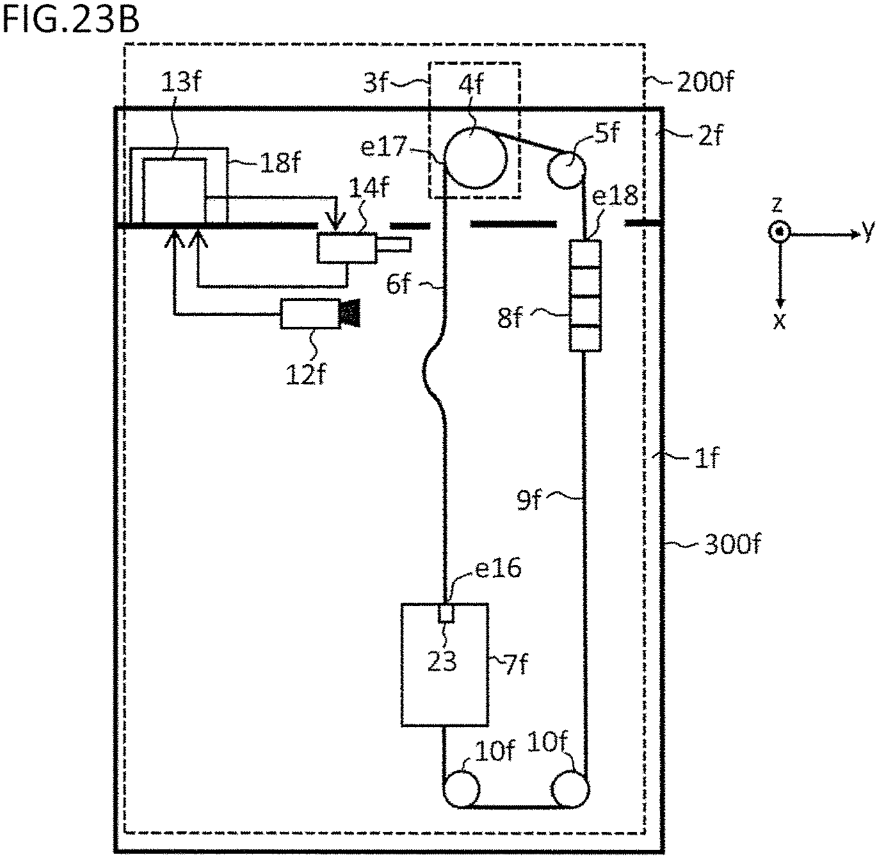

FIGS. 23A and 23B are schematic views of an elevator apparatus 200*f* according to a fifth embodiment of the present invention. Structures and operations of the elevator apparatus 200*f* and the vibration damping device 100*f* for an elevator rope, which are not described in the fifth embodiment, are the same as the structures and operations of the elevator apparatus 200 and the vibration damping device 100 for an elevator rope, which are disclosed in the first embodiment.

Components illustrated in FIGS. 23A and 23B are included in the elevator apparatus 200*f*, except for a building 300*f* and also a hoistway 1*f* and a machine room 2*f* being parts of the building 300*f*. Moreover, a vibration damping device 100*f* for an elevator rope is a part of the elevator apparatus 200*f*.

Both of FIG. 23A and FIG. 23B are illustrations of the elevator apparatus 200*f*. To simplify the illustration, a lateral vibration measuring unit 12*f* and an actuator 14*f* are not illustrated in FIG. 23A. A car position measuring unit 11*f* is not illustrated in FIG. 23B.

In FIG. 23A and FIG. 23B, an x-axis, a y-axis, and a z-axis in a 3-axis orthogonal coordinate system are illustrated. The x-axis is set in parallel to a portion of a vibration damping range Rf of main ropes 6*f*, and a positive direction of the x-axis corresponds to a vertically downward direction. In FIG. 23A, the hoistway 1*f* through which a car 7*f* moves up and down is illustrated. The machine room 2*f* is provided above the hoistway 1*f*, and a hoisting machine 3*f* and a deflector sheave 5*f* are placed in the machine room 2*f*.

Arrangement of the building 300*f*, the hoistway 1*f*, and the machine room 2*f* is the same as the arrangement of the building 300, the hoistway 1, and the machine room 2 in FIG. 1C. The hoisting machine 3*f* includes a driving sheave 4*f*, a hoisting-machine motor (not shown) configured to rotate the driving sheave 4*f*, and a hoisting-machine brake (not shown) configured to brake the rotation of the driving sheave 4*f*.

A plurality of main ropes 6*f* which are suspension bodies are wound around the driving sheave 4*f* and the deflector sheave 5*f*, and the car 7*f* is suspended at a first end portion e16 of each of the main ropes 6*f*. A second end portion e18 of the main rope 6*f* is connected to a counterweight 8*f*.

Here, a portion of the main rope 6*f* located closest to the car 7*f* among portions of the main rope 6*f* in contact with the driving sheave 4*f* is defined as a contact point e17. That is, a boundary between the portion of the main rope 6*f* in contact with the driving sheave 4*f* and a portion of the main rope 6*f* in non-contact with the driving sheave 4*f* is the contact point e17.

The vibration damping range Rf in the fifth embodiment is a portion between the first end portion e16 and the contact point e17 in the main rope 6*f*. The vibration damping range Rf is illustrated in FIG. 23A, and is not illustrated in FIG. 23B.

The car 7*f* and the counterweight 8*f* are suspended by main ropes 6*f*. The hoisting machine 3*f* rotates the driving sheave 4*f* to lift and lower the car 7*f* and the counterweight 8*f*. In the inside of the hoistway 1*f*, there are placed a pair of car guiderails (not shown) configured to guide the lifting and lowering of the car 7*f* and a pair of counterweight guiderails (not shown) configured to guide the lifting and lowering of the counterweight 8*f*.

The car 7*f* and the counterweight 8*f* are connected to each other by a compensation rope 9*f*. Two compensating sheaves 10*f* around which the compensation rope 9*f* is wound are provided in a bottom portion of the hoistway 1*f*. Similarly to the first embodiment, the car position measuring unit 11*f* configured to measure a position of the car 7*f* in the x-axis direction is provided.

The car position measuring unit 11*f* includes a main body 40*f*, a pulley 41*f*, a pulley 42*f*, and a wire rope 43*f*. The endless (annular) wire rope 43*f* is wound around the pulley 41*f* and the pulley 42*f*. A variety of instruments (not shown) related to the travel of the car 7*f* are provided inside the hoistway 1*f*, and the variety of instruments are controlled by a control panel 18*f*.

The control panel 18*f* includes a computation control device 13*f*. In the inside of the hoistway 1*f*, a non-contact displacement sensor is arranged as the lateral vibration measuring unit 12*f* configured to measure the lateral vibration of the main rope 6*f*. In FIG. 23B, the actuator 14*f* placed in the machine room 2*f*, the lateral vibration measuring unit 12*f* placed in the hoistway 1*f*, and the tension adjustment device 23 placed in the car 7*f* are illustrated.

The vibration damping device 100*f* for an elevator rope according to the fifth embodiment includes the tension adjustment device 23. The tension adjustment device 23 performs adjustment to reduce a difference in tension between the main ropes 6*f* which form the plurality of main ropes 6*f*. Hereinafter, the respective main ropes 6*f* which form the plurality of main ropes 6*f* will be referred to as the respective main ropes 6*f*.

A configuration of the tension adjustment device 23 is described. On portions of the first end portion e16 of FIGS. 23A and 23B, hydraulic cylinders are provided one by one so as to correspond to the respective main ropes 6*f*. Independently of one another, the hydraulic cylinders are capable of sliding in the x-axis direction of FIGS. 23A and 23B and changing a length of each thereof. Moreover, end portions of the respective main ropes 6*f* are connected to one ends of the respective hydraulic cylinders, and another ends of the respective hydraulic cylinders are fixed to an upper portion of the car 7*f*.

The respective main ropes 6*f* are connected to the car 7*f* through intermediation of the hydraulic cylinders corresponding thereto. Then, a rope tensiometer configured to detect the tensions of the respective main ropes 6*f* is provided in advance, and when the detected tension of each of the main ropes 6*f* is small, the length of the hydraulic cylinder corresponding to this main rope 6*f* is shortened. When the tension of the main rope 6*f* is large, the length of the hydraulic cylinder corresponding thereto is adjusted to be lengthened.

The configuration of the tension adjustment device 23 is not limited to the above. As the tension adjustment device 23, there may be provided a device in which the rope tensiometers are mounted to the respective main ropes 6*f*, the device being configured to actively control the tensions based on information of the rope tensiometers, and to perform adjustment to reduce the difference in tension between the respective main ropes 6*f*.

The computation control device 13*f* includes a lateral vibration estimation unit 50*f*, a lateral vibration compensation command computation unit 51*f*, and an actuator drive unit 52*f*. Structures and operations of the lateral vibration compensation command computation unit 51*f* and the actuator drive unit 52*f* are the same as the structures and operations of the lateral vibration compensation command computation unit 51 and the actuator drive unit 52 in the first embodiment.

Figure 24:
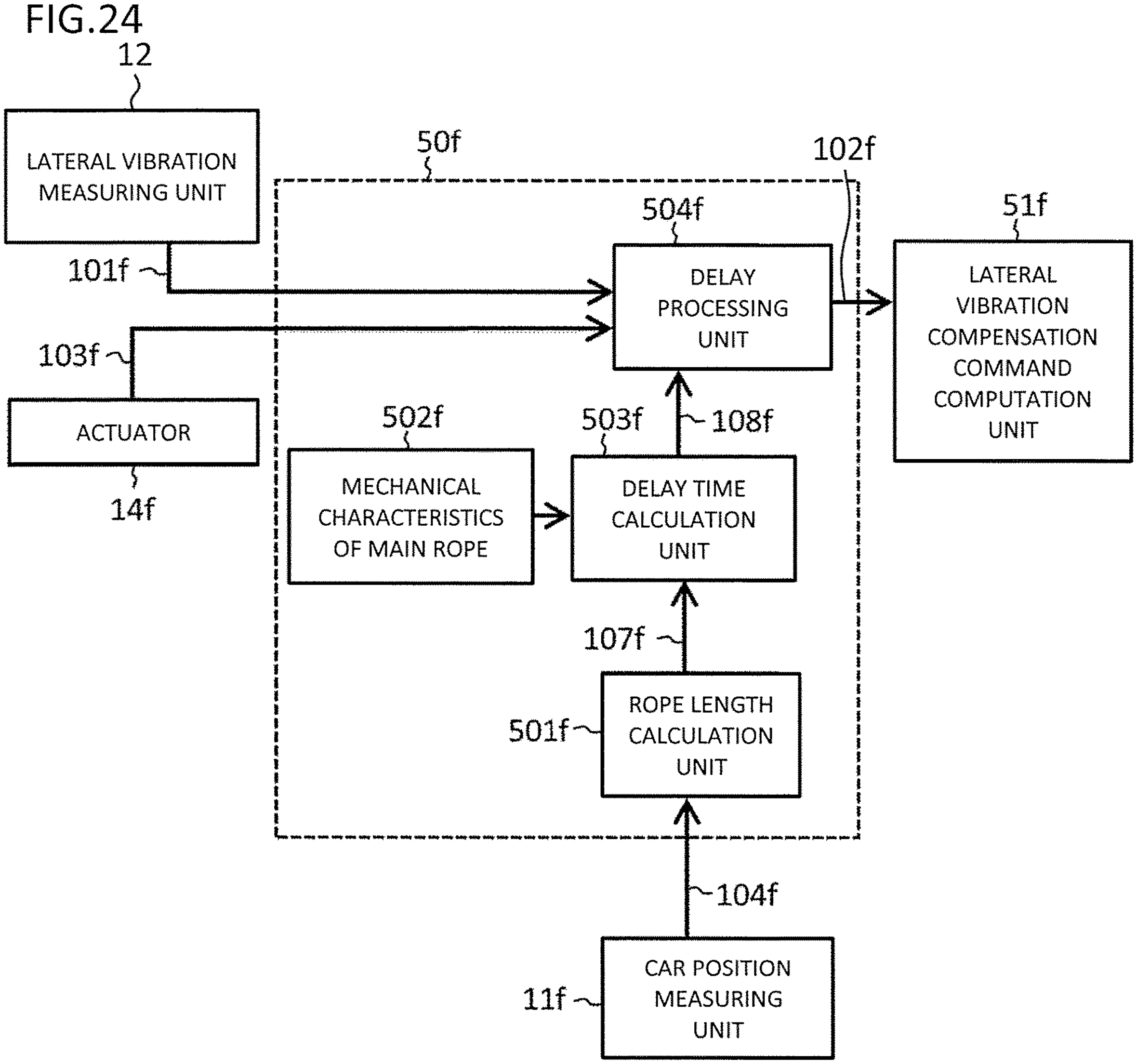
FIG. 24 is a block diagram for illustrating a main part of a vibration damping device for an elevator rope according to the fifth embodiment of the present invention, the main part including a lateral vibration estimation unit.

A structure and operation of the lateral vibration estimation unit 50*f* in the fifth embodiment is described. FIG. 24 is a block diagram for illustrating a main part of the vibration damping device for an elevator rope according to the fifth embodiment of the present invention, the main part including the lateral vibration estimation unit. The lateral vibration estimation unit 50*f* includes a rope length calculation unit 501*f*, mechanical characteristics 502*f* of a main rope, a delay time calculation unit 503*f*, and a delay processing unit 504*f*.

Structures and operations of the car position measuring unit 11*f*, the rope length calculation unit 501*f*, and the delay processing unit 504*f* are the same as the structures and operations of the car position measuring unit 11, the rope length calculation unit 501, and the delay processing unit 504 according to the first embodiment.

The lateral vibration estimation unit 50*f* calculates the tensions of the main ropes 6*f* based on a weight (total weight including a load) of the car 7*f*, a weight of a control cable (not shown) suspended from a lower portion of the car 7*f*, a weight of the compensation rope 9*f*, and a weight of the compensating sheaves 10*f*. The mechanical characteristics 502*f* of a main rope in the fifth embodiment include the tensions of the main ropes 6*f* in addition to a line density of the main ropes 6*f*.

The delay time calculation unit 503*f* calculates delay time information 108*f* based on the mechanical characteristics 502*f* of a main rope and the rope length information 107*f*. The lateral vibration estimation unit 50*f* in the fifth embodiment may estimate the estimated lateral vibration 102*f* through use of Equation (19) or Equation (9).

In the vibration damping device 100*f* for an elevator rope according to the fifth embodiment, since the tension adjustment device 23 is provided, the tensions of the respective main ropes 6*f* can be equalized to one another. The tensions of the respective ropes 6*f* are equalized to one another, thereby lateral vibration propagation speeds of the respective main ropes 6*f* become equal to one another. Therefore, in comparison with a case in which the tension adjustment device 23 is not included, calculation accuracy of the lateral vibration propagation speeds and estimation accuracy of the estimated lateral vibration 102*f* can be improved.

The vibration damping device 100*f* for an elevator rope according to the fifth embodiment estimates the lateral vibration at the position of the actuator based on estimating factors including the lateral vibration information 101*f*, and accordingly, can reduce the amplitude of the lateral vibration with high accuracy. Therefore, the vibration damping device 100*f* for an elevator rope according to the fifth embodiment can suppress the lateral vibration quickly and reliably, can reduce the degradation of the riding comfort of the passenger, and can avoid the damage to the instruments provided in the hoistway.

When a variation occurs in the tensions of the respective main ropes 6*f* which form the plurality of main ropes 6*f* due to, for example, a change over the years, such a state occurs in which the position of a resonance peak in the frequency domain differs for each of the main ropes 6*f*. The vibration damping device 100*f* for an elevator rope can reduce the variation between the tensions through use of the tension adjustment device 23, and accordingly, can estimate the lateral vibration at the position of the actuator with high accuracy.

Eventually, the vibration damping device 100*f* for an elevator rope can damp the resonance peak of the lateral vibration with high accuracy. Therefore, the vibration damping device 100*f* for an elevator rope, which uses the transfer function in this embodiment, can reduce the resonance peak of the lateral vibration quickly and accurately.

The tension adjustment device 23 in this embodiment can also be added to the vibration damping devices for an elevator rope, which are described in the first embodiment to the fourth embodiment. In such a case, a vibration damping device for an elevator rope, which is capable of reducing the resonance peak of the lateral vibration quickly and accurately in comparison with a case in which the tension adjustment device 23 is not provided, can be provided.

Sixth Embodiment

In a vibration damping device 100*g* for an elevator rope according to a sixth embodiment, a lateral vibration estimation unit 50*g* includes a lateral vibration frequency estimation unit 505 in addition to the configuration of the vibration damping device 100 for an elevator rope, which is described in the first embodiment.

Figure 25A:
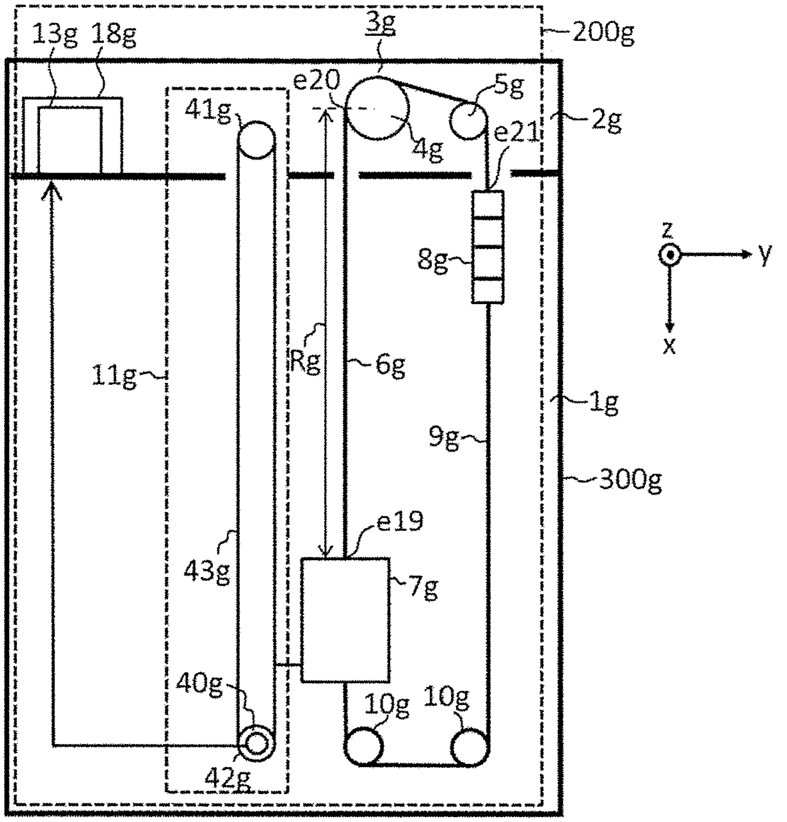
FIGS. 25A and 25B are schematic views of an elevator apparatus according to a sixth embodiment of the present invention.
Figure 25B:
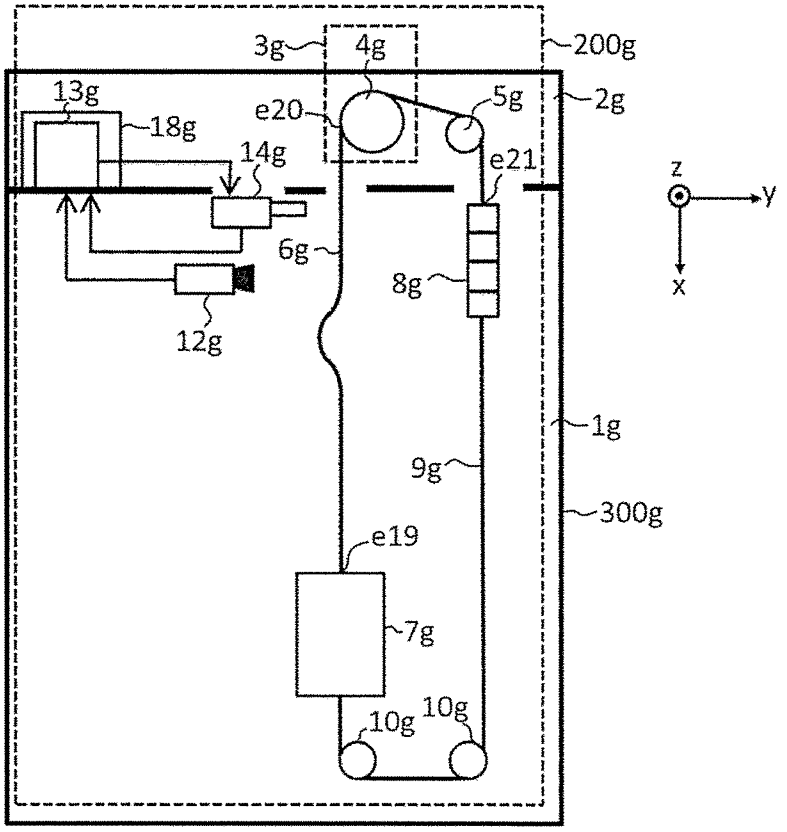

FIGS. 25A and 25B are schematic views of an elevator apparatus 200*g* according to the sixth embodiment of the present invention. Structures and operations of the elevator apparatus 200*g* and the vibration damping device 100*g* for an elevator rope, which are not described in the sixth embodiment, are the same as the structures and operations of the elevator apparatus 200 and the vibration damping device 100 for an elevator rope, which are described in the first embodiment.

Components illustrated in FIGS. 25A and 25B are included in the elevator apparatus 200*g*, except for a building 300*g* and also a hoistway 1*g* and a machine room 2*g* being parts of the building 300*g*. Moreover, the vibration damping device 100*g* for an elevator rope is a part of the elevator apparatus 200*g*.

Both of FIG. 25A and FIG. 25B are illustrations of the elevator apparatus 200*g*. To simplify the illustration, a lateral vibration measuring unit 12*g* and an actuator 14*g* are not illustrated in FIG. 25A. A car position measuring unit 11*g* is not illustrated in FIG. 25B.

In FIG. 25A and FIG. 25B, an x-axis, a y-axis, and a z-axis in a 3-axis orthogonal coordinate system are illustrated. The x-axis is set in parallel to a portion of a vibration damping range Rg of main ropes 6*g*, and a positive direction of the x-axis corresponds to a vertically downward direction. In FIG. 25A, the hoistway 1*g* through which a car 7*g* moves up and down is illustrated. The machine room 2*g* is provided above the hoistway 1*c*, and a hoisting machine 3*g* and a deflector sheave 5*g* are placed in the machine room 2*g*.

Arrangement of the building 300*g*, the hoistway 1*g*, and the machine room 2*g* is the same as the arrangement of the building 300, the hoistway 1, and the machine room 2 in FIG. 1C. The hoisting machine 3*g* includes a driving sheave 4*g*, a hoisting-machine motor (not shown) configured to rotate the driving sheave 4*g*, and a hoisting-machine brake (not shown) configured to brake the rotation of the driving sheave 4*g*.

A plurality of main ropes 6*g* which are suspension bodies are wound around the driving sheave 4*g* and the deflector sheave 5*g*, and the car 7*g* is suspended at a first end portion e19 of each of the main ropes 6*g*. A second end portion e21 of the main rope 6*g* is connected to a counterweight 8*g*.

Here, a portion of the main rope 6*g* located closest to the car 7*g* among portions of the main rope 6*g* in contact with the driving sheave 4*g* is defined as a contact point e20. That is, a boundary between the portion of the main rope 6*g* in contact with the driving sheave 4*g* and a portion of the main rope 6*g* in non-contact with the driving sheave 4*g* is the contact point e20.

The vibration damping range Rg in the sixth embodiment is a portion between the first end portion e19 and the contact point e20 in the main rope 6*g*. The vibration damping range Rg is illustrated in FIG. 25A, and is not illustrated in FIG. 25B.

The car 7*g* and the counterweight 8*g* are suspended by main ropes 6*g*. The hoisting machine 3*g* rotates the driving sheave 4*g* to lift and lower the car 7*g* and the counterweight 8*g*. In the inside of the hoistway 1*g*, there are placed a pair of car guiderails (not shown) configured to guide the lifting and lowering of the car 7*g* and a pair of counterweight guiderails (not shown) configured to guide the lifting and lowering of the counterweight 8*g*.

The car 7*g* and the counterweight 8*g* are connected to each other by a compensation rope 9*g*. Two compensating sheaves 10*g* around which the compensation rope 9*g* is wound are provided in a bottom portion of the hoistway 1*g*. Similarly to the first embodiment, the car position measuring unit 11*g* configured to measure a position of the car 7*g* in the x-axis direction is provided.

The car position measuring unit 11*g* includes a main body 40*g*, a pulley 41*g*, a pulley 42*g*, and a wire rope 43*g*. The endless (annular) wire rope 43*g* is wound around the pulley 41*g* and the pulley 42*g*. A variety of instruments (not shown) related to the travel of the car 7*g* are provided inside the hoistway 1*g*, and the variety of instruments are controlled by a control panel 18*g*.

The control panel 18*g* includes a computation control device 13*g*. In the inside of the hoistway 1*g*, a non-contact displacement sensor is arranged as the lateral vibration measuring unit 12*g* configured to measure the lateral vibration of the main rope 6*g*. In FIG. 25B, the actuator 14*g* and the lateral vibration measuring unit 12*g* placed in the hoistway 1*g* are illustrated.

Figure 26:
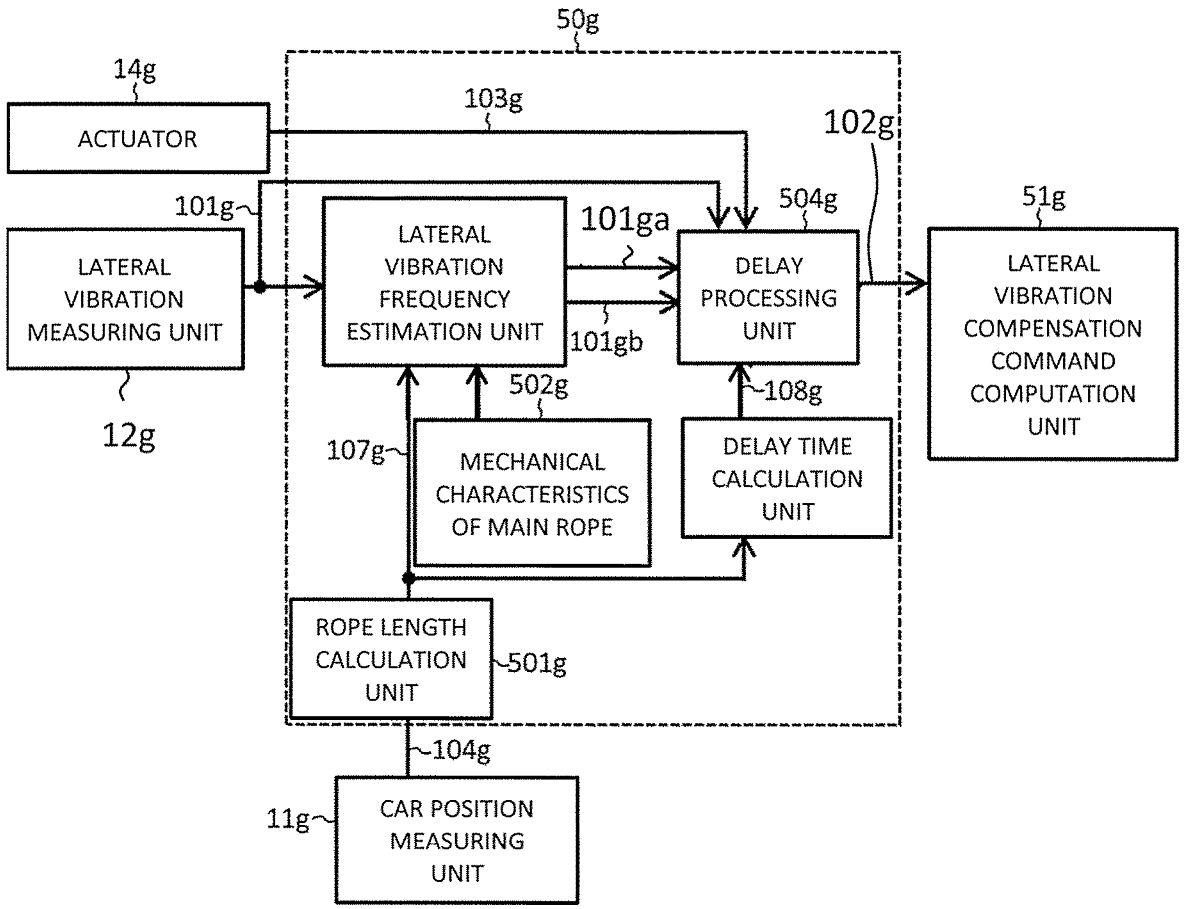
FIG. 26 is a block diagram for illustrating a main part of a vibration damping device for an elevator rope according to the sixth embodiment of the present invention, the main part including a lateral vibration estimation unit.

Subsequently, the lateral vibration estimation unit 50*g* that is a component of the computation control device 13*g* is described. FIG. 26 is a block diagram for illustrating a main part of the vibration damping device 100*g* for an elevator rope according to the sixth embodiment of the present invention, the main part including the lateral vibration estimation unit 50*g*. The lateral vibration estimation unit 50*g* includes a rope length calculation unit 501*g*, mechanical characteristics 502*g* of a main rope, a delay time calculation unit 503*g*, a delay processing unit 504*g*, and the lateral vibration frequency estimation unit 505.

In the configuration of the vibration damping device 100*g* for an elevator rope, the lateral vibration estimation unit 50*g* includes the rope length calculation unit 501*g*. However, it is only required that the rope length calculation unit 501*g* be included in the vibration damping device for an elevator rope, and a configuration in which the car position measuring unit 11*g* includes the rope length calculation unit 501*g* may be adopted.

The rope length calculation unit 501*g* acquires car position information 104*g* from the car position measuring unit 11*g*. The rope length calculation unit 501*g* calculates a rope length from the car position information 104*g*, and outputs the calculated rope length as rope length information 107*g* to the lateral vibration frequency estimation unit 505 and the delay time calculation unit 503*g*.

Here, the rope length in the sixth embodiment is a length of the main rope 6*g* from the first end portion e19 to the contact point e20. Such a configuration can also be adopted, in which the actuator 14*g* and the lateral vibration measuring unit 12*g* are provided on the car 7*g*, and in which the rope length calculation unit 501*g* does not acquire the car position information 104*g* from the car position measuring unit 11*g*.

In such a case, the rope length calculation unit 501*g* stores in advance a distance in a height direction from the actuator 14*g* to the lateral vibration measuring unit 12*g* in advance, and may thereby output the rope length information 107*g* without using the car position information 104*g*.

The delay time calculation unit 503*g* calculates a time required for the lateral vibration measured by the lateral vibration measuring unit 12*g* to reach the position of the actuator 14*g* from the position of the lateral vibration measuring unit 12*g*. The delay time calculation unit 503*g* calculates such a required time based on the position of the lateral vibration measuring unit 12*g*, the position of the actuator 14*g*, the rope length information 107*g*, and the mechanical characteristics 502*g* of a main rope.

The delay time calculation unit 503*g* outputs a delay time, which is the required time thus calculated, as delay time information 108*g* to the delay processing unit 504*g*. The mechanical characteristics 502*g* of a main rope include a mass (line density) of the main rope 6*g* per unit length. The delay time calculation unit 503*g* calculates the propagation speed of the lateral vibration through use of the mechanical characteristics 502*g* of a main rope.

The lateral vibration frequency estimation unit 505 estimates a frequency of the lateral vibration of the main rope based on lateral vibration information 101*g*. Moreover, the lateral vibration frequency estimation unit 505 calculates a natural frequency theoretical value of the lateral vibration of the main rope based on the rope length information 107*g* and the mechanical characteristics 502*g* of a main rope.

The lateral vibration frequency estimation unit 505 outputs the frequency of the lateral vibration, which is estimated based on the lateral vibration information 101*g*, as lateral vibration frequency information 101*ga* to the delay processing unit 504*g*. Moreover, the lateral vibration frequency estimation unit 505 outputs the calculated natural frequency theoretical value of the lateral vibration as lateral vibration frequency theoretical value information 101*gb* to the delay processing unit 504*g*.

The delay processing unit 504*g* compares the lateral vibration frequency information 101*ga* and the lateral vibration frequency theoretical value information 101*gb* with each other. Then, when a difference between both is smaller than a predetermined reference value or the same, the delay processing unit 504*g* estimates the lateral vibration at the position of the actuator 14*g* based on the lateral vibration information 101*g*, the actuator displacement 103*g*, and the delay time information 108*g*.

When the difference between both is larger than the predetermined reference value, the delay processing unit 504*g* does not output the estimated lateral vibration 102*g* to the lateral vibration compensation command computation unit 51*g*, and the actuator 14*g* does not operate.

The delay processing unit 504*g* may estimate the lateral vibration by delaying a phase of the lateral vibration information 101*g* by an amount corresponding to the delay time information 108*g*. The delay processing unit 504*g* outputs the estimated lateral vibration as the estimated lateral vibration 102*g* to the lateral vibration compensation command computation unit 51*g*.

This reference value may take, for example, a primary mode vibration to a tertiary mode vibration as objects, and set at approximately ±20% of the natural frequency theoretical value of each of the lateral vibrations. That is, the reference value may be a value from 80% of the natural frequency theoretical value to 120% of the natural frequency theoretical value.

In this embodiment, the lateral vibration estimation unit 50*g* includes the lateral vibration frequency estimation unit 505. However, it is only required that the vibration damping device 100*g* for an elevator rope include the lateral vibration frequency estimation unit 505. A component other than the delay processing unit 504*g* may compare the lateral vibration frequency information 101*ga* and the lateral vibration frequency theoretical value information 101*gb* with each other.

For example, the lateral vibration frequency estimation unit 505 outputs the lateral vibration frequency information 101*ga* and the lateral vibration frequency theoretical value information 101*gb* to the lateral vibration compensation command computation unit 51*g*. Then, the lateral vibration compensation command computation unit 51*g* may calculate the difference between the lateral vibration frequency information 101*ga* and the lateral vibration frequency theoretical value information 101*gb*, and may determine whether or not to operate the actuator 14.

That is, the vibration damping device 100*g* for an elevator rope according to this embodiment further includes the lateral vibration frequency estimation unit 505. The lateral vibration frequency estimation unit 505 estimates the lateral vibration frequency information 101*ga* that is a frequency of the lateral vibration and the lateral vibration frequency theoretical value information 101*gb* that is a theoretical value of the above-described frequency based on the lateral vibration information 101*g*.

Moreover, in the vibration damping device 100*g* for an elevator rope, the lateral vibration frequency information 101*ga* and the lateral vibration frequency theoretical value information 101*gb* are compared with each other, and the actuator 14*g* is driven when the difference between both is the same as the predetermined reference value or the same as the reference value. Then, the actuator 14*g* is not driven when the difference exceeds the above-described reference value.

The vibration damping device 100*g* for an elevator rope according to the sixth embodiment estimates the lateral vibration at the position of the actuator based on the estimating factors including the lateral vibration information 101*g*, and accordingly, can reduce the amplitude of the lateral vibration with high accuracy. Therefore, the vibration damping device 100*g* for an elevator rope according to the sixth embodiment can suppress the lateral vibration quickly and reliably, can reduce the degradation of the riding comfort of the passenger, and can avoid the damage to the instruments provided in the hoistway.

The vibration damping device 100*g* for an elevator rope according to the sixth embodiment includes the lateral vibration frequency estimation unit 505 configured to estimate the lateral vibration frequency information 101*ga* and the lateral vibration frequency theoretical value information 101*gb*. Then, whether or not to operate the actuator 14*g* is determined based on a magnitude of the difference between the lateral vibration frequency information 101*ga* and the lateral vibration frequency theoretical value information 101*gb*.

Therefore, it becomes possible to apply the vibration damping force to the main ropes 6*g* only when the main ropes 6*g* are vibrated at a frequency close to the resonance frequency. Then, when a minute lateral vibration is generated in the main ropes 6*g* due to random external forces, the actuator 14*g* is not operated, and a power consumption can be suppressed.

As an example of the random external force, for example, there can be mentioned a wind, a vibration, and the like, which are generated by travel of another elevator apparatus when another hoistway and such another elevator apparatus are placed adjacent to the hoistway 1*g*.

The configuration in this embodiment can also be applied to the vibration damping devices for an elevator rope, which are described in the first embodiment to the fifth embodiment. Then, in each of the elevator apparatuses, it is possible to suppress the power consumption by reducing unnecessary actions of the actuator.

The embodiments of the vibration damping device for an elevator rope, which are described above, can be applied in appropriate combination.

REFERENCE SIGNS LIST

1, 1*a*, 1*b*, 1*c*, 1*d*, 1*g*, 1*g* hoistway, 2, 2*a*, 2*b*, 2*c*, 2*d*, 2*f*, 2*g* machine room, 6, 6*a*, 6*b*, 6*c*, 6*d*, 6*f*, 6*g* main rope, 7, 7*a*, 7*b*, 7*c*, 7*d*, 7*f*, 7*g* car, 11, 11*a*, 11*b*, 11*c*, 11*d*, 11*f*, 11*g* car position measuring unit, 12, 12*a*, 12*b*, 12*c*, 12*d*, 12*f*, 12*g* lateral vibration measuring unit, 14, 14*a*, 14*b*, 14*c*, 14*d*, 14*f*, 14*g* actuator, 50, 50*a*, 50*b*, 50*c*, 50*d*, 50*f*, 50*g* lateral vibration estimation unit, 51, 51*a*, 51*b*, 51*c*, 51*d*, 51*f*, 51*g* lateral vibration compensation command computation unit, 52, 52*a*, 52*b*, 52*c*, 52*d*, 52*f*, 52*g* actuator drive unit, 21 weighing device, 22, 22*a* building shake detection unit, 23 tension adjustment device 100, 100*a*, 100*b*, 100*c*, 100*d*, 100*f*, 100*g* vibration damping device for an elevator rope, 101, 101*a*, 101*b*, 101*c*, 101*f*, 101*g* lateral vibration information, 101*d* y-axis direction lateral vibration information, 101*e* z-axis direction lateral vibration information, 102, 102*a*, 102*b*, 102*c* estimated lateral vibration, 102*d* y-axis direction estimated lateral vibration, 102*e* z-axis direction estimated lateral vibration, 103, 103*a*, 103*b*, 103*c*, 103*f*, 103*g* actuator displacement, 103*d* y-axis direction actuator displacement,

103*e* z-axis direction actuator displacement, 104, 104*a*, 104*b*, 104*c*, 104*d*, 104*f*, 104*g* car position information, 105, 105*a*, 105*b*, 105*c* lateral vibration compensation command value, 105*d* y-axis direction lateral vibration compensation command value, 105*e* z-axis direction lateral vibration compensation command value, 106, 106*a*, 106*b*, 106*c* drive input, 106*d* y-axis direction drive input, 106*e* z-axis direction drive input, 107, 107*a*, 107*b*, 107*c*, 107*d*, 107*f*, 107*g* rope length information, 108, 108*a*, 108*b*, 108*c*, 108*f*, 108*g* delay time information, 108*d* y-axis direction delay time information, 108*e* z-axis direction delay time information, 109, 109*a*, 109*b*, 109*c* forced displacement 109*d* y-axis direction forced displacement, 109*e* z-axis direction forced displacement, 111 reaction force estimation value, 112 building shake information, 113 car interior load information, 141*a* y-axis direction actuator, 141*b* z-axis direction actuator, 200, 200*a*, 200*b*, 200*c*, 200*d*, 200*f*, 200*g* elevator apparatus, 300, 300*a*, 300*b*, 300*c*, 300*d*, 300*f*, 300*g* building, 501, 501*a*, 501*b*, 501*c*, 501*d*, 501*f*, 501*g* rope length calculation unit, 504, 504*a*, 504*b*, 504*c*, 504*d*, 504*f*, 504*g* delay processing unit, 505 lateral vibration frequency estimation unit, 521 actuator position control system, 522 disturbance observer, 523 inverse system of actuator position control system, V(x,s), $V_2$(x,s) transfer function

The invention claimed is:

1. A vibration damping device for an elevator rope, comprising:

an actuator, which is placed in a hoistway, in a machine room, or on a car of an elevator apparatus, and is configured to generate a forced displacement in response to a drive input and apply a force generated by the forced displacement to an elevator rope of the elevator apparatus;

a lateral vibration measuring circuit, which is placed in the hoistway, in the machine room, or on the car, and is configured to measure a lateral vibration generated in the elevator rope and output the measured lateral vibration as lateral vibration information;

a lateral vibration estimation circuit configured to estimate a lateral vibration of the elevator rope at a position of the actuator based on an estimating factor including the lateral vibration information and output the estimated lateral vibration; and an actuator drive circuit configured to give the actuator a command value in which the forced displacement has a phase reverse to a phase of the estimated lateral vibration output from the lateral vibration estimation circuit, the command value serving as a drive input, wherein the lateral vibration estimation circuit estimates the lateral vibration at the position of the actuator, the lateral vibration being generated by a traveling wave or a reflected wave that is reflected by an end portion of the elevator rope and propagates through the elevator rope, and the lateral vibration estimation circuit calculates a delay time that is a time required for the lateral vibration to propagate from a position of the lateral vibration measuring circuit to the position of the actuator and estimates the lateral vibration at the position of the actuator based on the estimating factor including the delay time.

2. The vibration damping device for an elevator rope according to claim 1, wherein the actuator is placed on the car of the elevator apparatus, and wherein the lateral vibration estimation circuit estimates the lateral vibration of the elevator rope at the position of the actuator, the lateral vibration being generated by a reflected wave that is reflected and propagates through the elevator rope vertically downward.

3. The vibration damping device for an elevator rope according to claim 1, further comprising a lateral vibration compensation command computation circuit configured to calculate a lateral vibration compensation command value based on the estimated lateral vibration, the lateral vibration compensation command value having a phase reverse to the phase of the estimated lateral vibration, wherein the actuator drive circuit outputs the drive input to the actuator to allow the forced displacement to follow the lateral vibration compensation command value.

4. The vibration damping device for an elevator rope according to claim 3, wherein the actuator drive circuit includes an actuator position control system, and the lateral vibration compensation command computation circuit inputs the estimated lateral vibration to a transfer function of an inverse system of the actuator position control system and calculates the lateral vibration compensation command value.

5. The vibration damping device for an elevator rope according to claim 1, wherein the lateral vibration estimation circuit estimates the lateral vibration at the position of the actuator through use of a transfer function that associates a displacement disturbance that is an input signal and the lateral vibration that is an output signal with each other.

6. The vibration damping device for an elevator rope according to claim 5, wherein the transfer function includes a dead time element.

7. The vibration damping device for an elevator rope according to claim 1, wherein the actuator drive circuit includes a disturbance observer configured to estimate a reaction force from the elevator rope with respect to a force generated by the forced displacement and output the estimated reaction force as a reaction force estimation value, and wherein the actuator drive circuit calculates the drive input through use of the reaction force estimation value.

8. The vibration damping device for an elevator rope according to claim 1, further comprising a tension adjustment device configured to perform adjustment to reduce a variation between tensions of a plurality of main ropes which form the elevator rope that suspends the car.

9. An elevator apparatus comprising:

a car placed in a hoistway;

an elevator rope configured to suspend the car; and an actuator, which is placed in the hoistway, in a machine room, or on the car, and is configured to generate a forced displacement in response to a drive input and apply a force generated by the forced displacement to the elevator rope;

a lateral vibration measuring circuit, which is placed in the hoistway, in the machine room, or on the car, and is configured to measure a lateral vibration generated in the elevator rope and output the measured lateral vibration as lateral vibration information;

a lateral vibration estimation circuit configured to estimate a lateral vibration of the elevator rope at a position of the actuator based on an estimating factor including the lateral vibration information and output the estimated lateral vibration; and an actuator drive circuit configured to give the actuator a command value in which the forced displacement has a phase reverse to a phase of the estimated lateral vibration output from the lateral vibration estimation circuit, the command value serving as a drive input, wherein the lateral vibration estimation circuit estimates the lateral vibration at the position of the actuator, the lateral vibration being generated by a traveling wave or a reflected wave that is reflected by an end portion of the elevator rope and propagates through the elevator rope, and the lateral vibration estimation circuit calculates a delay time that is a time required for the lateral vibration to propagate from a position of the lateral vibration measuring circuit to the position of the actuator and estimates the lateral vibration at the position of the actuator based on the estimating factor including the delay time.

* * * * *